United States Patent
Shin et al.

(10) Patent No.: US 12,156,233 B2
(45) Date of Patent: Nov. 26, 2024

(54) FLEXIBLE BANDWIDTH OPERATION IN WIRELESS SYSTEMS

(71) Applicant: INTERDIGITAL PATENT HOLDINGS, INC., Wilmington, DE (US)

(72) Inventors: Sung-Hyuk Shin, Northvale, NJ (US); Chang-Soo Koo, Melville, NY (US); Ghyslain Pelletier, Montreal (CA); Janet A. Stern-Berkowitz, Little Neck, NY (US); Marian Rudolf, Montreal (CA); Nobuyuki Tamaki, Melville, NY (US); Allan Y. Tsai, Boonton, NY (US); Pouriya Sadeghi, San Diego, CA (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

(21) Appl. No.: 18/212,419

(22) Filed: Jun. 21, 2023

(65) Prior Publication Data
US 2023/0337203 A1 Oct. 19, 2023

Related U.S. Application Data

(63) Continuation of application No. 16/815,396, filed on Mar. 11, 2020, now Pat. No. 11,743,874, which is a (Continued)

(51) Int. Cl.
*H04W 72/23* (2023.01)
*H04L 5/00* (2006.01)
(Continued)

(52) U.S. Cl.
CPC .............. *H04W 72/23* (2023.01); *H04L 5/001* (2013.01); *H04L 5/0044* (2013.01);
(Continued)

(58) Field of Classification Search
CPC ...................................................... H04W 72/23
See application file for complete search history.

(56) References Cited

U.S. PATENT DOCUMENTS

| 8,526,964 B2 | 9/2013 | Wei |
| 8,548,514 B2 | 10/2013 | Kim et al. |

(Continued)

FOREIGN PATENT DOCUMENTS

| CN | 101959249 A | 1/2011 |
| CN | 102067694 A | 5/2011 |

(Continued)

OTHER PUBLICATIONS

3rd Generation Partnership Project (3GPP), R1-100359, "Possible Definition of Extension Carrier and Carrier Segment", Panasonic, Motorola, Qualcomm, 3GPP TSG-RAN WG1 Meeting #59bis, Valencia, Spain, Jan. 18-22, 2010, pp. 1-2.

(Continued)

*Primary Examiner* — Jason E Mattis
(74) *Attorney, Agent, or Firm* — CONDO ROCCIA KOPTIW LLP

(57) ABSTRACT

Systems, methods, and instrumentalities are disclosed for downlink resource allocation associated with a shared frequency band. A WTRU may receive resource allocation information associated with a component carrier and at least one carrier segment. The component carrier and the least one carrier segment may each comprise a plurality of resource block groups (RBG). At least two bitmaps may be associated with the resource allocation information. A size of a resource block group (RBG) of the component carrier and the at least (Continued)

one carrier segment may be based on a combined number of resource blocks (RB) of the component carrier and the one or more carrier segments divided by a 3GPP Rel-8/Rel-10 RBG size of the component carrier. The WTRU may determine at least one RBG allocated to the WTRU using the resource allocation information and may receive and decode the at least one RBG allocated to the WTRU.

15 Claims, 24 Drawing Sheets

Related U.S. Application Data continuation of application No. 15/809,784, filed on Nov. 10, 2017, now Pat. No. 10,624,093, which is a continuation of application No. 14/520,121, filed on Oct. 21, 2014, now abandoned, which is a continuation of application No. 13/571,656, filed on Aug. 10, 2012, now Pat. No. 8,897,253.

(60) Provisional application No. 61/611,244, filed on Mar. 15, 2012, provisional application No. 61/555,887, filed on Nov. 4, 2011, provisional application No. 61/522,883, filed on Aug. 12, 2011.

(51) Int. Cl.
  *H04W 36/00* (2009.01)
  *H04W 72/0453* (2023.01)

(52) U.S. Cl.
  CPC .......... *H04L 5/0092* (2013.01); *H04L 5/0098* (2013.01); *H04W 36/00* (2013.01); *H04W 72/0453* (2013.01); *H04L 5/0053* (2013.01); *H04L 5/0094* (2013.01)

(56) References Cited

U.S. PATENT DOCUMENTS

| | | | |
|---|---|---|---|
| 8,743,734 B2 | 6/2014 | Etemad | |
| 8,767,663 B2 | 7/2014 | Chang et al. | |
| 8,897,253 B2 | 11/2014 | Sadeghi et al. | |
| 10,624,093 B2 | 4/2020 | Shin et al. | |
| 2010/0130137 A1 | 5/2010 | Cave et al. | |
| 2010/0220668 A1 | 9/2010 | Nakashima et al. | |
| 2011/0070845 A1 | 3/2011 | Chen et al. | |
| 2011/0081913 A1 | 4/2011 | Lee et al. | |
| 2011/0090854 A1 | 4/2011 | Montojo et al. | |
| 2011/0105107 A1* | 5/2011 | Kwon | H04L 5/0098 455/422.1 |
| 2011/0110322 A1 | 5/2011 | Koyanagi et al. | |
| 2011/0116467 A1 | 5/2011 | Jung et al. | |
| 2011/0170496 A1* | 7/2011 | Fong | H04W 52/24 370/329 |
| 2011/0243023 A1 | 10/2011 | Sawahashi et al. | |
| 2012/0014330 A1 | 1/2012 | Damnjanovic et al. | |
| 2012/0115526 A1 | 5/2012 | Ogawa et al. | |
| 2012/0250559 A1 | 10/2012 | Wu et al. | |
| 2012/0257590 A1 | 10/2012 | Ishii et al. | |
| 2012/0281667 A1* | 11/2012 | Chang | H04L 5/0098 370/329 |
| 2012/0287848 A1 | 11/2012 | Kim et al. | |
| 2012/0294213 A1 | 11/2012 | Chen et al. | |
| 2013/0070692 A1 | 3/2013 | Miki et al. | |
| 2013/0128852 A1 | 5/2013 | Xue et al. | |
| 2013/0182654 A1 | 7/2013 | Hariharan et al. | |
| 2013/0265982 A1* | 10/2013 | Fwu | H04W 4/70 370/329 |
| 2013/0308583 A1 | 11/2013 | Futagi et al. | |
| 2014/0098785 A1 | 4/2014 | Frenne et al. | |
| 2014/0153524 A1 | 6/2014 | Xu et al. | |
| 2014/0161004 A1 | 6/2014 | Wang et al. | |
| 2014/0219237 A1 | 8/2014 | Charbit et al. | |

FOREIGN PATENT DOCUMENTS

| | | |
|---|---|---|
| CN | 102088433 A | 6/2011 |
| CN | 102104465 A | 6/2011 |
| CN | 103733560 A | 4/2014 |
| CN | 107579809 A | 1/2018 |
| EP | 2523516 A1 | 11/2012 |
| JP | 2011-135234 A | 7/2011 |
| JP | 2013-515452 A | 5/2013 |
| TW | 201116123 A | 5/2011 |
| WO | 2007/083728 A1 | 7/2007 |
| WO | 2007/119591 A1 | 10/2007 |
| WO | 2010/050295 A1 | 5/2010 |
| WO | 2011/078185 A1 | 6/2011 |
| WO | 2011/082599 A1 | 7/2011 |
| WO | 2011/082671 A1 | 7/2011 |
| WO | 2011/084822 A1 | 7/2011 |

OTHER PUBLICATIONS

3rd Generation Partnership Project (3GPP), R1-100491, "Comparison of Carrier Segment and Extension Carrier for Contiguous Carrier Aggregation", NTT DoCoMo, 3GPP TSG RAN WG1 Meeting #59bis, Valencia, Spain, Jan. 18-22, 2010, pp. 1-5.

3rd Generation Partnership Project (3GPP), R1-100517, "Views on Carrier Types in LTE-A", ZTE, 3GPP TSG RAN WG1 Meeting #59bis, Valencia, Spain, Jan. 18-22, 2010, 5 pages.

3rd Generation Partnership Project (3GPP), R1-110031, "Remaining Details for CA-Based HetNets", Ericsson, ST Ericsson, 3GPP TSG RAN WG1 Meeting #63bis, Dublin, Ireland, Jan. 17-21, 2011, 4 pages.

3rd Generation Partnership Project (3GPP), R1-114044, "Design Considerations for Additional Carrier Types", Alcatel-Lucent, Alcatel-Lucent Shanghai Bell, 3GPP TSG RAN WG1 Meeting #67, San Francisco, USA, Nov. 14-18, 2011, pp. 1-4.

3rd Generation Partnership Project (3GPP), R1-121808, "Configurable Time-Frequency Locations for PSS/SSS Signals on the NCT", NEC Group, TSG-RAN WG1#68Bis, Jeju, Korea, Mar. 26-30, 2012, pp. 1-7.

3rd Generation Partnership Project (3GPP) TR 36.807 V0.1.0, "Technical Specification Group Radio Access Network, Evolved Universal Terrestrial Radio Access (E-UTRA), User Equipment (UE) Radio Transmission and Reception (Release 10)", Aug. 2010, pp. 1-94.

3rd Generation Partnership Project (3GPP) TS 36.211 V10.2.0, "Technical Specification Group Radio Access Network, Evolved Universal Terrestrial Radio Access (E-UTRA), Physical Channels and Modulation (Release 10)", Jun. 2011, pp. 1-103.

3rd Generation Partnership Project (3GPP) TS 36.212 V10.2.0, "Technical Specification Group Radio Access Network, Evolved Universal Terrestrial Radio Access (E-UTRA), Multiplexing and Channel Coding (Release 10)", Jun. 2011, pp. 1-78.

3rd Generation Partnership Project (3GPP) TS 36.212 V2.0.0, "Technical Specification Group Radio Access Network, Evolved Universal Terrestrial Radio Access (E-UTRA), Multiplexing and Channel Coding (Release 8)", Sep. 2007, pp. 1-30.

3rd Generation Partnership Project (3GPP) TS 36.213 V10.2.0, "Technical Specification Group Radio Access Network, Evolved Universal Terrestrial Radio Access (E-UTRA), Physical Layer Procedures (Release 10)", Jun. 2011, pp. 1-120.

3rd Generation Partnership Project (3GPP) TS 36.213 V9.1.0, "Technical Specification Group Radio Access Network, Evolved Universal Terrestrial Radio Access (E-UTRA), Physical Layer Procedures (Release 9)", Mar. 2010, pp. 1-79.

3rd Generation Partnership Project (3GPP) TS 36.321 V10.2.0, "Technical Specification Group Radio Access Network, Evolved Universal Terrestrial Radio Access (E-UTRA), Medium Access Control (MAC) Protocol Specification (Release 10)", Jun. 2011, pp. 1-54.

3rd Generation Partnership Project (3GPP) Ts 36.331 V10.2.0, "Technical Specification Group Radio Access Network, Evolved

(56) References Cited

OTHER PUBLICATIONS

Universal Terrestrial Radio Access (E-UTRA), Radio Resource Control (RRC), Protocol Specification (Release 10)", Jun. 2011, pp. 1-294.
CNIPA, "Downlink Resource Allocation for Flexible Bandwidth Operation in Wireless Systems", Examination Decision on Petition for Invalidation (No. 568088) of Chinese Patent No. 2024042600804480, Apr. 30, 2024, 23 pages.

\* cited by examiner

| P-subsets 2bits | n-Shift 1bit | Logic for shift | | | | | | | | | | | | | | | | | |
|---|---|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 | 16 | 17 |
| 0 | 0 | 0 | 1 | 2 | 9 | 10 | 11 | 18 | 19 | 20 | 27 | 28 | 29 | 36 | 37 | 38 | 45 | 46 | 47 |
| 1 | 0 | 3 | 4 | 5 | 12 | 13 | 14 | 21 | 22 | 23 | 30 | 31 | 32 | 39 | 40 | 41 | 48 | 49 | 50 |
| 2 | 0 | 6 | 7 | 8 | 15 | 16 | 17 | 24 | 25 | 26 | 33 | 34 | 35 | 42 | 43 | 44 | 51 | 52 | 53 |
| 0 | 1(4) | 10 | 11 | 18 | 19 | 20 | 27 | 28 | 29 | 36 | 37 | 38 | 45 | 46 | 47 | | | | |
| 1 | 1(3) | 12 | 13 | 14 | 21 | 22 | 23 | 30 | 31 | 32 | 39 | 40 | 41 | 48 | 49 | | | | |
| 2 | 1(1) | 7 | 8 | 15 | 16 | 17 | 24 | 25 | 26 | 33 | 34 | 35 | 42 | 43 | 44 | | | | |

| P | Shift | i | | | | | | | For shift | |
|---|---|---|---|---|---|---|---|---|---|---|
| 1 bit | 1 bit | 0 | 1 | 2 | 3 | 4 | 5 | 6 | 7 | 8 |
| 0 | 0 | 0(0,1) | 1(2,3) | 4(8,9) | 5(10,11) | 8(16,17) | 9(18,19) | 12(24,25) | 13(26,27) | 16(32,33) |
| 1 | 0 | 2(4,5) | 3(6,7) | 6(12,13) | 7(14,15) | 10(20,21) | 11(22,23) | 14(28,29) | 15(30,31) | 17(34,Null) |
| 0 | 1(2) | 4(8,9) | 5(10,11) | 8(16,17) | 9(18,19) | 12(24,25) | 13(26,27) | 16(32,33) | | |
| 1 | 1(2) | 6(12,13) | 7(14,15) | 10(20,21) | 11(22,23) | 14(28,29) | 15(30,31) | 17(34,N) | | |

FIG. 10

| P | Shift | i | | | | | | | For shift | |
|---|---|---|---|---|---|---|---|---|---|---|
| 1 bit | 1 bit | 0 | 1 | 2 | 3 | 4 | 5 | 6 | 7 | 8 |
| 0 | 0 | 0(0,1) | 1(4,5) | 4(8,9) | 5(12,13) | 8(16,17) | 9(20,21) | 12(24,25) | 13(28,29) | 16(32,33) |
| 1 | 0 | 2(2,3) | 3(6,7) | 6(10,11) | 7(14,15) | 10(18,19) | 11(22,23) | 14(26,27) | 15(30,31) | 17(34,Null) |
| 0 | 1(2) | 4 | 5 | 8 | 9 | 12 | 13 | 16 | | |
| 1 | 1(2) | 6 | 7 | 10 | 11 | 14 | 15 | 17 | | |

| P-subsets 2 bits | Shift 1 bit | | | | | i | | | | |
|---|---|---|---|---|---|---|---|---|---|---|
| | | 0 | 1 | 2 | 3 | 4 | 5 | 6 | 7 | 8 |
| 0 | 0 | 0 | 1 | 2 | 3 | 4 | 5 | 6 | 7 | 8 |
| 1 | 0 | 3 | 4 | 5 | 9 | 10 | 11 | 18 | 19 | 20 |
| 2 | 0 | 6 | 7 | 8 | 12 | 13 | 14 | 21 | 22 | 23 |
| 0 | 1 (3) | 9 | 10 | 11 | 15 | 16 | 17 | 24 | | |
| 1 | 1 (3) | 12 | 13 | 14 | 18 | 19 | 20 | | | |
| 2 | 1 (1) | 7 | 8 | 15 | 16 | 17 | 24 | | | |

FIG. 13

| 0 | 1 | | | 2 | | | 3 | | | 4 | | | 5 | | | 6 | | |
|---|---|---|---|---|---|---|---|---|---|---|---|---|---|---|---|---|---|---|
| 0 | 2 | 3 | 4 | 5 | 6 | 7 | 8 | 9 | 10 | 11 | 12 | 13 | 14 | 15 | 16 | 17 | 18 | 19 | 20 |

| 7 | | | 8 | | | 9 | | | 10 | | | 11 | | |
|---|---|---|---|---|---|---|---|---|---|---|---|---|---|---|
| 21 | 22 | 23 | 24 | 25 | 26 | 27 | 28 | 29 | 30 | 31 | 32 | 33 | 34 | Null |

FIG. 14

| P' 2 bits | Shift 1 bit | i | | | | | | | | | | For Shift | |
|---|---|---|---|---|---|---|---|---|---|---|---|---|---|
| | | 0 | 1 | 2 | 3 | 4 | 5 | 6 | 7 | 8 | 9 | 10 | 11 |
| 0 | 0 | 0 | 3 | 6 | 9 | 12 | 15 | 18 | 21 | 24 | 27 | 30 | 33 |
| 1 | 0 | 1 | 4 | 7 | 10 | 13 | 16 | 19 | 22 | 25 | 28 | 31 | 34 |
| 2 | 0 | 2 | 5 | 8 | 11 | 14 | 17 | 20 | 23 | 26 | 29 | 32 | Null |
| 0 | 1 | 9 | 12 | 15 | 18 | 21 | 24 | 27 | 30 | 33 | | | |
| 1 | 1 | 10 | 13 | 16 | 19 | 22 | 25 | 28 | 31 | 34 | | | |
| 2 | 1 | 11 | 14 | 17 | 20 | 23 | 26 | 29 | 32 | Null | | | |

| P' 2 bits | Shift 1 bit | 0 | 1 | 2 | 3 | i 4 | 5 | 6 | For Shift 7 | 8 | 9 |
|---|---|---|---|---|---|---|---|---|---|---|---|
| 0 | 0 | 0 | 4 | 8 | 12 | 16 | 20 | 24 | | | |
| 1 | 0 | 1 | 5 | 9 | 13 | 17 | 21 | 25 | | | |
| 2 | 0 | 2 | 6 | 10 | 14 | 18 | 22 | 26 | | | |
| 3 | 0 | 3 | 7 | 11 | 15 | 19 | 23 | 27 | | | |
| 0 | 1 | 12 | 16 | 20 | 24 | 28 | 32 | 36 | 28 | 32 | 36 |
| 1 | 1 | 13 | 17 | 21 | 25 | 29 | 33 | 37 | 29 | 33 | 37 |
| 2 | 1 | 14 | 18 | 22 | 26 | 30 | 34 | 38 | 30 | 34 | 38 |
| 3 | 1 | 15 | 19 | 23 | 27 | 31 | 35 | 39 | 31 | 35 | 39 |

FIG. 17

FLEXIBLE BANDWIDTH OPERATION IN WIRELESS SYSTEMS

CROSS-REFERENCE TO RELATED APPLICATIONS

This application is a continuation of U.S. patent application Ser. No. 16/815,396, filed Mar. 11, 2020, which is a continuation of U.S. patent application Ser. No. 15/809,784, filed Nov. 10, 2017, which issued as U.S. Pat. No. 10,624,093 on Apr. 14, 2020, which is a continuation of U.S. patent application Ser. No. 14/520,121, filed Oct. 21, 2014, which is a continuation of U.S. patent application Ser. No. 13/571,656, filed Aug. 10, 2012, which issued as U.S. Pat. No. 8,897,253 on Nov. 25, 2014, which claims the benefit of U.S. Provisional Patent Application No. 61/522,883, filed Aug. 12, 2011, U.S. Provisional Patent Application No. 61/555,887, filed Nov. 4, 2011, and U.S. Provisional Patent Application No. 61/611,244, filed Mar. 15, 2012, the contents of which are hereby incorporated by reference herein.

BACKGROUND

The Third Generation Partnership Project (3GPP) Long Term Evolution (LTE) standards provide specifications for high performance air interfaces for cellular mobile communication systems. LTE specifications are based on Global System for Mobile Communications (GSM) specifications and provide the upgrade path for 3G networks to evolve into partially-compliant 4G networks. LTE Advanced is an enhancement of the LTE standard that provides a fully-compliant 4G upgrade path for LTE and 3G networks.

A goal of 3GPPP and LTE is the simplification of the architecture of cellular mobile communication systems. One step in simplifying this architecture is transitioning from existing 3GPP universal mobile telecommunications system (UMTS) combined circuit and packet switched networks to pure internet protocol (IP) packet switched systems. Because the adoption of LTE is an ongoing process and many mobile devices are not yet compatible with LTE packet switched technologies, operators of LTE networks will typically run such networks in conjunction with circuit-switched networks. This allows network operators to service users of circuit-switched compatible devices as well as users of LTE compatible devices.

SUMMARY

Systems, methods, and instrumentalities are disclosed for downlink resource allocation associated with a shared frequency band. A WTRU may receive resource allocation information associated with a component carrier and at least one carrier segment. The component carrier and the least one carrier segment may each comprise a plurality of resource block groups (RBG). A size of a resource block group (RBG) of the component carrier and a RBG of the at least one carrier segment may be determined by a function of bandwidth of the component carrier. At least two bitmaps may be associated with the resource allocation information. The WTRU may determine at least one RBG allocated to the WTRU using the resource allocation information. The WTRU may receive and decode the at least one RBG allocated to the WTRU.

The resource allocation information may comprise two bitmaps. A first bitmap may be associated with the RBGs of the component carrier and the RBGs of a first carrier segment. A second bitmap may be associated with the RBGs of a second carrier segment. A number of bits/RBG for the first bitmap may be equal to a combined number of resource blocks (RB) in the component carrier and first carrier segment divided by the size of the RBG. A number of bits/RBG for the second bitmap may be equal to a number of resource blocks (RB) in the second carrier segment divided by the size of the RBG. If a number of RBGs of the second carrier segment is not an integer multiple of the size of the RBGs, then a number of null RBs may be inserted into a last RBG of the second carrier segment such that the number of null RBs plus the number of RBs of the second carrier segment is divisible by the size of the RBGs. The number of null RBs may be variable.

The resource allocation information may comprise three bitmaps. A first bitmap may be associated with the RBGs of a component carrier. A second bitmap may be associated with the RBGs of a first carrier segment. A third bitmap may be associated with the RBGs of a second carrier segment. A number of bits/RBG for the first bitmap, the second bitmap, and the third bitmap may be the number of resource blocks (RB) in the respective carrier divided by the size of the RBG. If the number of RBGs of the component carrier, the first carrier segment, and/or the second carrier segment is not an integer multiple of the size of the RBGs, then a number of null RBs may be inserted into the last RBG of the respective carrier such that the number of null RBs plus the number of RBs of the respective carrier is divisible by the size of the RBGs.

A WTRU may receive resource allocation information associated with a component carrier and at least one carrier segment. The component carrier and the least one carrier segment comprising a plurality of resource block groups (RBG). A size of a resource block group (RBG) of the component carrier and the at least one carrier segment may be based on a scaling factor multiplied by a 3GPP Rel-10 RBG size of the component carrier. The 3GPP Rel-10 RBG size may be determined by the system bandwidth of the component carrier. The WTRU may determine at least one RBG allocated to the WTRU using the resource allocation information. The WTRU may receive and decode the at least one RBG allocated to the WTRU.

The scaling factor may be determined by the maximum number of resource blocks (RB) of the component carrier and the one or more carrier segments. If a combined number of RBs of the one or more carrier segments is less than or equal to the number of RBs of the component carrier, then the scaling factor may be two. If a combined number of RBs of the one or more carrier segments is greater than the number of RBs of the component carrier, then the scaling factor may be x, wherein x equals a combined number of RBs of the component carrier and the one or more carrier segments divided by a number of RBs of the component carrier.

The resource allocation information may be associated with a bitmap. A number of bits for the bitmap may be determined by a combined number of RBs of the component carrier and the one or more carrier segments divided by the size of a RBG. Two or more consecutive RBs may be grouped together into a RBG element according to the size of the RBG. A RB may be grouped together with one or more nonconsecutive RB into a RBG element according to the size of the RB G.

A WTRU may receive resource allocation information associated with a component carrier and at least one carrier segment. The component carrier and the least one carrier segment may comprise a plurality of resource block groups (RBG). A size of a RBG of the component carrier and the at least one carrier segment may be based on a combined number of resource blocks (RB) of the component carrier and the one or more carrier segments divided by a 3GPP Rel-10 RBG size of the component carrier. The 3GPP Rel-10 RBG size may be determined by the system bandwidth of the component carrier. The WTRU may determine at least one RBG allocated to the WTRU using the resource allocation information. The WTRU may receive and decode the at least one RBG allocated to the WTRU.

BRIEF DESCRIPTION OF THE DRAWINGS

FIG. 2 is a diagram illustrating example resource block assignment information.

FIGS. 7 to 17 are diagrams illustrating example bitmapping.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
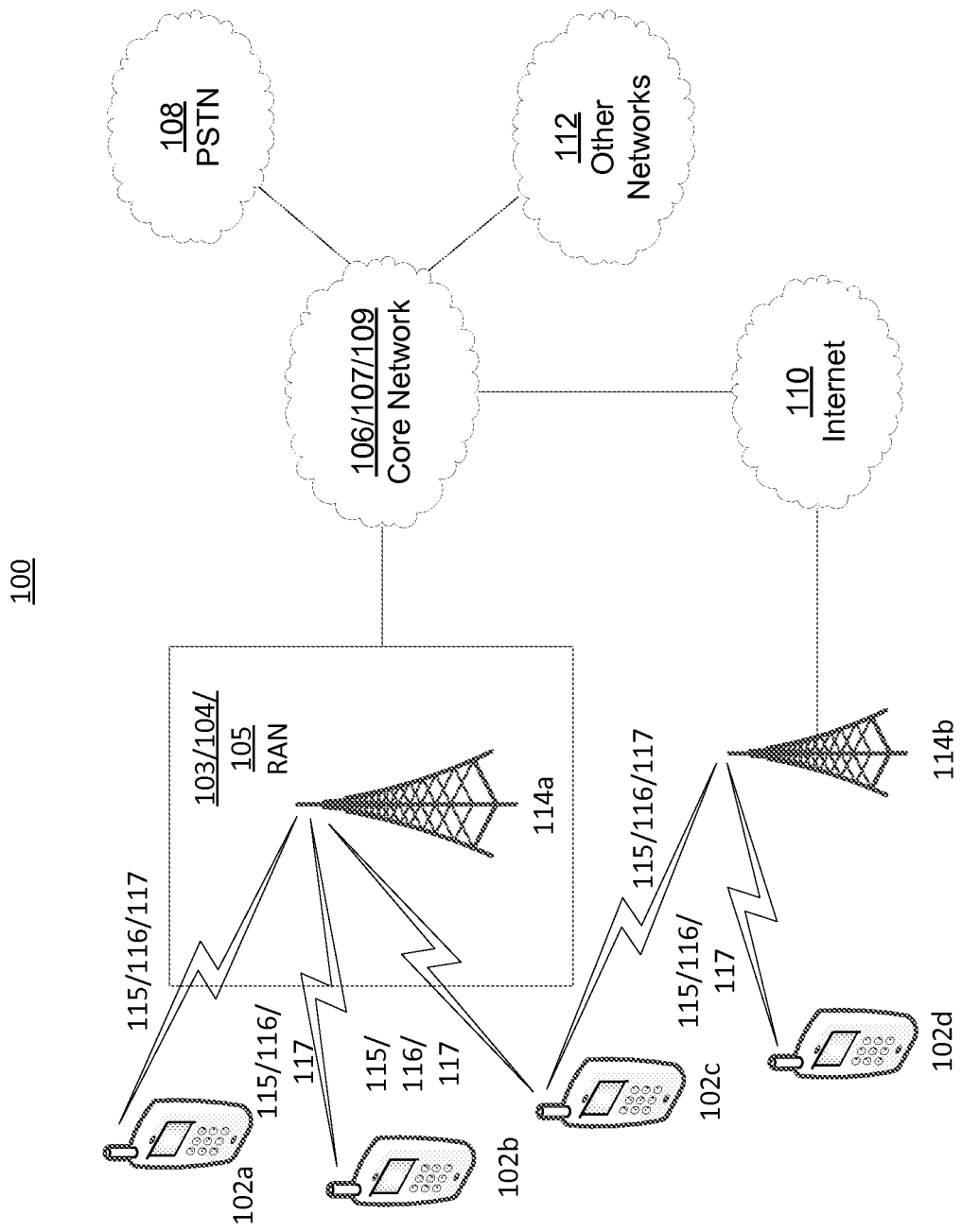
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UNITS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
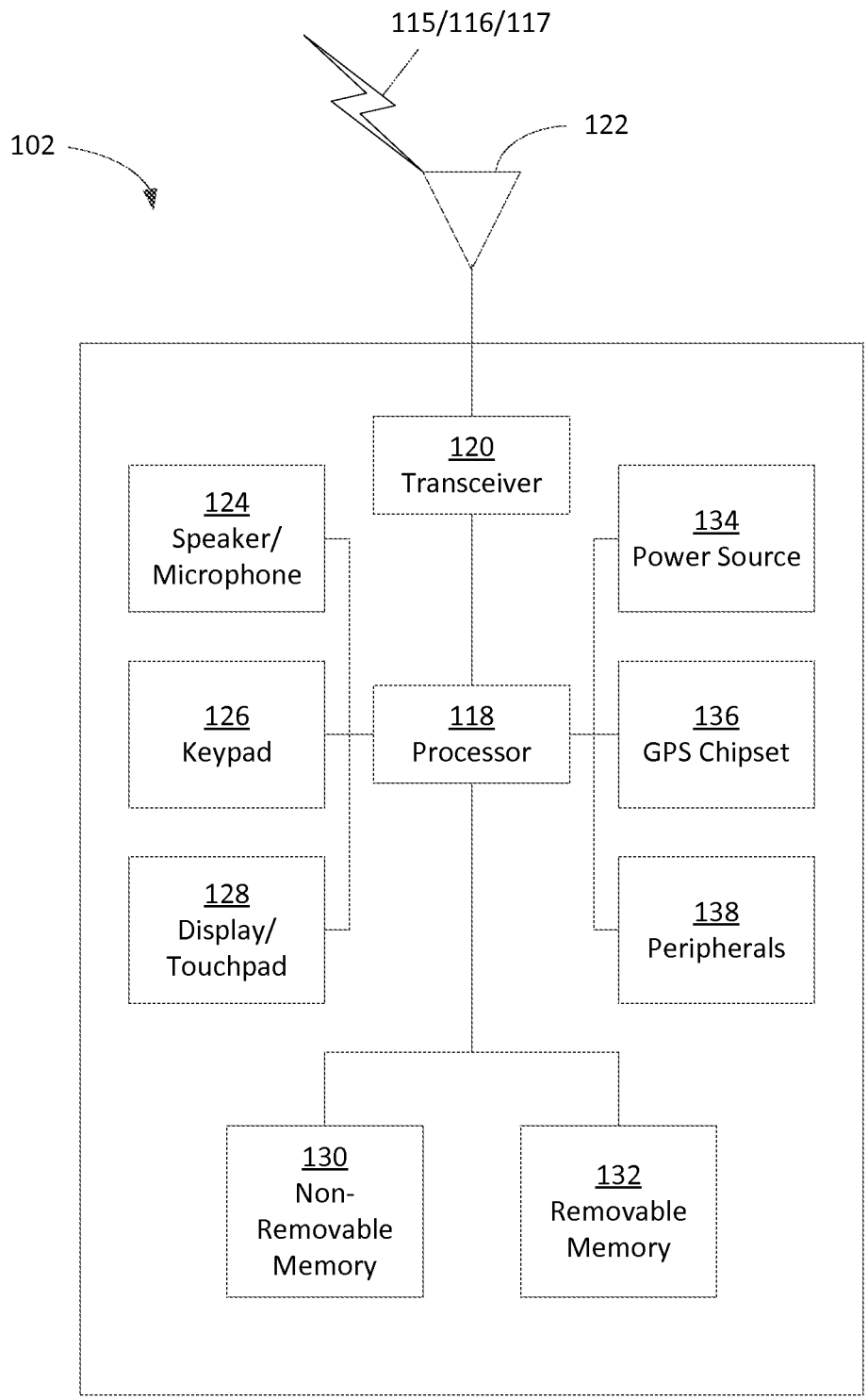
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
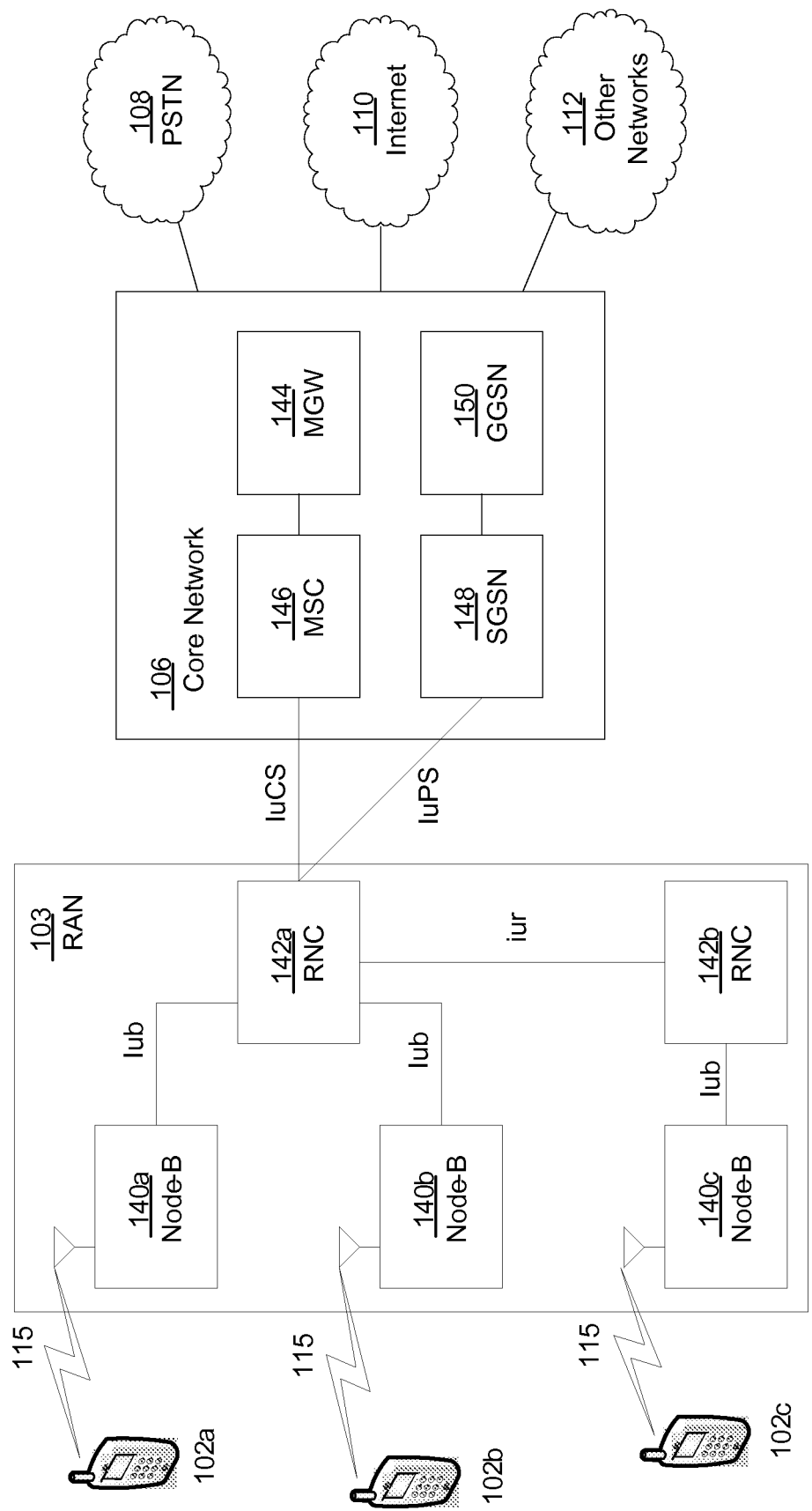
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
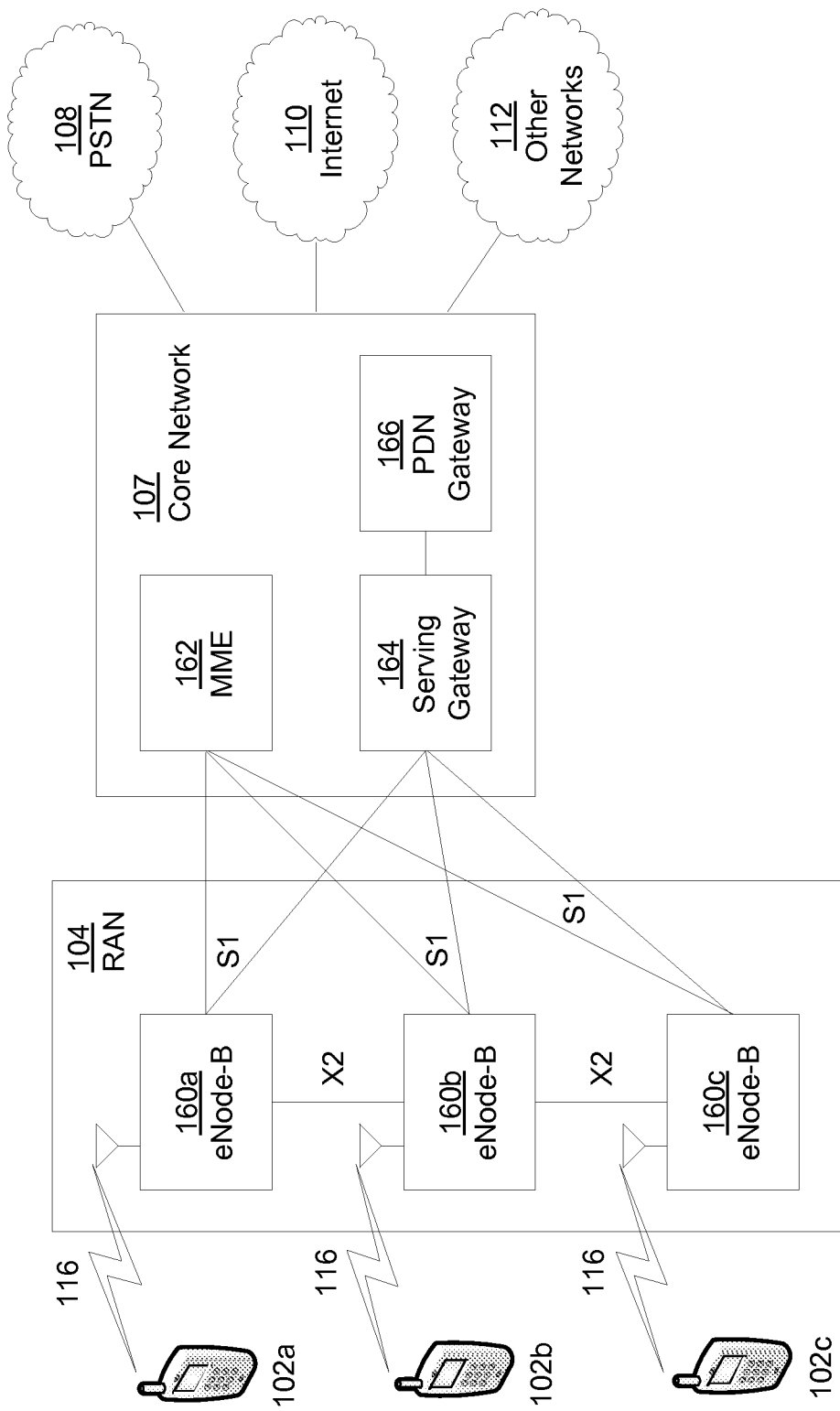
FIG. 1D is a system diagram of another example radio access network and another example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
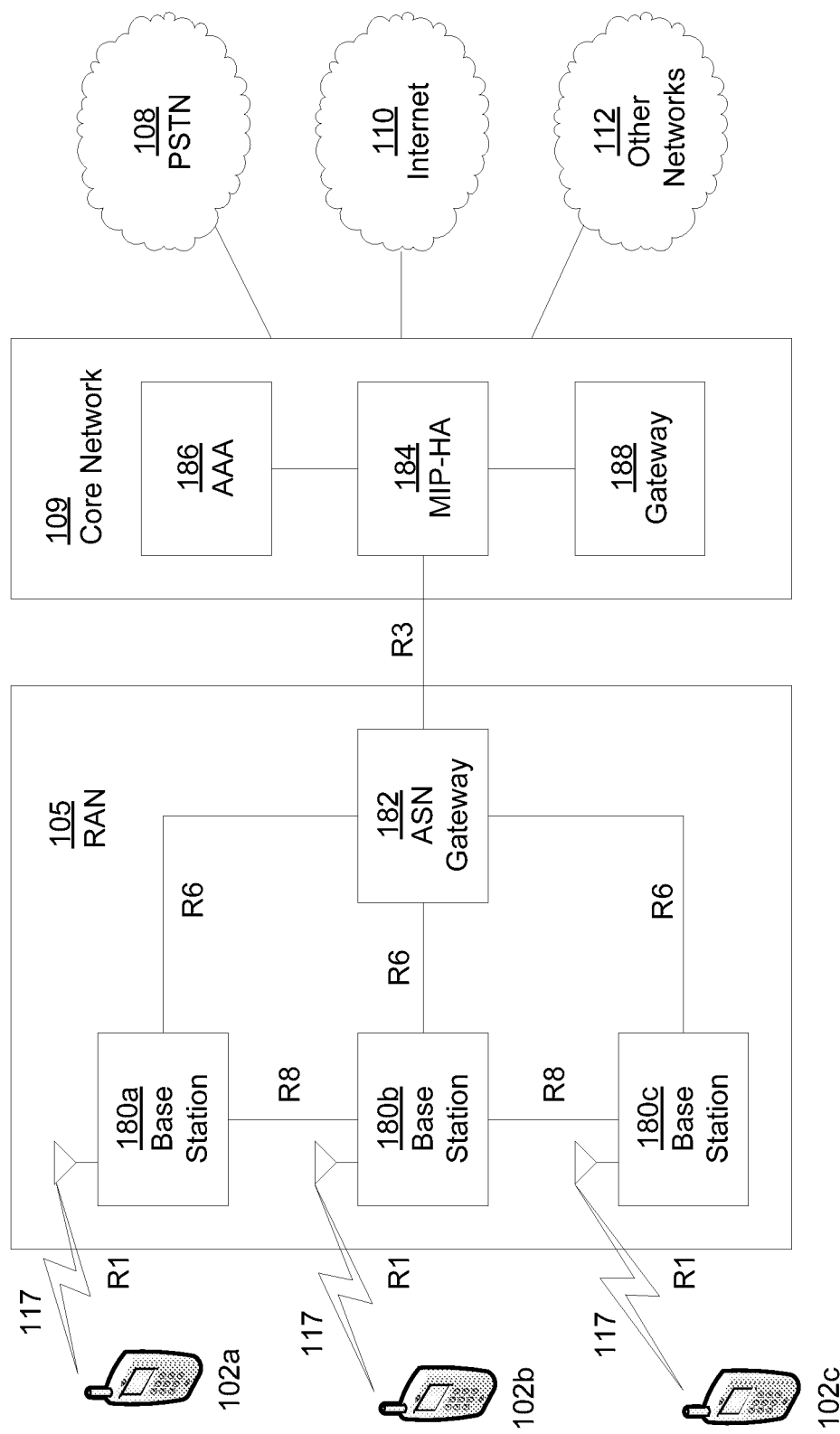
FIG. 1E is a system diagram of another example radio access network and another example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

3GPP LTE Release 8/9/10/11 operating with a single serving cell (hereafter LTE R8+) may support, for example, up to 100 Mbps in the downlink (hereafter DL) and 50 Mbps in the uplink (hereafter UL) for a 2×2 configuration. The LTE downlink transmission scheme may be based on an OFDMA air interface. For the purpose of flexible deployment, LTE R8+ systems may support scalable transmission bandwidths, for example, one of: 1.4, 2.5, 5, 10, 15 or 20 MHz with 6, 15, 25, 50, 75, 100 resource blocks, respectively.

In LTE R8+ (and LTE R10+ with carrier aggregation), each radio frame (of 10 ms) may consist of 10 equally sized sub-frames of 1 ms. Each sub-frame may consist of two equally sized timeslots of 0.5 ms each. There may be either 7 or 6 OFDM symbols per timeslot. For example, 7 symbols per timeslot may be used with normal cyclic prefix (CP) length, and 6 symbols per timeslot may be used in an alternative system configuration with the extended CP length. The sub-carrier spacing for the LTE R8/9 system may be 15 kHz. An alternative reduced sub-carrier spacing mode using 7.5 kHz may also be possible.

A resource element (RE) may correspond to one (1) sub-carrier during one (1) OFDM symbol interval. 12 consecutive sub-carriers during a 0.5 ms timeslot may constitute one (1) resource block (RB). For example, with 7 symbols per timeslot, each RB may consist of 12*7=84 RE's. A DL carrier may include a scalable number of resource blocks (RBs), ranging from a minimum of 6 RBs up to a maximum of 110 RBs, for example. This may correspond to an overall scalable transmission bandwidth of roughly 1 MHz up to 20 MHz. A set of common transmission bandwidths may be specified (e.g., 1.4, 3, 5, 10, 15 and/or 20 MHz).

The basic time-domain unit for dynamic scheduling may be one sub-frame consisting of two consecutive timeslots. This may be referred to as a resource-block pair. Certain sub-carriers on some OFDM symbols may be allocated to carry pilot signals in the time-frequency grid. For example, a given number of sub-carriers at the edges of the transmission bandwidth may not be transmitted in order to comply with spectral mask uses.

Scheduling principles and downlink control signalling may be described herein. For example, in a LTE R8+ system, the NW may control physical radio resources using the Physical Downlink Control Channel (hereafter PDCCH). Control messages may be transmitted using specific formats (e.g., DCI formats). For example, the WTRU may determine whether or not it is to act on control signaling in a given sub-frame by monitoring the PDCCH for specific data control information messages (hereafter DCI formats) scrambled using a known radio network temporary identifier (hereafter RNTI) in specific locations, and/or search space, using different combinations of physical resources (e.g., control channel elements—hereafter CCEs) based on aggregation levels (hereafter AL, each corresponding to either 1, 2, 4, or 8 CCEs). A CCE may consist of 36 QPSK symbols or 72 channel coded bits.

Which DCI formats the WTRU decodes may depend on the configured transmission mode (e.g., whether or not spatial multiplexing is used). There may be a number of different DCI formats (e.g., format 0 (UL grant), formats 1 (non-MIMO), formats 2 (DL MIMO) and/or formats 3 (power control)). The format of the control messages may be defined in 3GPP TS 36.212: "Evolved Universal Terrestrial Radio Access (E-UTRA); Multiplexing and Channel Coding," the contents of which are herein incorporated by reference.

The version of one or more of the DCI format(s) the WTRU decodes may be governed at least in part by the configured transmission mode (e.g., modes 1-7 for R8 and R9).

A list with usage may be presented below:
(1) DCI format 0 (UL grant)
(2) DCI format 1 (DL assignment)
(3) DCI format 1A (compact DL assignment/PDCCH order for random access)
(4) DCI format 1B (DL assignment with precoding info)
(5) DCI format 1C (very compact DL assignment)
(6) DCI format 1D (compact DL assignment with precoding info+power offset information)
(7) DCI format 2 (DL assignment for spatial multiplexing)
(8) DCI format 2A
(9) DCI format 3 (TPC for PUCCH/PDSCH, two bits)
(10) DCI format 3A (TPC for PUCCH/PDSCH, single bit)

Table 1 illustrates examples of different DCI sizes resulting from different system bandwidth configurations.

TABLE 1

| Bandwidth | 6 | 15 | 25 | 50 | 75 | 100 |
| --- | --- | --- | --- | --- | --- | --- |
| Format 0 | 37 | 38 | 41 | 43 | 43 | 44 |
| Format 1A | 37 | 38 | 41 | 43 | 43 | 44 |
| Format 3/3A | 37 | 38 | 41 | 43 | 43 | 44 |
| Format 1C | 24 | 26 | 28 | 29 | 30 | 31 |
| Format 1 | 35 | 39 | 43 | 47 | 49 | 55 |
| Format 1B (2 tx ant) | 38 | 41 | 43 | 44 | 45 | 46 |
| Format 1D (2 tx ant) | 38 | 41 | 43 | 44 | 45 | 46 |
| Format 2 (2 tx ant) | 47 | 50 | 55 | 59 | 61 | 67 |
| Format 2A (2 tx ant) | 44 | 47 | 52 | 57 | 58 | 64 |
| Format 1B (4 tx ant) | 41 | 43 | 44 | 46 | 47 | 49 |
| Format 1D (4 tx ant) | 41 | 43 | 44 | 46 | 47 | 49 |
| Format 2 (4 tx ant) | 50 | 53 | 58 | 62 | 64 | 70 |
| Format 2A (4 tx ant) | 46 | 49 | 54 | 58 | 61 | 66 |

For example, in LTE R8+ systems, whether the control signaling received on PDCCH pertains to the uplink component carrier or to the downlink component carrier may be related to the format of the DCI decoded by the WTRU. The DCI formats may be used to control the WTRUs communication on the uplink component carrier and/or on the downlink component carrier of the cell on which the WTRU is connected.

Downlink transmission modes may be described herein. For example, in LTE systems, a number of multi-antenna transmission modes may be supported. Each mode may be referred to as a transmission mode. Each mode may differ in how the input to each antenna port is mapped as well as what reference signals may be used for demodulation. The following transmission modes (hereafter TM) may be defined for DL-SCH transmissions:
(1) TM1: Single-antenna transmission.
(2) TM2: Transmit diversity.
(3) TM3: Open-loop codebook-based precoding, if more than one layer, else transmit diversity if rank-one transmission.
(4) TM4: Closed-loop codebook-based precoding.
(5) TM5: Multi-user-MIMO version of TM4.
(6) TM6: Codebook-based precoding limited to single layer transmission.
(7) TM7: R8 non-codebook-based precoding with single layer transmission.
(8) TM8: R9 non-codebook-based precoding supporting up to two layers.
(9) TM9: R10 non-codebook-based precoding supporting up to eight layers.

The WTRU may interpret the resource allocation field depending on the PDCCH DCI format detected. A resource allocation field in each PDCCH may include at least a resource allocation header field and information consisting of the actual resource block assignment. PDCCH DCI formats 1, 2, 2A, 2B and 2C with type 0 and PDCCH DCI formats 1, 2, 2A, 2B and 2C with type 1 resource allocation may have the same format and may be distinguished from each other via the single bit resource allocation header field which exists depending on the downlink system bandwidth, where type 0 may be indicated by 0 value and type 1 may be indicated otherwise. PDCCH with DCI format 1A, 1B, 1C and 1D may have a type 2 resource allocation while PDCCH with DCI format 1, 2, 2A, 2B and 2C may have type 0 or type 1 resource allocation. PDCCH DCI formats with a type 2 resource allocation may not have a resource allocation header field. The summary of the types may be described herein.

For example, as shown below, in resource allocations of type 0, resource block assignment information may include a bitmap indicating the resource block groups (RBGs) that are allocated to the scheduled WTRU where a RBG0 may be a set of consecutive virtual resource blocks (VRBs) of localized type. Resource block group size (P) may be a function of the system bandwidth, for example, as shown in Table 2. Table 2 illustrates an example of Type 0 Resource Allocation RBG Size vs. Downlink System Bandwidth.

TABLE 2

| System Bandwidth $N_{RB}^{DL}$ | RBG Size (P) |
|---|---|
| ≤10 | 1 |
| 11-26 | 2 |
| 27-63 | 3 |
| 64-110 | 4 |

The total number of RBGs ($N_{RBG}$) for downlink system bandwidth of $N_{RB}^{DL}$ may be given by $N_{RBG}=\lceil N_{RB}^{DL}/P \rceil$, where $\lfloor N_{RB}^{DL}/P \rfloor$ of the RBGs may be of size P, and if $N_{RB}^{DL}$ mod P>0 then one of the RBGs may be of size $N_{RB}^{DL}-P \cdot \lfloor N_{RB}^{DL}/P \rfloor$. For example, the bitmap may be of size $N_{RBG}$ bits with one bitmap bit per RBG such that each RBG may be addressable. The RBGs may be indexed in the order of increasing frequency and non-increasing RBG sizes starting at the lowest frequency. For example, the order of RBG to bitmap bit mapping may be such that RBG 0 to RBG $N_{RBG}-1$ may be mapped to most significant bit (MSB) to least significant bit (LSB) of the bitmap. The RBG may be allocated to the WTRU if the corresponding bit value in the bitmap is 1 and the RBG is not allocated to the WTRU otherwise.

The Type 0 Resource allocation field in a DCI format is illustrated as follows:

| Type 0 Resource Allocation Field | |
|---|---|
| Type | Bitmap |

In resource allocations of type 1, resource block assignment information of size $N_{RBG}$ may indicate to a scheduled WTRU the VRBs from the set of VRBs from one of P RBG subsets. The virtual resource blocks used may be of localized type. P may be the RBG size associated with the system bandwidth, for example, as shown in Table 2. A RBG subset p, where 0≤p<P, may consist of the P th RBG (e.g., every P th RBG) starting from RBG p. The resource block assignment information may consist of one or more fields, for example, as shown in FIG. 2. Referring to FIG. 2, the first field with $\lceil \log_2(P) \rceil$ bits may be used to indicate the selected RBG subset among P RBG subsets. The second field with one bit may be used to indicate a shift of the resource allocation span within a subset. For example, a bit value of 1 may indicate shift is triggered and/or shift is not triggered. The third field may include a bitmap, for example, where each bit of the bitmap may address a single VRB in the selected RBG subset such that the MSB to the LSB of the bitmap may be mapped to the VRBs in the increasing frequency order. For example, the VRB may be allocated to the WTRU if the corresponding bit value in the bit field is 1, otherwise the VRB may not be allocated to the WTRU. The portion of the bitmap used to address VRBs in a selected RBG subset may have size $N_{RB}^{TYPE1}$ and may be defined as $N_{RB}^{TYPE1}=\lceil N_{RB}^{DL}/P \rceil - \lceil \log_2(P) \rceil - 1$.

For example, the addressable VRB numbers of a selected RBG subset may start from an offset, $\Delta_{shift}(p)$ to the smallest VRB number within the selected RBG subset, which may be mapped to the MSB of the bitmap. The offset may be in terms of the number of VRBs and may be done within the selected RBG subset. If the value of the bit in the second field for shift of the resource allocation span is set to 0, the offset for RBG subset p may be given by $\Delta_{shift}(p)=0$. Otherwise, the offset for RBG subset p may be given by, for example, $\Delta_{shift}(p)=N_{RB}^{RBG\ subset}(p)-N_{RB}^{TYPE1}$ where the LSB of the bitmap may be justified with the highest VRB number within the selected RBG subset. $N_{RB}^{RBG\ subset}(p)$ may be the number of VRBs in RBG subset p and may be calculated by:

$$N_{RB}^{RBGsubset}(p) = \begin{cases} \left\lfloor \frac{N_{RB}^{DL}-1}{P^2} \right\rfloor \cdot P + P, & p < \left\lfloor \frac{N_{RB}^{DL}-1}{P} \right\rfloor \bmod P \\ \left\lfloor \frac{N_{RB}^{DL}-1}{P^2} \right\rfloor \cdot P + (N_{RB}^{DL}-1) \bmod P + 1, & p = \left\lfloor \frac{N_{RB}^{DL}-1}{P} \right\rfloor \bmod P \\ \left\lfloor \frac{N_{RB}^{DL}-1}{P^2} \right\rfloor \cdot P, & p > \left\lfloor \frac{N_{RB}^{DL}-1}{P} \right\rfloor \bmod P \end{cases}$$

For example, when RBG subset p may be indicated, bit i for i=0, 1, . . . , $N_{RB}^{TYPE1}-1$ in the bitmap field may indicate the VRB number, $$N_{VRB}^{RBG\,subset}(p) = \left\lfloor \frac{i + \Delta_{shift}(p)}{P} \right\rfloor P^2 + p \cdot P + (i + \Delta_{shift}(p)) \bmod P.$$

Type 1 Resource allocation field in a DCI format in illustrated below:

| Type 1 Resource allocation field | | | |
|---|---|---|---|
| Type | Subset | Shift | Bitmap |

The following example ($N_{RB}^{DL}=50$) may illustrate how to construct type 1 RA based on the above R10 algorithms. From Table 2, for $N_{RB}^{DL}=50$, the RBG subsets P may be 3, which uses $\lceil \log_2 P \rceil = 2$ bits and the size of bitmap may be calculated by subtracting the number of bits for the subset field and 1 bit for the shift field as $N_{RBG} = \lceil N_{RB}^{DL}/P \rceil - \lceil \log_2 P \rceil - 1 = 4$ bits. FIG. 2 may show RB numbers per subset with the shift bit (reset/set). The first 3 (P=3) consecutive RBs (0 to 2) may be assigned to the subset 0, the next 3 consecutive RBs (3 to 5) to the subset 1, the next 3 consecutive RBs (6 to 8) to the subset 2. The procedure may be repeated until the bitmaps (e.g., all bitmaps) are filled. In order to obtain a shift value for each subset, extra columns (the last 4 columns of 14 to 17) may be extended until the last valid RB (49 for $N_{RB}^{DL}=50$) may be filled with its group of nine ($=P^2$) RBs (45 to 53). A shift value may be extracted by shifting valid RBs into the bitmap. For example, 4 shifts of valid RBs (38 to 47) for subset 0, 3 shifts of (41 to 49) for subset 1, and 1 shift of (44) for subset 2.

For example, in resource allocations of type 2, the resource block assignment information may indicate to a scheduled WTRU a set of contiguously allocated localized virtual resource blocks and/or distributed virtual resource blocks. In case of resource allocation signaled with PDCCH DCI format 1A, 1B and/or 1D, one bit flag may indicate whether localized virtual resource blocks and/or distributed virtual resource blocks may be assigned (e.g., value 0 may indicate Localized and value 1 may indicate Distributed VRB assignment) while distributed virtual resource blocks may be assigned (e.g., always assigned) in case of resource allocation signaled with PDCCH DCI format 1C. Localized VRB allocations for a WTRU may vary from a single VRB up to a maximum number of VRBs spanning the system bandwidth. For DCI format 1A, the distributed VRB allocations for a WTRU may vary from a single VRB up to $N_{VRB}^{DL}$ VRBs, where $N_{VRB}^{DL}$ may be defined in 3 GPP TS 36.212, if the DCI CRC is scrambled by P-RNTI, RA-RNTI, and/or SI-RNTI. With PDCCH DCI format 1B, 1D, and/or 1A with a CRC scrambled with C-RNTI, distributed VRB allocations for a WTRU may vary from a single VRB up to $N_{VRB}^{DL}$ VRBs, if $N_{RB}^{DL}$ may be 6-49 and may vary from a single VRB up to 16, if $N_{RB}^{DL}$ may be 50-110. With PDCCH DCI format 1C, distributed VRB allocations for a WTRU may vary from $N_{RB}^{step}$ VRB(s) up to $\lfloor N_{VRB}^{DL}/N_{RB}^{step} \rfloor \cdot N_{RB}^{step}$ VRBs with an increment step of $N_{RB}^{step}$, where $N_{RB}^{step}$ value may be determined depending on the downlink system bandwidth, for example, as shown in Table 3 illustrating $N_{RB}^{step}$ values vs. Downlink System Bandwidth.

TABLE 3

| System BW ($N_{RB}^{DL}$) | $N_{RB}^{step}$ DCI format 1C |
|---|---|
| 6-49 | 2 |
| 50-110 | 4 |

For PDCCH DCI format 1A, 1B and/or 1D, a type 2 resource allocation field may consist of a resource indication value (RIV) corresponding to a starting resource block ($RB_{start}$) and a length in terms of virtually contiguously allocated resource blocks $L_{CRBs}$. The resource indication value may be defined by:

if $(L_{CRBs}-1) \le \lfloor N_{RB}^{DL}/2 \rfloor$ then $RIV = N_{RB}^{DL}(L_{CRBs}-1) + RB_{start}$ else $RIV = N_{RB}^{DL}(N_{RB}^{DL}-L_{CRBs}+1) + (N_{RB}^{DL}-1-RB_{start})$ where $L_{CRBs} \ge 1$ and may not exceed $N_{VRB}^{DL}-RB_{start}$.

For PDCCH DCI format 1C, a type 2 resource block assignment field may consist of a resource indication value (RIV) corresponding to a starting resource block ($RB_{start}=0$, $N_{RB}^{step}, 2N_{RB}^{step}, \ldots, (\lfloor N_{VRB}^{DL}/N_{RB}^{step} \rfloor - 1)N_{RB}^{step}$) and a length in terms of virtually contiguously allocated resource blocks ($L_{CRBs}=N_{RB}^{step}, 2N_{RB}^{step}, \ldots, \lfloor N_{VRB}^{DL}/N_{RB}^{step} \rfloor \cdot N_{RB}^{step}$). The resource indication value may be defined by:

if $(L_{CRBs}'-1) \le \lfloor N_{VRB}^{DL'}/2 \rfloor$ then $RIV = N_{VRB}^{DL'}(L_{CRBs}'-1) + RB_{start}'$ else $RIV = N_{VRB}^{DL'}(N_{VRB}^{DL'}-L_{CRBs}'+1) + (N_{VRB}^{DL'}-1-RB_{start}')$ where $L_{CRBs}' = L_{CRBs}/N_{RB}^{step}$, $RB_{start}' = RB_{start}/N_{RB}^{step}$ and $N_{VRB}^{DL'} = \lfloor N_{VRB}^{DL}/N_{RB}^{step} \rfloor$.

Here, $L_{CRBs} \ge 1$ and may not exceed $N_{VRB}^{DL'}-RB_{start}'$.

Resource Allocation for PDCCH with uplink DCI Format. Two resource allocation schemes Type 0 and Type 1 may be supported for PDCCH with uplink DCI format where the selected resource allocation type for a decoded PDCCH may be indicated by a resource allocation type bit where type 0 may be indicated by 0 value and/or type 1 may be indicated otherwise. The WTRU may interpret the resource allocation field depending on, for example, the resource allocation type bit in the uplink PDCCH DCI format detected.

The resource allocation information for uplink resource allocation type 0 may indicate to a scheduled WTRU a set of contiguously allocated virtual resource block indices denoted by $n_{VRB}$. A resource allocation field in the scheduling grant may consist of a resource indication value (RIV) corresponding to a starting resource block ($PB_{START}$) and a length in terms of contiguously allocated resource blocks ($L_{CRBs} \ge 1$). The resource indication value may be defined by:

if $(L_{CRBs}-1) \le \lfloor N_{RB}^{UL}/2 \rfloor$ then $RIV = N_{RB}^{UL}(L_{CRBs}-1) + RB_{START}$ else $RIV = N_{RB}^{UL}(N_{RB}^{UL}-L_{CRBs}+1) + (N_{RB}^{UL}-1-RB_{START})$ The resource allocation information for uplink resource allocation type 1 may indicate to a scheduled WTRU two sets of resource blocks. For example, a set may include one or more consecutive resource block groups of size P, for example, as given in Table 2 for uplink system bandwidth $N_{RB}^{UL}$. A resource allocation field in the scheduling grant may consist of a combinatorial index r corresponding to a starting and ending RBG index of resource block set 1, $s_0$ and $s_1-1$, and resource block set 2, $s_2$ and $s_3-1$ respectively, where r may be given by:

$$r = \sum_{i=0}^{M-1} \binom{N-s_i}{M-i}$$

with M=4 and $N=\lceil N_{RB}^{UL}/P \rceil+1$. Below, ordering properties and range of values that $s_i$ (RBG indices) map to may be defined. A single RBG may be allocated for a set at the starting RBG index if the corresponding ending RBG index equals the starting RBG index.

For example, in LTE R8+ systems, the WTRU may receive a cell-specific downlink reference signal for different purposes. Cell-specific Reference Signals (hereafter CRS). A WTRU may use the CRS for channel estimation for coherent demodulation of any downlink physical channel. There may be an exception for PMCH and/or for PDSCH when configured with TM7, TM8 or TM9. The WTRU may use the CRS for channel state information (CSI) measurements. The WTRU may use the CRS for cell-selection and/or mobility-related measurements. CRS may be received in any subframes. There may be one CRS for each antenna ports (e.g., 1, 2, and/or 4). A CRS may occupy the first, third, and/or last OFDM symbol of each slot.

The WTRU may receive one or more of the following downlink reference signals. Demodulation Reference Signals (hereafter DM-RS). A WTRU-specific reference signal may be used for channel estimation for demodulation of PDSCH with TM7, TM8 and TM9. The DM-RS may be transmitted in the resource blocks assigned to the PDSCH transmission for the concerned WTRU.

CSI Reference Signals (hereafter CSI-RS). A WTRU may use the CSI-RS for channel state information measurements. CSI-RS may be used (e.g., only used) for TM9, and may be less densely transmitted by the network than the CRS.

Synchronization Signal and Physical Broadcast Channel (hereafter PBCH). The WTRU may obtain synchronization, may detect the identity of the cell (hereafter cell ID), and/or may determine the length (normal/extended) of the cyclic prefix using synchronization signals (e.g., which may be based on the difference in duration between the primary and the secondary synchronization signals).

Figure 3:
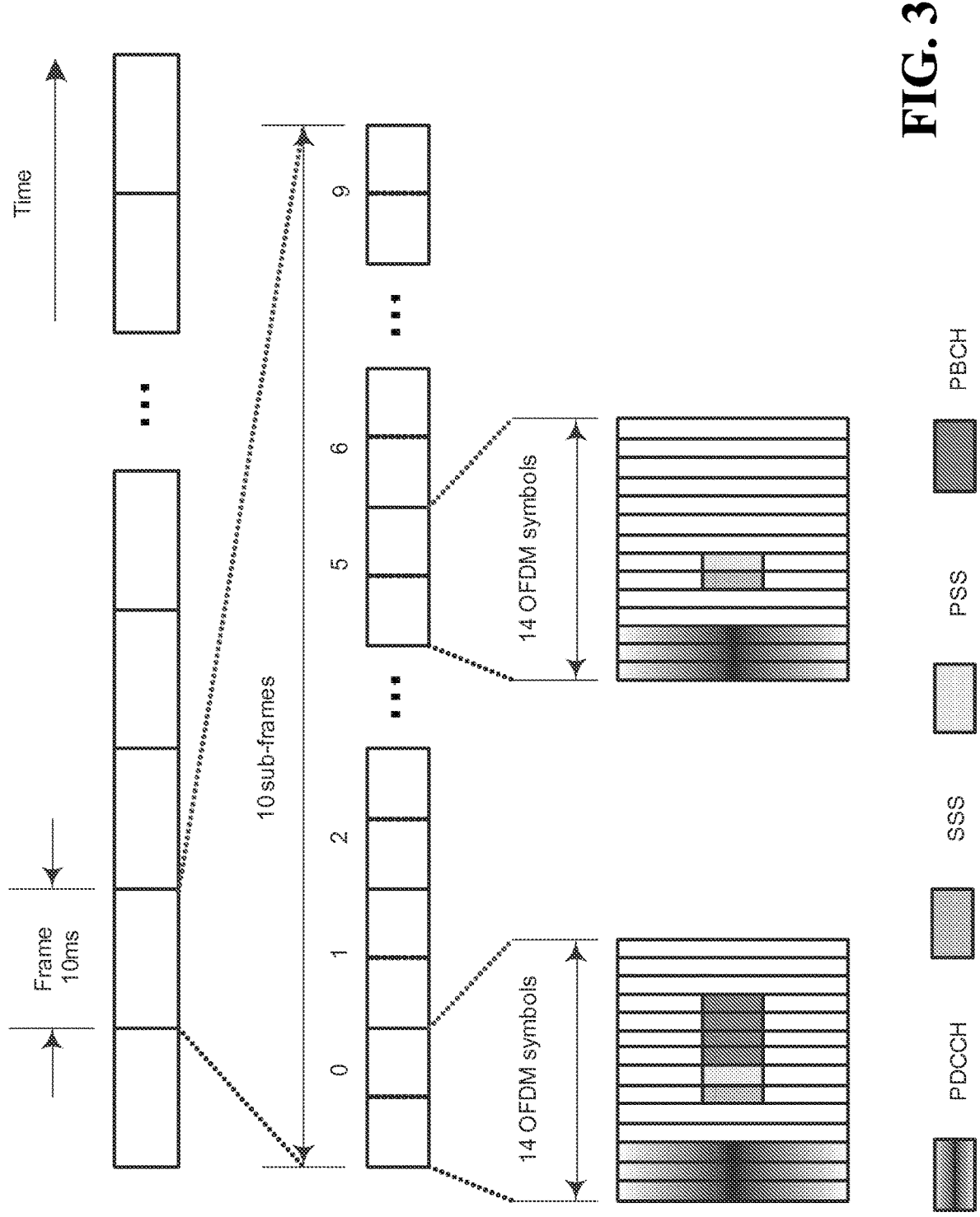
FIG. 3 is a diagram illustrating an example frame structure in LTE.

For example, the primary and secondary synchronization signals (i.e., PSS, SSS) may be transmitted on the 62 subcarriers out of 72 subcarriers (5 subcarriers on each side of edge may be reserved and not used) centered on the DC subcarrier in the last OFDM symbol and the 2nd last OFDM symbol of slot 0 and slot 10 of each frame respectively in FDD. An example of such may be shown in FIG. 3. Referring to FIG. 3, the PSS may be located in the 3rd OFDM symbol in subframes 1 and 6 and SSS in the last OFDM symbol in slot 1 and 11 in TDD.

A purpose of the synchronization signals may be to enable acquisition of the symbol timing and initial frequency of the downlink carrier signal. The synchronizations signals may convey information regarding the Cell ID.

There may be three PSS sequences defined in LTE. The one transmitted may be a function of the cell ID and may aid in the cell search process. The three PSSs may be constructed based on Zadoff-Chu (ZC) sequence $p_u(n)$ of length 62 (truncated from 63) extended with five zeros at the edges. The $d_u(n)$ sequence may be defined as:

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases}$$

where the ZC root sequence index u may be given by u={25,29,34} for $N_{ID}^{(2)}=\{0,1,2\}$ which may represent the physical-layer identity within the physical-layer cell-identity group.

Figure 4:
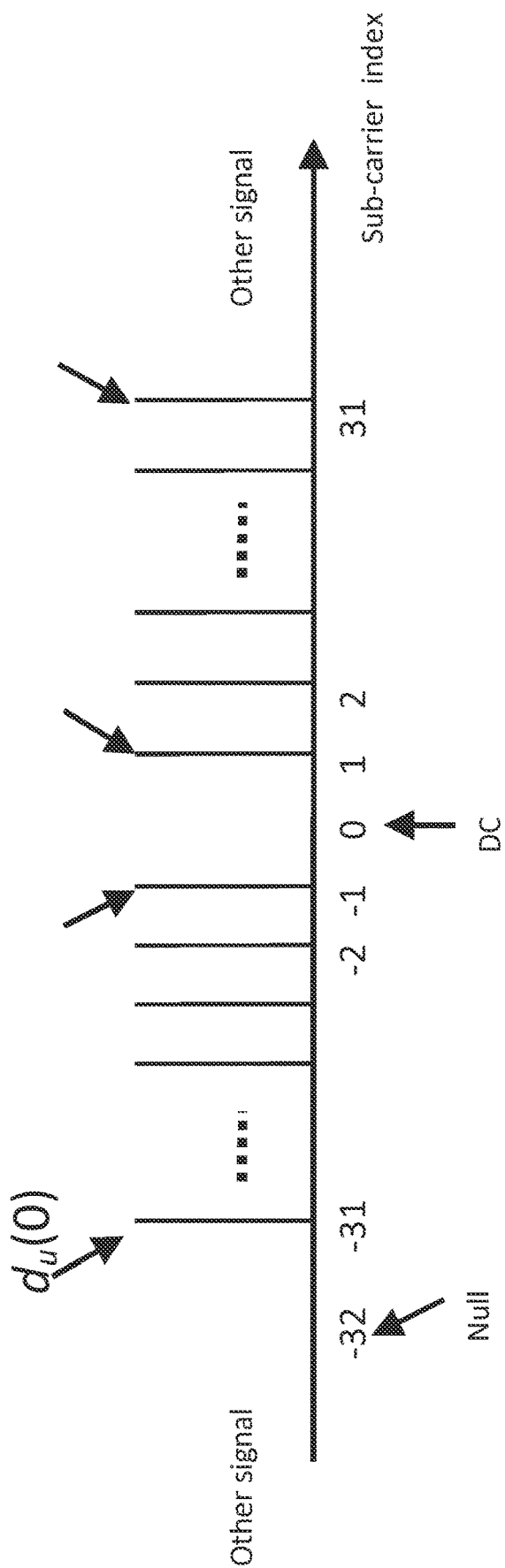
FIG. 4 is a diagram illustrating an example mapping of a PSS sequence to subcarriers.

FIG. 4 illustrates an example of the mapping of the $d_u(n)$ sequence to the central subcarriers around DC subcarrier in the frequency-domain.

LTE cell search step 1 may consist of one or more of the following tasks: Acquiring a coarse estimate of the carrier frequency offset (CFO); Acquiring a coarse estimate of the OFDM symbol timing offset (STO); and/or Detecting the Primary Synchronization Signal (PSS) index (i.e., cell identity within the cell-identity group which belongs to the set of $N_{ID}^{(2)}=\{0,1,2\}$).

Cell search step 1 may determine the 5 ms timing of the cell (i.e., half frame timing) and/or the location of the Secondary Synchronization Signal (SSS) that may be used by CS step 2. Cell Search Step 2 may extract one or more of the following information from the received SSS signals: Cell ID group, $N_{ID}^{(1)}=(0\sim167)$; Frame boundary (subframe 0 or 5); and/or CP length (short or long).

Figure 5:
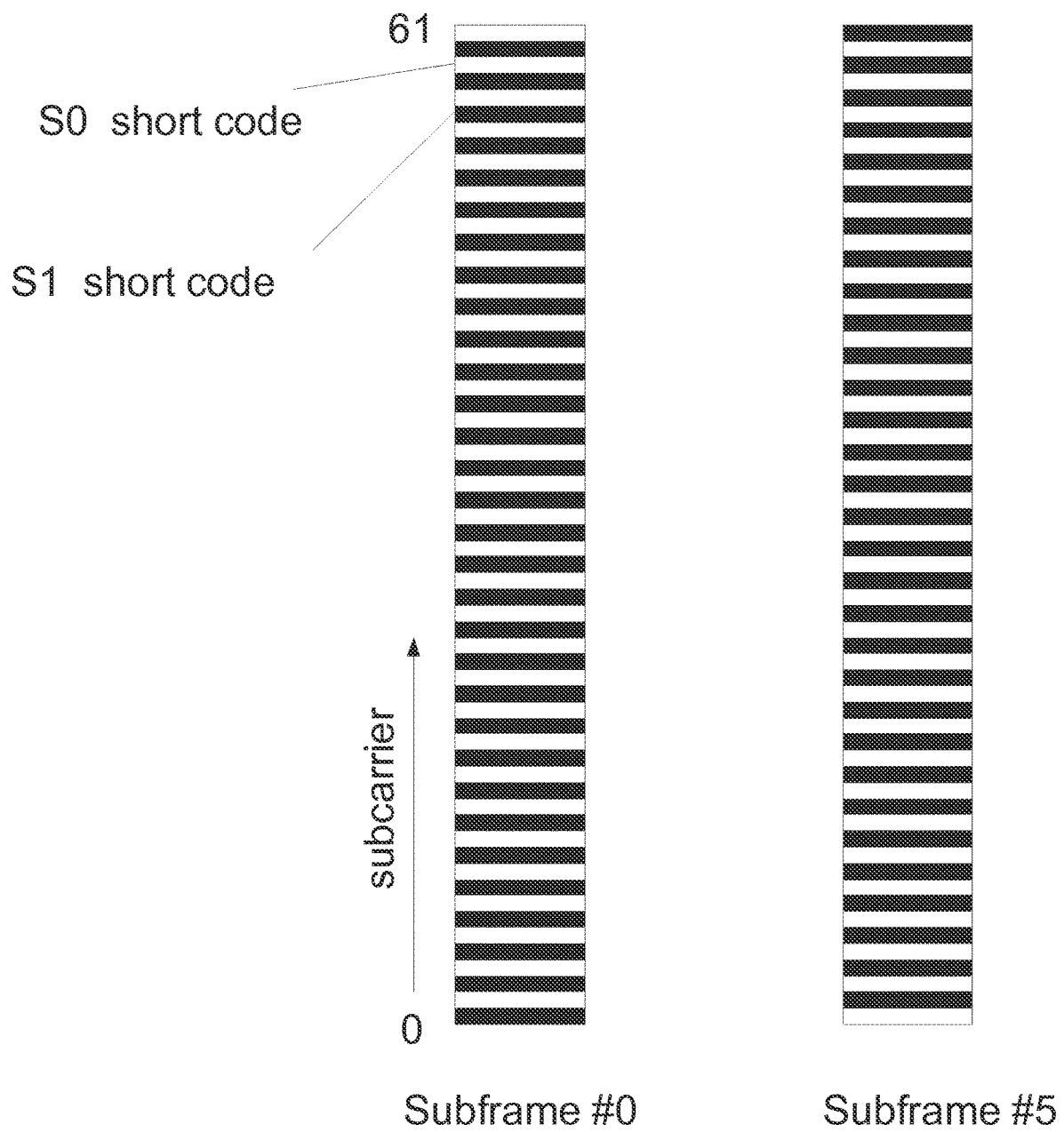
FIG. 5 is a diagram illustrating an example subcarrier mapping for two SSS short sequences.

The 62 subcarriers of SSS may be interlaced with two length-31 binary sequences, $s_0$ and $s_1$, for example, as shown in FIG. 5. Referring to FIG. 5, $s_1$ may be denoted by a white block, while $s_2$ may be denoted by a black block. The interlaced sequence may be scrambled with a scrambling sequence, $c_0$ and $c_1$, which may be given by the primary synchronization signal and then with a scrambling sequence, $z_1$. The combination of two length-31 sequences defining SSS signal may differ between subframe 0 and subframe 5 according to $$d(2n) = \begin{cases} s_0^{(m_0)}(n)c_0(n) & \text{in subframe 0} \\ s_1^{(m_1)}(n)c_0(n) & \text{in subframe 5} \end{cases}$$

$$d(2n+1) = \begin{cases} s_1^{(m_1)}(n)c_1(n)z_1^{(m_0)}(n) & \text{in subframe 0} \\ s_0^{(m_0)}(n)c_1(n)z_1^{(m_1)}(n) & \text{in subframe 5} \end{cases}$$

where $0 \leq n \leq 30$. The binary sequences ($s_0$, $s_1$), ($c_0$, $c_1$), and $z_1$ may be maximal length sequences generated according to a generation function of $x^5+x^2+1$, $x^5+x^3+1$, and $x^5+x^4+x^2+x+1$ respectively. The indices m0 and m1 may represent cyclic shifts and may be derived from the physical-layer cell-identity group $N_{ID}^{(1)}$.

Referring to FIG. 3, the coded BCH transport block may be mapped to the first subframe of each frame in four consecutive frames (40 ms timing) and may be transmitted within the first four OFDM symbols of the second slot of subframe 0 and over the 72 center subcarriers. In case of FDD, BCH may follow after the PSS/SSS in subframe 0. Since BCH scrambling may be defined with 40 ms periodicity, a WTRU may attempt to decode the BCH at four possible frame timing position such that the WTRU may implicitly determine 40 ms timing or equivalently the two least significant bits of SFN.

The WTRU may receive the Master Information block (hereafter MIB) on the PBCH. The MIB may comprise PHICH information, downlink bandwidth, and/or system frame number. The WTRU may use the PBCH to blindly detect the number of transmit antenna port(s) for which detection may be verified using the PBCH CRC.

Cell selection and re-selection may be described herein. In order for a WTRU to obtain normal service, it may camp onto a "suitable cell" which may fulfill one or more of the following criterion: The cell may be part of the selected PLMN, the registered PLMN, and/or a PLMN of the Equivalent PLMN list. According to the latest information provided by NAS: the cell may not be barred; the cell may be part of at least one TA that may not be part of the list of "forbidden tracking areas for roaming," which may belong to a PLMN that may fulfill one or more of the criterion listed herein; the cell selection criteria may be fulfilled; and/or for a CSG cell, the CSG ID may be part of the CSG whitelist of the WTRU.

Cell selection may be the process in which WTRU may attempt to find and camp on a suitable cell in order to establish normal service with the network. The selection process may be based on a previously stored set of cell information (e.g., stored cell selection) and/or having no prior knowledge of LTE cells or LTE carriers (e.g., initial cell selection). In case of initial cell selection, the WTRU may scan one or more RF channels in the E-UTRA bands. The WTRU may search for and detect the strong cell in each carrier frequency to find a suitable cell. Once a candidate for a suitable cell has been found, the WTRU may then camp onto that cell and read the system information (e.g., MIB, SIB1, etc.) to obtain information about the cell and/or PLMN. The WTRU may attempt to establish a connection to the network. If the cell is considered not suitable based on the above criterion and/or if reading attempts of the broadcast information has failed, the WTRU may move onto the next candidate cell and repeat the cell selection process.

Cell reselection may be a process where the WTRU continually monitors neighboring cells while camped onto a suitable serving cell to see if better quality suitable cells become available. WTRU may measure neighbor cells when the quality of the serving cell begins to diminish. Information of neighbor cells may also be provided through the system broadcast information (i.e., SIB3, 4, 5) of the serving cell. The WTRU may autonomously detect neighboring cells as candidate cells for re-selection. The WTRU may continually detect, measure, and/or evaluate possible neighboring cells until a particular cell meets the cell re-selection criteria. At which point, the WTRU may attempt to camp on the re-selected cell and attempt to read its system information for suitability. If the criteria on the re-selected cell has been met as a suitable cell, the WTRU may continue to camp on the re-selected cell and continue to be provided with normal service.

As part of the measurement and neighboring cell information received by the WTRU from the serving cell, there may be a black list. The black list may comprise a list of cell PCIs, which may not be deemed suitable and as such may be removed as possible candidates for re-selection.

Bandwidth extensions and/or Carrier Aggregation (hereafter CA) may be used to increase data rates. For example, with CA, the WTRU may transmit and receive simultaneously over the PUSCH and the PDSCH (respectively) of multiple serving cells (e.g., up to five serving cells with or without configured uplink resources). The serving cells may be used to support flexible bandwidth assignments up to. For example, 100 MHz. In addition to the baseline functionality of LTE R8+, a number of additional methods may be introduced to support the simultaneous operation of a WTRU on multiple serving cells.

Cross-carrier scheduling for carrier aggregation may be described herein. The control information for the scheduling of PDSCH and/or PUSCH may be sent on one or more PDCCH(s). In addition to, for example, the LTE R8+ scheduling using one PDCCH for a pair of UL and DL carriers, cross-carrier scheduling may also be supported on the PDCCH of a serving cell (e.g., the PCell), which may allow the network to provide PDSCH assignments and/or PUSCH grants for any other serving cell (e.g., a SCell). When cross-carrier scheduling is used, a 3-bit Carrier Indicator Field (hereafter CIF) may be used to address the concerned SCell, where each SCells identifier may be derived from RRC configuration.

"Carrier segment" may refer a set of physical resource blocks on which the WTRU may operate. A WTRU may be configured with one or more carrier segment(s) for a given serving cell. If carrier aggregation is configured, the serving cell may be a PCell or a SCell of the WTRU's configuration. A carrier segment may be a contiguous bandwidth extension to the addressable range of resource blocks typically supported for the concerned serving cell.

Figure 6:
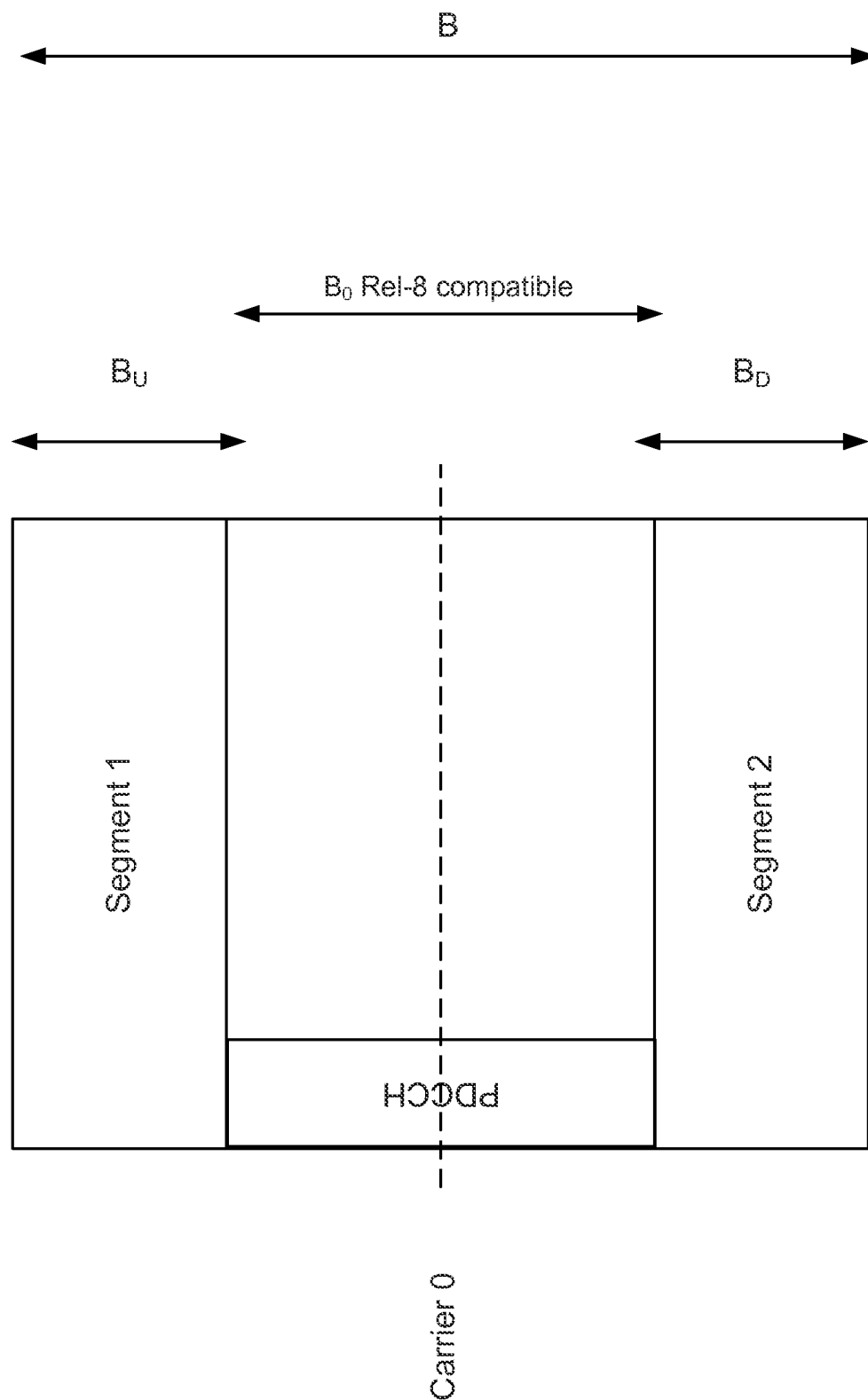
FIG. 6 illustrates an example carrier segment structure.

FIG. 6 illustrates an example carrier segment structure. Referring to FIG. 6, the carrier bandwidth may be B MHz, where the set of supported central $B_0$ MHz frequency may be defined for each standard Release. When configured to operate on the concerned serving cell, the WTRU may initially operate using the nominal carrier bandwidth of $B_0$ MHz and may subsequently be configured such that the extended bandwidth represented by the additional segments ($B_D$ and/or $B_U$), which may be considered as a group of resource blocks that extend the nominal bandwidth of the carrier.

A carrier segment can be viewed as an extension (e.g., a new extension) to the WTRU's physical resource map on which transmissions (e.g., uplink and/or downlink) may be scheduled by the network.

"Extension carrier" may refer to a carrier (e.g., a supplementary carrier) on which the WTRU may operate. An extension carrier may be referred to as an additional carrier or carrier type, a new R11 carrier, or a future release carrier.

A WTRU may be configured with one or more serving cells on which it may operate according to the extension carrier. The concerned serving cell may be a SCell of the WTRU's multicarrier configuration, for example, with (SCell DL+SCell UL) or without (SCell DL) configured uplink resources. This may or may not exclude the case where a SCell may be configured (e.g., only configured) for uplink transmissions, for example, if the SCell UL may be in the same band as the PCell of the WTRU's configuration.

The WTRU may perform at least one of the following for a SCell configured as an extension carrier: (1) the WTRU may receive downlink transmissions (SCell DL) (e.g., on PDSCH); (2) the WTRU may perform uplink transmissions (SCell UL) (e.g., on PUSCH); (3) the WTRU may receive reference signals (e.g., a cell-specific CRS and/or WTRU-specific DM-RS and/or CSI-RS); and/or (4) a WTRU may transmit Sounding and Reference Signals (hereafter SRS) signals.

The WTRU may or may not be used to perform one or more of the following for a serving cell configured as an extension carrier: (1) receive primary (hereafter PSS) and/or secondary (hereafter SSS) synchronization signals; (2) receive broadcasted System Information (SI) (e.g., on the BCCH (if present)); and/or (3) receive and decode downlink control signaling on the physical control channels of the concerned serving cell (e.g., the PDCCH and/or the PHICH and/or the PCFICH (if present)).

The SCell configured as an extension carrier may or may not be backward-compatible with R10 SCell operation. Given the absence of the cell-specific synchronization signals and/or reference signals, the broadcast of system information and/or downlink control signaling, among others, operation in the concerned serving cell may or may not be backward compatible for a single carrier WTRU (e.g., either a R8 WTRU, a R9 WTRU, and/or a R10 or above WTRU that may not support carrier aggregation) and/or for initial access for any type of WTRU.

"Component Carrier (CC)" may refer to a frequency on which the WTRU may operate. For example, a WTRU may receive transmissions on a downlink CC (hereafter "DL CC"). A DL CC may comprise of a plurality of DL physical channels. For example, a WTRU may perform transmissions on an uplink CC (hereafter "UL CC"). A UL CC may comprise of a plurality of UL physical channels. For example, for LTE the downlink physical channels may include the Physical Control Format Indicator Channel (PCFICH), the Physical Hybrid ARQ Indicator Channel (PHICH), the Physical Data Control Channel (PDCCH), the Physical Multicast data Channel (PMCH), and/or the Physical Data Shared Channel (PDSCH). On the PCFICH, the WTRU may receive control data indicating the size of the control region of the DL CC. On the PHICH, the WTRU may receive control data indicating HARQ Acknowledgement/Negative Acknowledgement (hereafter HARQ A/N, HARQ ACK/NACK and/or HARQ-ACK) feedback for a previous uplink transmission. On the PDCCH, the WTRU may receive downlink control information (DCIs) messages that may be used for scheduling of downlink and uplink resources. On the PDSCH, the WTRU may receive user and/or control data. For example, a WTRU may transmit on an UL CC.

For LTE, the uplink physical channels may include the Physical Uplink Control Channel (PUCCH) and/or the Physical Uplink Shared Channel (PUSCH). On the PUSCH, the WTRU may transmit user data and/or control data. On the PUCCH, and in certain cases on the PUSCH, the WTRU may transmit uplink control information (such as, but not limited to, CQI/PMI/RI or SR) and/or hybrid automatic repeat request (HARQ) acknowledgement/negative acknowledgement (ACK/NACK) feedback. On a UL CC, the WTRU may be allocated dedicated resources for transmission of Sounding and Reference Signals (SRS).

A cell may consist in a DL CC which may be linked to a UL CC based on, for example, the system information (SI) received by the WTRU either broadcasted on the DL CC and/or using dedicated configuration signaling from the network. For example, when broadcasted on the DL CC, the WTRU may receive the uplink frequency and bandwidth of the linked UL CC as part of the system information element (e.g., when in RRC_IDLE for LTE, or when in idle/CELL_FACH for WCDMA, e.g., when the WTRU does not yet have a radio resource connection to the network).

The "Primary Cell (PCell)" may refer to the cell operating of the primary frequency in which the WTRU may perform the initial access to the system (e.g., in which it either performs the initial connection establishment procedure or initiates the connection re-establishment procedure, and/or the cell indicated as the primary cell in the handover procedure, etc.). It may correspond to a frequency indicated as part of the radio resource connection configuration procedure. Some functions may be supported (e.g., only supported) on the PCell. For example, the UL CC of the PCell may correspond to the CC whose physical uplink control channel resources may be configured to carry HARQ ACK/NACK feedback for a given WTRU.

For example, in LTE, the WTRU may use the PCell to derive the parameters for the security functions and/or for upper layer system information such as, but not limited to, NAS mobility information. Other functions that may be supported on (e.g., only on) the PCell DL include, but is not limited to system information (SI) acquisition and change monitoring procedures on the broadcast channel (BCCH), and paging.

"Secondary Cell (SCell)" may refer to the cell operating on a secondary frequency which may be configured once a radio resource control connection may be established and which may be used to provide additional radio resources. System information relevant for operation in the concerned SCell may be provided using, for example, dedicated signaling when the SCell may be added to the WTRU's configuration. Although the parameters may have different values than those broadcasted on the downlink of the concerned SCell using the system information (SI) signaling, this information may be referred to as SI of the concerned SCell and may be independent of the method used by the WTRU to acquire the information.

"PCell DL" and "PCell UL" may refer the DL CC and the UL CC of the PCell, respectively. The terms "SCell DL" and "SCell UL" may correspond to the DL CC and the UL CC (if configured) of a SCell, respectively.

"Serving cell" may refer to a primary cell (e.g., a PCell) and/or a secondary cell (e.g., a SCell). For a WTRU that may or may not be configured with any SCell or that may or may not support operation on multiple component carriers (e.g., carrier aggregation), there may be one (e.g., only one) serving cell comprised of the PCell. For a WTRU that may be configured with at least one SCell, "serving cells" may include, but are not limited to, the set of one or more cells comprised of the PCell and configured SCell(s).

When a WTRU may be configured with at least one SCell, there may be one (e.g., always one) PCell DL and one PCell UL and, for each configured SCell, there may be one SCell DL and one SCell UL (if configured).

It is contemplated that a WTRU may operate beyond the boundaries of the typical bandwidth associated with a serving cell. It is also contemplated that the WTRU may operate on a frequency/carrier for which it may or may not be used to decode some downlink signals according to a typical SCell operation. For example, the WTRU may handle configuration and/or activation/deactivation of additional bandwidth (e.g., either bandwidth used as an extension carrier or for carrier segments). This may include the determination of a center frequency (e.g., in case of symmetrical or asymmetrical extensions) and/or may include activation/deactivation of the additional bandwidth. The WTRU may receive downlink transmissions for the additional bandwidth, which may include, for example, allocations of resources to the additional bandwidth, downlink control signaling and downlink transmissions. For example, the additional bandwidth may be used in MBSFN subframes. For example, extension carrier may be synchronized (e.g., with or without PSS/SSS and/or CRS).

Although flexible bandwidth operations may be described using examples based on 3GPP LTE technology, it may be contemplated that such operation are applicable to other wireless technologies such as, but not limited to, UMTS, HSPDA+, and/or WiMAX.

A WTRU may perform, for example, a procedure that includes at least one of the following operations (e.g., to operate on additional bandwidth): (1) Configuration and Activation; (2) methods for DL transmission (including, but not limited to, RA for carrier segments and DCI format design); (3) Methods for PDSCH decoding; (4) Carrier segments in MBSFN subframes; (5) Synchronization for extension carriers/carrier segments; and/or (6) PUSCH transmission in carrier segments, among others. Details of such operations may be described below.

A WTRU may be configured to use carrier segments for a serving cell. Carrier segments may be configured for the downlink component carrier and/or for the uplink component carrier of the concerned serving cell.

A minimal set of configuration parameters for CSs (e.g., Lite CSs Configuration) may be described herein. The WTRU may receive a configuration that may include parameters used to, for example, define the extension of the nominal bandwidth $B_o$ that may be used by the WTRU for the concerned serving cell, such that the WTRU may, for example, derive the value for total bandwidth B. For example, such parameters may include a parameter $B_u$, representing the bandwidth of one segment of the configured carrier segments and a parameter $B_d$, representing the bandwidth of the other segment where $B_u=B_d$ in case of a symmetrical extension (in which case a single parameter may be used) of the nominal bandwidth $B_o$.

The WTRU may adjust the RF front end to the center frequency of the total bandwidth B and may adjust the bandwidth of its transceiver to the total bandwidth B upon configuration of the carrier segments. For example, the eNB may provide for the WTRU a new center frequency for the extended carrier via higher layer signaling, once the WTRU may be configured with carrier segment for the concerned serving cell, for example, when the initial state of whether or not the carrier segments may be used is a deactivated state. If carrier segment activation and deactivation is used, the WTRU may not retune its RF front end, for example, for downlink transmission. For example, the WTRU may adjust, tune, and/or retune its RF front end when the carrier segments are activated and/or deactivated. For uplink transmissions, the WTRU may be used to adjust its transmission emission mask at any change of the total bandwidth B.

Carrier segments may be used for contiguous resource allocation or non-contiguous allocation. Whether or not carrier segments may be used for contiguous allocation may be configurable for a given WTRU. For example, the resource allocation may differ based on the WTRU and/or the network configuration (e.g., the configuration aspect). For example, in a subframe for which carrier segments may be used, the WTRU may perform one of the following: (1) if a contiguous allocation is configurable, the WTRU may determine that the resource allocation (e.g., implicitly) extend beyond the edge of the indicated resource allocation. A guard band between the carrier segments and the concerned serving cell may not be used. Resources (e.g., RBs) for data transmission may be allocated contiguously beyond the edges of the serving cell; or (2) if a non-contiguous allocation is configurable, the WTRU may determine that the resource allocation (e.g., implicitly) includes the physical resource blocks of the carrier segments, for example, resource blocks (e.g., all RBs) of the concerned carrier segment. Some guard band(s) may be used between the carrier segments and the concerned serving cell for non-contiguous resource allocation. The size of guard band(s) used for non-contiguous allocation may be signaled (e.g., in terms of number of RBs) to the WTRU configured with the carrier segments via higher layer signaling. For example, the size of guard band(s) may be predefined depending on the bandwidth of the serving cell and/or the bandwidth of the carrier segments.

The concerned resource blocks (e.g., nominal RBs and extended RBs) may be concatenated according to any of the methods described herein Control signaling for resource allocation may be flexible (e.g., dynamic) by relying on physical layer signaling (e.g., PDCCH and/or DCI format extensions) or may rely on at least a number of semi-statically configured parameters (e.g., by RRC configuration).

For example, the DCI format used for resource allocation may extend the R10 control signaling, (e.g., the WTRU may implicitly determine whether or not it may decode downlink assignments (or transmit for uplink grants) for the concerned cell in the given subframe. For example, for downlink transmissions the WTRU may use a configuration to determine whether or not additional RBs may be used (and/or may be concatenated) with the downlink RB assignment for PDSCH indicated in the received DCI. For example, for uplink transmissions the WTRU may use a configuration to determine whether or not additional RBs may be used (and/or may be concatenated) with the granted uplink RB resources for PUSCH indicated in the received DCI.

The WTRU may receive a configuration that includes, in addition to the minimal set of configuration parameters used to determine RBs that may be used for carrier segments, parameters that allow the WTRU to receive (or transmit) using one or more of the concerned RBs. The concerned configuration may include one or more semi-static resource allocations. For downlink transmissions, such parameter(s) may allow the WTRU to receive and/or decode one or more of the concerned RBs for PDSCH and may include, for example, the set of RBs (e.g., RB allocation) and/or a PDSCH transmission periodicity (or subframe configuration) for the carrier segments. For uplink transmissions, such parameter(s) may allow the WTRU to transmit using one of more of the concerned RBs for PUSCH and may include (e.g., the set of RBs (e.g., RB allocation) and a PUSCH transmission periodicity (or subframe configuration) for the carrier segments. It is contemplated that the carrier segments may use the same MCS and HARQ process as that of the concerned serving cell, but other MCS and HARQ processes are possible. The configuration may include parameters for reference signals (e.g., DM-RS) for downlink transmissions and/or parameters for SRS extensions for uplink transmissions.

The WTRU may apply the configured semi-static resource allocation in (e.g., only in) subframes for which the WTRU receives explicit control signaling (e.g., dynamic scheduling using PDCCH) for a downlink assignment on PDSCH or in the subframe in which the granted uplink resources may be used for a transmission on PUSCH.

The WTRU may apply the configured semi-static resource allocation to (e.g., only to) specific subframe(s), according to one or more of the following: (1) the resource allocation may be available periodically, for example, starting from the subframe in which the activation command is received by the WTRU; and/or the resource allocation may be available for a subset of subframes within a given set of subframes (e.g., during a 10 ms frame).

For example, the WTRU may apply the configured semi-static resource allocation in a subframe for which it has a configured downlink assignment and/or a configured uplink grant (e.g., in the case of resource allocation using semi-persistent scheduling). For example, the WTRU may receive a configuration for a semi-static resource allocation applicable to a subset of the RBs of the carrier segment for a concerned serving cell using RRC signaling. The WTRU may receive a downlink assignment for a PDSCH transmission in a DCI message on PDCCH (e.g., cross-carrier scheduled) in a given subframe in which the semi-static configuration of RBs for the carrier segment is applicable. The WTRU may concatenate the RBs indicated in the received DCI with the RBs indicated by the semi-static resource allocation for carrier segments. The WTRU may decode the PDSCH transmission using the RBs that result from a concatenation process. For example, the WTRU may perform the concatenation procedure if (e.g., only if) the use of carrier segment is activated.

Legacy control signaling for downlink assignments and uplink grants may be used in conjunction with carrier segments, for example, without modifications to legacy DCI formats and/or blind decoding implementations for PDCCH reception.

For example, a semi-static resource allocation configured for the carrier segment for the WTRU may be disabled using RRC signaling and/or L1 signaling where the L1 signaling may be done (dynamically), for example, using a single bit flag/field in a DCI message on PDCCH in a given subframe in which the semi-static configuration of RBs for the carrier segment is applicable. If it is disabled in the subframe, then the WTRU may be expected not to decode any data symbol in the PRBs corresponding to the semi-static resource allocation for the carrier segment. For this disabling (and/or enabling) of a semi-static resource allocation for the carrier segment, a single bit may be defined in a corresponding DCI format. An implicit indication of the disabling (and/or enabling) may be done using an existing bit(s) (or any combination of some of the existing bits/fields) in a DCI format.

For example, the configuration for semi-static resource allocation may include a plurality of resource allocations, for example one or more sets of resource allocation. For example, a set may include up to n groups of consecutive RBs allocated in the carrier segment. For example, a group may include a plurality of RB groups, for example, one group of RBs in the carrier segment corresponding to extension $B_u$ and another in extension $B_d$. If a contiguous resource allocation is configurable, the WTRU may determine whether the RBs of the carrier segment correspond to extension $B_u$ or to extension $B_d$, by selecting the extension which corresponding RBs may be adjacent to the allocated RBs in the received DCI format (or in the configured assignment or grant). Each item in the set of resource allocations may be indexed, for example, using an index allocation [0, n].

The WTRU may receive in the control signaling for the dynamic scheduling of a codeword (e.g., DCI on PDCCH) in a given subframe an indication of what set of resource allocation it may use for the carrier segment and, for example, using a $2^k$ bit field in the case of up to k sets of resource allocation. For example, when (e.g., only when) the use of carrier segment may be activated (e.g., according to at least one of the methods described herein). The WTRU may use the semi-static allocated resource for the carrier segments. For example, the WTRU may use the resource allocation indicated in the activation command.

The WTRU may receive control signaling that activates the use of carrier segments for one of more serving cells of the WTRU's configuration.

The control signaling may include one or more of the following:

Layer 1 signaling: The WTRU may receive a DCI format on PDCCH that indicates activation of a configuration for one or more carrier segment(s). For example, the indication may be according to at least one of the following: (a) the WTRU may decode the DCI format using a configured RNTI (e.g., a CS-RNTI); and/or (b) the WTRU may determine that a DCI format may be of a certain type and/or may include an explicit indication (e.g., a field and/or flag). For example, the method described above used as an indication may activate and/or change the activation state for the carrier segment of the carrier to which the DCI format may be applicable (e.g., the serving cell corresponding to the concerned PDCCH or the serving cell explicitly indicated by the carrier field indicator in the DCI format). The WTRU may transmit a HARQ ACK feedback to acknowledge the reception of the DCI interpreted as the activation command. For example, for DCI signaling received in subframe n, the WTRU may transmit HARQ ACK on an uplink channel in subframe n+k, where k may represent a WTRU processing delay (e.g., k=4 subframes).

Layer 2 signaling: The WTRU may receive a MAC Control Element (CE) that indicates activation of a configuration for one or more carrier segment(s). For example, the MAC CE may be received on the PDSCH of any serving cell of the WTRU's configuration. The WTRU may activate the carrier segment(s) corresponding to the component carrier (e.g., uplink or downlink carrier independently) and/or the serving cell (e.g., for one or both of the downlink and/or uplink component carriers, if configured) based on an explicit indication (e.g., a bitmap, or a servingCellId) included in the MAC CE. The WTRU may activate the carrier segment(s) corresponding to the component carrier and/or the serving cell that it determines based on the identity of the serving cell on which PDSCH the MAC CE had been received. For example, the MAC CE may include a configuration of the resource allocation to use for the corresponding carrier segment(s).

Layer 3 signaling: The WTRU may receive a configuration for one or more carrier segment(s), upon which the concerned segment may be activated. The configuration of the carrier segment may be included in the resource configuration for a given serving cell.

Any of the methods described herein may include an indication of a set of resource allocations from the WTRU's configuration for the concerned cell it may use for the carrier segment after activation, for example, using a $2^k$ bit field in case of up to k sets of resource allocation.

The activation of the use of the carrier segments may be applied after a fixed delay of, for example, k subframes. For example, for Layer 1 signaling received at subframe n, the WTRU may start using the carrier segment in subframe n+k, where k may be equal to 8 subframes. For MAC CE signaling received subframe n, the WTRU may start using the carrier segment in subframe n+k, where k may be equal to 8 subframes or, for example, in the subframe after the transmission of a HARQ ACK for the transport block in which the MAC CE was received. The WTRU may delay the start of the use of the carrier segments for a given ongoing HARQ process until the HARQ process successfully completes and/or until the control signaling received indicates a new data transmission (e.g., from the New Data Indicator—NDI field in the DCI format).

When the WTRU receives control signaling that activates one or more carrier segment for a given serving cell, the WTRU may perform at least one of the following: (1) for a HARQ process for which a carrier segment may be used (e.g., UL and/or DL), the WTRU may consider the first assignment for the corresponding HARQ buffer subsequent to the subframe in which the activation state may change as a new transmission; and/or (2) for an uplink carrier segment, if configured, the WTRU may trigger a Power Headroom Report (PHR) for at least the concerned serving cell.

For example, the WTRU may perform any (or at least part) of the above in the subframe in which the WTRU receives control signaling. For example, the WTRU may perform at least part of the above in the subframe in which the WTRU starts using the carrier segment (e.g., in the subframe of the activation). The WTRU may perform (e.g., only perform) at least part of the above for control signaling that changes the activation state of the carrier segment to the activated state.

While the WTRU uses carrier segments, the WTRU may perform at least one of the following: (1) for control signaling that schedules radio resources, the WTRU may interpret a DCI applicable to the concerned serving cell according to a different format and/or syntax (e.g., for resource allocation when carrier segment may be used); (2) for any downlink assignments, the WTRU may decode PDSCH, including methods to concatenate the concerned RBs of the activated carrier segment(s); (3) the WTRU may use a CQI reporting method, if configured, that extends to the carrier segments; and/or (4) the WTRU may change SRS reporting method, if configured, that extends to the carrier segments used for uplink transmissions (if configured).

The WTRU may receive control signaling that deactivates the use of carrier segments for one of more serving cells of the WTRU's configuration.

The control signaling may include one or more of the following:

Layer 1 signaling: The WTRU may receive a DCI format on PDCCH that indicates deactivation of a configuration for one or more carrier segment(s). The indication may be according to one or more of the following: (a) The WTRU decodes the DCI format using a configured RNTI (e.g., a CS-RNTI); and/or (b) The WTRU determines that a DCI format may be of a certain type and/or includes an explicit indication (e.g., a field and/or flag). The method above used as an indication may deactivate and/or change the activation state for the carrier segment of the carrier to which the DCI format may be applicable (e.g., the serving cell corresponding to the concerned PDCCH or the serving cell explicitly indicated by the carrier field indicator in the DCI format). The WTRU may transmit a HARQ ACK feedback to acknowledge the reception of the DCI interpreted as the deactivation command. For example, for DCI signaling received in subframe n, the WTRU may transmit HARQ ACK on an uplink channel in subframe n+k, where k may represent a WTRU processing delay (e.g., k=4 subframes).

Layer 2 signaling: The WTRU may receive a MAC Control Element (CE) that indicates deactivation of a configuration for one or more carrier segment(s). The MAC CE may be received on the PDSCH of any serving cell of the WTRU's configuration. The WTRU may deactivate the carrier segment(s) corresponding to the component carrier (e.g., uplink or downlink carrier independently) and/or the serving cell (e.g., for one or both the downlink and/or uplink component carriers, if configured) based on an explicit indication (e.g., a bitmap, or a servingCellId) included in the MAC CE. The WTRU may deactivate the carrier segment(s) corresponding to the component carrier and/or the serving cell that it determines based on the identity of the serving cell on which PDSCH the MAC CE was received.

Layer 3 signaling: The WTRU may receive a configuration that modifies and/or removes one or more carrier segment(s), upon which the concerned segment may be deactivated. The WTRU may deactivate a carrier segment according to one or more of the following: (1) the time since the last scheduling for the concerned component carrier (or serving cell) if it may be longer that a specific value (and may be configured). For example, a cs-DeactivationTimer may be used for each serving cell of the WTRU's configuration with configured carrier segments, and for example, for (e.g., only for) a downlink carrier segment; (2) for an uplink carrier segment, if configured, the Timing Advance for the concerned serving cell may no longer be valid (e.g., the Timing Alignment Timer has expired); (3) the WTRU may receive control signaling that modifies the configuration of the carrier segment for the concerned serving cell; and/or (4) automatic deactivation of the carrier segments when the linked carrier is deactivated.

When the WTRU receives control signaling that deactivates one or more carrier segment for a given serving cell, the WTRU may perform at least one of the following: (1) for a HARQ process for which a carrier segment may have been used (e.g., UL and/or DL), the WTRU may consider the first assignment for the corresponding HARQ buffer subsequent to the subframe in which the activation state changes as a new transmission; (2) for an uplink carrier segment, if configured, the WTRU may trigger a Power Headroom Report (PHR) for at least the concerned serving cell; and/or (3) the WTRU may revert to the configuration used in the nominal bandwidth for other procedures such as CQI reporting and//or SRS transmissions, if applicable.

Similar delay, as the delay associated with the activation, may be applied for the deactivation of carrier segments, and for example, for a deactivation using explicit signaling.

Similar or identical to carrier segments, the eNB may activate or deactivate an extension carrier for a given WTRU configured with the extension carrier. Several aspects may be considered as follows: (1) For a given WTRU configured with an extension carrier, activation/deactivation of the extension carrier may be independent of the status of activation/deactivation of the serving cell associated with the extension carrier. For example, if the associated serving cell is deactivated, but not for the extension carrier, then the WTRU may be configured for the extension carrier to have another activated serving cell linked to it. The PCell may automatically become the associated serving cell for the extension carrier. (2) Activation/deactivation of the extension carrier may be directly linked to the activation/deactivation status of the serving cell. For example, an extension carrier may be deactivated when the associated serving cell becomes deactivated.

Configuration of extension carriers may be restricted without CRS. If the CRS is not transmitted on an extension carrier, the WTRU configured for the extension carrier may be configured, for example, in transmission mode (TM) 9 or a new TM for R11 and beyond. CSI-RS (or a newly defined RS) may be used for CSI measurement by the WTRU for the extension carrier.

Scheduling with CSs may be described herein. By using control signaling on, for example, the PDCCH to address PRBs in the extended bandwidth, carrier segments may be managed. For example, when carrier segments are activated, a WTRU may use different, smallest PRB ranges (e.g., not exceeding 110 RBs in total) for such control signaling and/or scaling of values may be used. Scaling may be defined as follows. Separate resource allocation for carrier segments may be provided. Resource allocation for a carrier segment (s) may be done separately from the linked serving cell. Signaling RA for carrier segments in the same PDCCH as for the linked BC CC may be used to define a new DCI format and/or signaling RA for carrier segments in a different PDCCH may define a new DCI format. Joint resource allocation may be used. Resource allocation for the part of carrier segment(s) may be done jointly with that for the linked BC CC. DCI signaling in a single PDCCH may be used to provide a new DCI format.

Resource block group size (P) may be defined as a function of bandwidth (e.g., the bandwidth of the component carrier $B_0$). For example, P may be a function of $B_0$ to ensure a smooth coexistence in the same subframe among other UEs. If P is small (e.g., BC BW, $B_0$ is small) and carrier segment BW (e.g., $B_{seg}=B_U+B_D$) is large, the RA bits for B may be larger than the maximum number of bits for RA.

$P_1$ may be a function of $B_0$ and $P_2$ may be a function of $B_{seg}=B_U+B_D$. $P_1$ may be used for $B_0$ and $P_2$ for $B_{seg}$.

P may be a function of B (=B0+Bu+B1), which, for example, may not guarantee a smooth coexistence in the same subframe among other UEs (e.g., R-10 UEs), which may use P based on $B_0$.

$P_1$ may be a function of $B_0$, $P_2$ may be a function of $B_D$, and $P_3$ may be a function of $B_U$. $P_1$ may be used for $B_0$, $P_2$ for $B_D$, and/or $P_3$ for $B_U$.

Carrier segments may use different RA types from RA types used for $B_0$ of the linked BC CC. For example, type 0 or type 1 for $B_0$ and type 2 localized RA for carrier segments $B_D$ and $B_U$.

DCI format(s) supported for carrier segments may be defined (e.g., PDCCH design for carrier segments). One or more of the existing DCI formats may be reused. For example, the respective DCI format may be modified, if appropriate, and/or DCI formats that may support carrier segments may be specified. A new DCI format (e.g., including DCI size) may be defined. A WTRU procedure for PDCCH decoding for carrier segments may be specified. For example, DCI formats may include control information for carrier segments that may be transmitted (e.g., only transmitted) in the WTRU specific SS.

Downlink resource allocation with carrier segments may be described herein. When a WTRU may be configured with one or more carrier segment(s) for a given legacy cell, the resource mapping/allocation with carrier segments may be specified as part of PDSCH/PUSCH transmission and/or reception (e.g., including DCI signaling/receiving). For example, in R10, resource allocation (RA) type 0, type 1, and type2 may be defined in order to allocate frequency resources (e.g., RBs) to each scheduled WTRU according to different scheduling situations for each WTRU, such as but not limited to the channel condition, data rate, and/or DCI format/TM configuration.

Parameters used in the respective RA type may be a function of the system bandwidth of a serving cell (or component carrier) of interest. For example, in RA of type 0/1, the size of the resource block group (RBG) P, which may be a function of the system BW, may be used to group P-consecutive RBs to represent a RBG in the bitmap. When carrier segments are configured (e.g., the system bandwidth increases), P may increase to allocate resources for larger BW. The increase of P may cause inconsistency in resource allocation between the legacy WTRU (e.g., configured with the legacy BW) and the R-11 WTRU (e.g., configured with the extended BW).

The following criteria may address provisioning of resource allocation (RA) associated with carrier segments. Backward compatibility to legacy WTRUs may be addressed. For example, P may be used (e.g., selected) based on system bandwidth (e.g., $B_0$) and RA algorithms (e.g., R-10 RA algorithms) may be used. The RA algorithms may or may not be modified. The size of RA bits for type 0 and type1 may be used as defined in R-10, but other sizes are possible. The RA type 2 RA may ensure a smooth coexistence in the same subframe between type 0 and type 1 (e.g., the RB gap values for the distributed type may be integer multiples of the square of the RBG size (e.g., $NP^2$)). The $B_D$ and $B_U$ may be used by R-11 WTRUs.

The RBG size P may be selected based on system BW $B_0$ for backwards compatibility. For example, the bitmaps of downlink resource allocation type 0 and type 1, respectively, may be extended with carrier segments. Several methods for ordering concatenation of $B_0$, $B_U$ and $B_D$ may be considered.

RBs may be concatenated in the order of $B_0$, $B_U$ and $B_D$ (e.g., $B=B_0+B_U+B_D$ or $B=B_0+B_D$ if $B_U$ is not assigned). For example, if either of $B_D$ or $B_U$ is not assigned, its RBGs ($N_{RBG}$) may be zero.

For RA type 0, the total number of RBGs ($N_{RBG}$)/bits for the bitmap may be given by:

$$N_{RBG}=\lceil N_{RB,B}^{DL}/P \rceil$$

If the number of RBs of the legacy BW $B_0$ is not an integer multiple of P, the last RBG of $B_0$ may include the first $N_{first,B_U}$ RBs of $B_U$ where: $N_{first,B_U}=P\lceil N_{RB,B_0}^{DL}/P \rceil - N_{RB,B_0}^{DL}$, but there may not be effects on legacy WTRUs (e.g., it is backwards compatible).

The corresponding resource allocation fields may be illustrated below:

| Example Resource Allocation Fields for RA Type 0 | |
| --- | --- |
| Type | Bitmap: $N_{RBG}$ for B (=$B_0$ + $B_U$ + $B_D$ or = $B_0$ + $B_D$) |

For RA type 1, the total RBs of the bitmap used to address VRBs in a selected RBG subset may have size $N_{RB}$ and may be defined by:

$$N_{RB}=\lceil N_{RB,B}^{DL}/P \rceil - \lceil \log_2 P \rceil - 1$$

The bitmap and shift of each subset may be constructed based on B by using the same algorithms of, for example, R-8. The corresponding resource allocation fields may be illustrated below:

| Example Resource Allocation Fields for RA Type 1 | | | |
| --- | --- | --- | --- |
| Type | Subset | Shift for B | Bitmap: $N_{RB}$ for B (=$B_0$ + $B_U$ + $B_D$) |

RBG's may be concatenated in the order of $B_D$ and $B_{0U}$ (=$B_0+B_U$). $B_{0U}$ may indicate BW concatenated with $B_0$ and $B_U$. If the number of RBGs for $B_D$, $N_{RBG,1}$, is not an integer multiple of P, null RBs of $N_{nulls}$ may be inserted in the last RBG of $B_D$ where $N_{nulls}=P\lceil N_{RB,B_D}^{DL}/P \rceil - N_{RB,B_D}^{DL}$, and ignored when actual data may be mapped into the RBs. If the number of RBGs for $B_{OU}$, $N_{RBG,2}$, is not an integer multiple of P, null RBs of $N_{nulls}$ may be inserted in the last RBG of $B_{OU}$ where $N_{nulls}=P\lceil N_{RB,B_{OU}}^{DL}/P \rceil - N_{RB,B_{OU}}^{DL}$, and ignored when actual data may be mapped into the RBs.

For example, if a number of RBGs of a carrier segment is not an integer multiple of the size of the RBGs, then a number of null RBs may be inserted into a last RBG of the carrier segment such that the number of null RBs plus the number of RBs of the second carrier segment is divisible by the size of the RBGs. The number of null RBs may be variable.

For RA type 0, the number of bits/RBGs for the bitmap may be calculated respectively for $B_D$ and $B_{0U}$ as set forth in:

$$N_{RBG,1} = \lceil N_{RB,B_D}^{DL}/P \rceil,$$

$$N_{RBG,2} = \lceil N_{RB,B_{0U}}^{DL}/P \rceil$$

and/or concatenated in the order of $B_D$ and $B_{0U}$. The corresponding resource allocation fields may be illustrated below:

| Example Resource Allocation Fields for RA Type 0 | |
|---|---|
| Type | Bitmap: $N_{RBG, 1}$ for $B_D$    Bitmap: $N_{RBG, 2}$ for $(B_0 + B_U)$ |

At least two bitmaps may be associated with resource allocation information. For example, the resource allocation information may comprise two bitmaps. A first bitmap may be associated with the RBGs of the component carrier and the RBGs of a first carrier segment and a second bitmap may be associated with the RBGs of a second carrier segment. The number of bits/RBG for the first bitmap may be equal to the number of RBs in the component carrier and first carrier segment combined divided by the size of a RBG. The number of bits/RBG for the second bitmap may be equal to the number of RB in the second carrier segment divided by the size of a RBG.

For RA type 1, one shift bit may control shifting operation for the subsets of one or more of $B_D$ and $B_{0U}$ (e.g., simultaneously). The number of bits/RBs for the bitmap may be calculated as set forth in:

$$N_{RB} = \lceil N_{RB,B_D}^{DL}/P \rceil + (\lceil N_{RB,B_{0U}}^{DL}/P \rceil - \lceil \log_2 P \rceil - 1)$$

The corresponding resource allocation fields may be illustrated below:

| Example Resource Allocation Fields for RA Type 1 | | | |
|---|---|---|---|
| Type | Subset | Shift | Bitmap: $N_{RB}$ |

One shift bit may be used for $B_D$ and another shift bit for $B_{0U}$. The number of bits/RBs for the bitmap may be calculated as set forth in:

$$N_{RB,1} = \lceil N_{RB,B_D}^{DL}/P \rceil - 1$$

$$N_{RB,2} = \lceil N_{RB,B_{0U}}^{DL}/P \rceil - \lceil \log_2 P \rceil - 1$$

The corresponding resource allocation fields may be illustrated below:

| Example Resource Allocation Fields for RA Type 1 | | | | |
|---|---|---|---|---|
| Type | Subset | Shift for $B_D$ | Shift for $B_{0U}$ | Bitmap: $N_{RB}$ = $N_{RB, 1}$ + $N_{RB, 2}$ |

The corresponding resource allocation fields may be rearranged as shown below:

| Example Rearranged Resource Allocation Fields | | | | | |
|---|---|---|---|---|---|
| Type | Subset | Shift for $B_D$ | Bitmap: $N_{RBG, 1}$ | Shift for $B_{0U}$ | Bitmap: $N_{RBG, 2}$ |
| Type | Subset | Shift for $B_{0U}$ | Bitmap: $N_{RBG, 2}$ | Shift for $B_D$ | Bitmap: $N_{RBG, 1}$ |

RBGs may be concatenated in the order of $B_D$, $B_0$, and $B_U$. For RA type 0, the number of bits/RBGs for the bitmap may be calculated as set forth in:

$$N_{RBG,1} = \lceil N_{RB,B_D}^{DL}/P \rceil,$$

$$N_{RBG,2} = \lceil N_{RB,B_0}^{DL}/P \rceil,$$

$$N_{RBG,3} = \lceil N_{RB,B_U}^{DL}/P \rceil$$

and/or concatenated in the order of $B_D$, $B_0$, and $B_U$. If $N_{RBG,1}$ for $B_D$ is not an integer multiple of P, then null RBs ($N_{null}$) may be inserted in the last RBG of $B_D$, where $N_{nulls} = P \lceil N_{RB,B_D}^{DL}/P \rceil - N_{RB,B_D}^{DL}$ for $B_D$, and ignored when actual data may be mapped into RBs. Likewise null RBs may be inserted for $B_0$ and $B_U$ respectively. The corresponding resource allocation fields may be illustrated below:

| Example Resource Allocation Fields for RA Type 0 | | | |
|---|---|---|---|
| Type | Bitmap: $N_{RBG, 1}$ for $B_D$ | Bitmap: $N_{RBG, 2}$ for $B_0$ | Bitmap: $N_{RBG, 3}$ for $B_U$ |

For example, the resource allocation information may comprise three bitmaps. A first bitmap may be associated with the RBGs of the component carrier, a second bitmap may be associated with the RBGs of a first carrier segment, and a third bitmap may be associated with the RBGs of a second carrier segment. The number of bits/RBG for the first bitmap, the second bitmap, and the third bitmap may be the number of RBs in the respective carrier divided by the size of the RBG.

For example, if the number of RBGs of the component carrier, the first carrier segment, and/or the second carrier segment is not an integer multiple of the size of the RBGs, then a number of null RBs may be inserted into the last RBG of the respective carrier such that the number of null RBs plus the number of RBs of the respective carrier is divisible by the size of the RBGs.

For RA type 1, one shift bit may control shifting operation for P subsets for $B_D$, $B_0$, and/or $B_U$ (e.g., simultaneously) (e.g., all subsets may use their own shifted bitmaps, respectively), if the shift bit may be set. The number of bits/RBs for the bitmap may be calculated set forth in:

$$N_{RB,1} = \lceil N_{RB,B_D}^{DL}/P \rceil,$$

$$N_{RB,2} = \lceil N_{RB,B_0}^{DL}/P \rceil - \lceil \log_2 P \rceil - 1,$$

$$N_{RB,3} = \lceil N_{RB,B_U}^{DL}/P \rceil$$

The corresponding resource allocation fields may be illustrated below:

| Example Resource Allocation Fields for RA Type 0 | | | | | |
|---|---|---|---|---|---|
| Type | Subset | Shift | Bitmap: $N_{RB, 1}$ for $B_D$ | Bitmap: $N_{RB, 2}$ for $B_0$ | Bitmap: $N_{RB, 3}$ for $B_U$ |

One shift bit per $B_D$, $B_0$, $B_U$ may be utilized (e.g., each subset may select its own shifted bitmap based on its own shift bit). The number of bits/RBs for the bitmap may be calculated as set forth in:

$$N_{RB,1} = \lceil N_{RB,B_D}^{DL}/P \rceil - 1,$$

$$N_{RB,2} = \lceil N_{RB,B_0}^{DL}/P \rceil - \lceil \log_2 P \rceil - 1,$$

$$N_{RB,3} = \lceil N_{RB,B_U}^{DL}/P \rceil - 1$$

The corresponding resource allocation fields may be illustrated below:

| Example Resource Allocation Fields for RA Type 1 | | | | | | |
|---|---|---|---|---|---|---|
| Type | Subset | Shift for $B_D$ | Shift for $B_0$ | Shift for $B_U$ | Bitmap: $N_{RB,1}$ for $B_D$ | Bitmap: $N_{RB,2}$ for $B_0$ | Bitmap: $N_{RB,3}$ for $B_U$ |

The resource allocation fields may be rearranged as shown:

| Example Rearranged Resource Allocation Fields | | | | | | |
|---|---|---|---|---|---|---|
| Type | Subset | Shift for $B_D$ | Bitmap: $N_{RB,1}$ for $B_D$ | Shift for $B_0$ | Bitmap: $N_{RB,2}$ for $B_0$ | Shift for $B_U$ | Bitmap: $N_{RB,3}$ for $B_U$ |

Examples of methods that may be used for RA type 2 with carrier segments may be described herein.

For a localized RA, the method of R-10 uplink RA type 0 or type 1 may be extended with one or more of the following modifications. RB index ordering may be constructed based on the following concatenation ordering:

$$N_{RB,B}^{DL} = N_{RB,B_0}^{DL} + N_{RB,B_U}^{DL} + N_{RB,B_D}^{DL}$$

concatenated in the order of $B_0$, $B_U$ and $B_D$.

The order may be changed, for example, to $N_{RB,B}^{DL} = N_{RB,B_D}^{DL} + N_{RB,B_0}^{DL} + N_{RB,B_U}^{DL}$ concatenate in the order of $B_D$, $B_0$ and $B_U$.

The order may be based on the legacy part (e.g., $B_0$) and the segment part $B_D$, $B_U$ (e.g., separately/individually), for example $N_{RB,B_0}^{DL}$, $N_{RB,B_D}^{DL}$, $N_{RB,B_U}^{DL}$.

The order may be based on the legacy part ($B_0$) part and a segment part ($B_D + B_U$, or $B_U + B_D$)) separately (e.g., $N_{RB,B_0}^{DL}$ and ($N_{RB,B_D+B_U}^{DL}$ or $N_{RB,B_U+B_D}^{DL}$)).

For example, for uplink RA type 1 method, the number of RA sets M and the RBG size P may be predetermined with respect to concatenated BWs above. For example, P may be selected based on $B_0$, or $B_0$ and each segment BW $B_D$, $B_U$, or $B_D + B_U$. M and P may be signaled dynamically by PDCCH or semi-statically via L2/L3 signaling.

For Distributed RA, the operations may be as follows. Interleaver operation may apply to: (i) total BW B; (ii) legacy BW $B_0$; (iii) $B_0$ and $B_U + B_D$ (or $B_D + B_U$) separately and then stack them to read out column by column; and/or (iv) $B_D$, $B_0$ and $B_U$ separately and then stack them to read out column by column. Frequency hopping for odd time slots to: (i) disable (e.g., always disable) for carrier segments and/or enable/disable (e.g., always enable/disable) by L1 signaling; (ii) apply to $B_0$ (e.g., the same as R-10); (iii) apply to $B_D$, $B_0$, $B_U$, $B_{UD}$ (e.g., independently); and/or (iv) apply to B by redesigning Gap table for B.

The RBG size P' may be an integer multiple of P (P'=NP) where P may be selected based on system BW $B_0$ where $N = \lceil N_{RB,B}^{DL}/N_{RB,B_0}^{DL} \rceil$ (e.g., if $B_D + B_U <= B_0$, then P'=2P). This may be used, for example, in cases that the maximum size of RA bits for Type 0 and Type 1 for $N_{RB,B}^{DL}$ may be out of range for a given P, for example, as illustrated in Table 4 and/or the number of blind decodes (e.g., payload sizes) with carrier segments may be kept the same as that of R-8 and/or R-10 (e.g., to match the payload size of R-8 and/or R-10 DCI formats some padding bits may to be added, if appropriate).

TABLE 4

| System Bandwidth | RBG Size (P) | Max. Bits for Type 0 and Type 1 |
|---|---|---|
| ≤10 | 1 | 10 |
| 11-26 | 2 | 13 |
| 27-63 | 3 | 21 |
| 64-110 | 4 | 28 |

For example, the size of a RBG of a component carrier and at least one carrier segment may be based on a scaling factor multiplied by a legacy RBG size (e.g., 3GPP Rel-8/Rel-10 RBG size) of the component carrier. The legacy RBG size may be determined by the system bandwidth of the component carrier. For example, the legacy RBG size may be determined by applying the system bandwidth of the component carrier to Table 4 described herein. The scaling factor may be determined by the number (e.g., maximum number) of RBs of the component carrier and the one or more carrier segments. For example, if the combined number of RBs of the one or more carrier segments is less than or equal to the number of RBs of the component carrier, then the scaling factor may be two. If the combined number of RBs of the one or more carrier segments is greater than the number of RBs of the component carrier, then the scaling factor may be x, wherein x is equal to the combined number of RBs of the component carrier and the one or more carrier segments divided by the number of RBs of the component carrier.

For example, N RBs may be grouped to create an element of RBG. Examples may be provided herein for P'=NP where N=2. An element of RBG may be constructed with two (N=2) consecutive RBs (e.g., [(0,1),(2,3)], [(3,4),(5,6)], ... ). An element of RBG may be constructed with a RB and its $4^{th}$ (NP-th) RB (e.g., [(0,4),(1,5)], [(2,6),(3,7)], [(8,12),(9,13)], [(10,14),(11,15)], ... ). The same R-10 RA algorithm with newly constructed RBGs above may be applied. The gap for Type 2 may be an integer multiple of $NP^2$ in order to ensure a smooth coexistence in the same subframe between other types (0, 1).

FIGS. 7 to 13 are diagram illustrating example bitmaps.

Figures 7, 8:
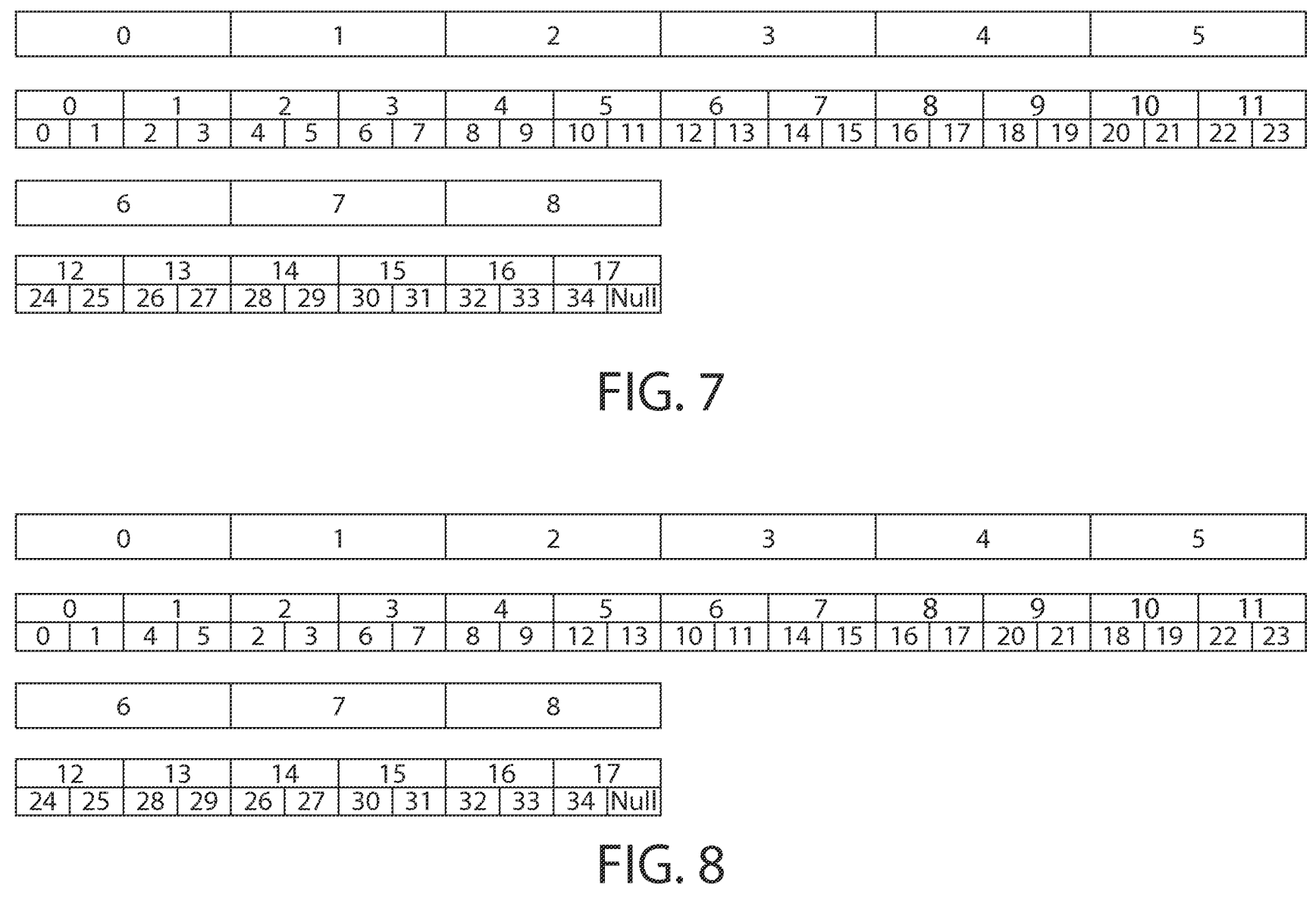

Referring the FIG. 7, the example bitmap is based on P'=2P (N=2, P=2 based on $B_0$=25 RBs, segment BW=10 RBs) where: $N_{RB,B}^{DL}$=25+10=35, P'=2P=2×2=4, $N_{subset}$=$\log_2$ P or $N_{subset}$ $\log_2$ (2P)

For Type 0, the number of bits for the bitmap may be derived by:

$$N_{RBG} = \lceil N_{RB,B}^{DL}/P' \rceil$$

For example, the resource allocation information may be associated with a bitmap. The number of bits for the bitmap may be determined by a combined number of RBs of the component carrier and the one or more carrier segments divided by the size of a RBG.

Referring to FIG. 8, an example bit map is shown.

For Type 1, the number of bits for the bitmap may be derived by:

$$N_{RBs} = \lceil N_{RB,B}^{DL}/P' \rceil - \lceil \log_2 P \rceil - 1$$

Referring to FIGS. 9 and 10, example bit maps for Type 1 are shown.

Figures 11, 12:
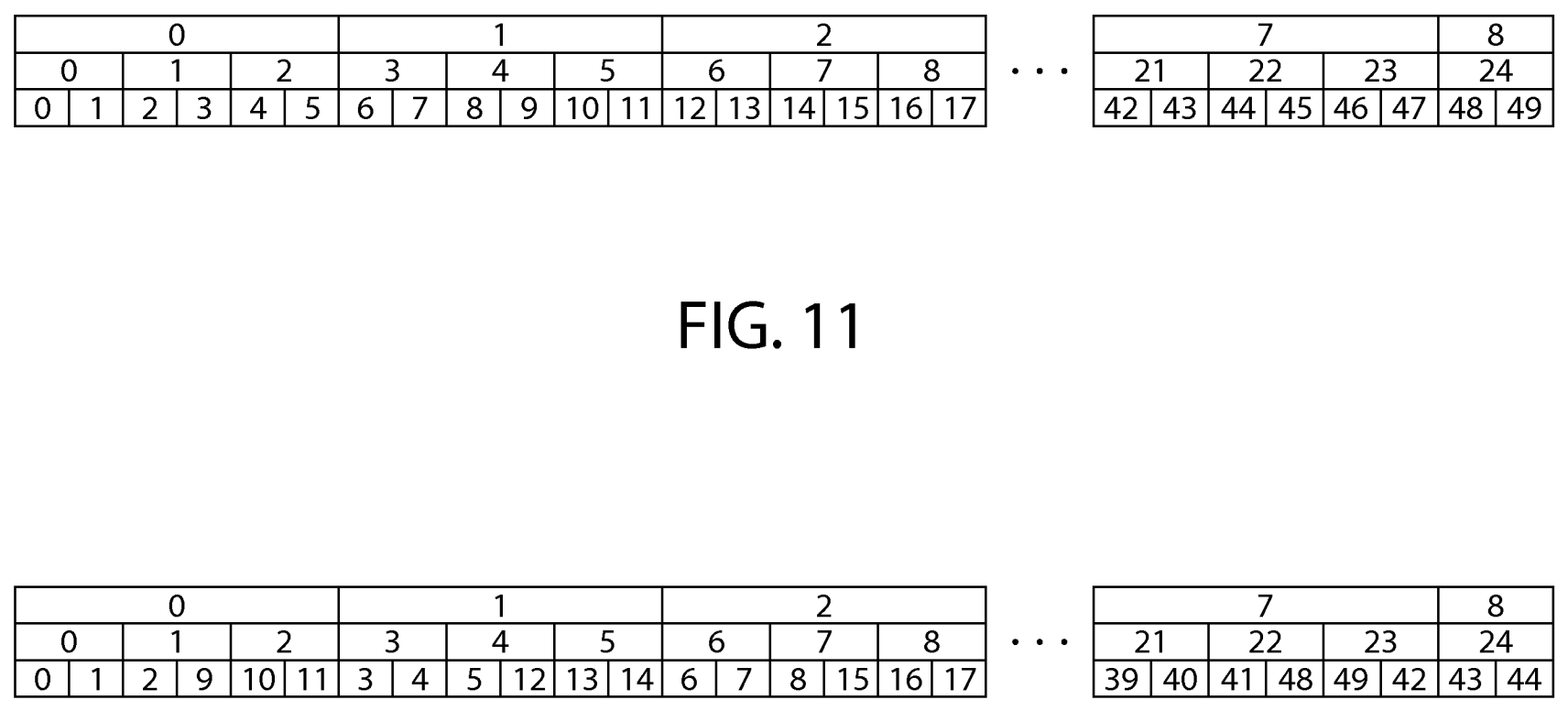

Referring to FIGS. 11 and 12, example bit maps may be shown for Type 0, P'=2P and $N_{RB}^{DL}$=50, P=3. The number of bits for bitmap may be derived by $N_{RBG}=\lceil N_{RB,B}^{DL}/P'\rceil$=9.

Referring to FIG. 13, an example bit map, the element of which may be a pair of RBs as described in type 0 above, is shown. The number of bits for the bitmap may be derived by $N_{RBs}=\lceil N_{RB,B}^{DL}/P'\rceil-\lceil \log_2 P\rceil-1$=6.

RBG size P' may be calculated as a function of the system BWs $B_0$ and B and P, for example: $P'=\lceil N_{RB,B}^{DL}/N_{RBG_0}\rceil$, where $N_{RBG_0}=\lceil N_{RB,B_0}^{DL}/P\rceil$.

For the resource allocation Type 0, for example, the number of bits for a bitmap may be derived by $N_{RBG}=\lceil N_{RB,B}^{DL}/P'\rceil$.

For the resource allocation Type 1, the number of the bits for bitmap may be derived by $N_{RB}^{TYPE1}=\lceil N_{RB,B}^{DL}/P'\rceil-\lceil \log_2 P'\rceil-1$. The number of bits for bitmap may be derived by $N_{RB}^{TYPE1}=\lceil N_{RB,B}^{DL}/P\rceil-\lceil \log_2 P'\rceil-1$.

The implementations described herein may be used, for example, when the maximum size of RA bits for Type 0 and Type 1 for $N_{RB,B}^{DL}$ may be out of range for a given P and/or the number of blind decodes (e.g., payload sizes) and/or the bits used for bitmap with carrier segments may be kept the same as that of Rel-10 (e.g., in order to match the payload size of Rel-10 DCI formats some padding bits may be added if necessary). The number of the bits for the resource allocation (e.g., required for the resource allocation) of the whole carrier (e.g., including the segments) with system bandwidth B may be equal to or less than that of the R-10 for system BW $B_0$. The new RBG may be selected to have the minimum possible size considering the number of available Rel-10 resource allocation bits corresponding to P.

For example, the size of a RBG of a component carrier and at least one carrier segment may be based on the combined number of RBs of the component carrier and the one or more carrier segments divided by the number of legacy RBGs (e.g., 3GPP Rel-8 or Rel-10 RBGs) of the component carrier and rounding up the resulted value to the next highest whole number.

The number of legacy RBGs may be determined by dividing the system bandwidth of the component carrier by the legacy RBG size (e.g., 3GPP Rel-8 or Rel-10 RBG size) and rounding up to the next highest whole number. For example, a legacy RBG size (e.g., 3GPP Rel-10 RBG size) of the component carrier may be determined by applying the system bandwidth of the component carrier to Table 4 described herein.

For example, new RB groups may be constructed. An element of a RBG may be constructed with P' consecutive RBs (e.g., for P'=3 the RBGs may be (0,1,2),(3,4,5), ... ). An element of a RBG may be constructed with a RB and its P'-th RB (e.g., for P'=3 the RBGs may be (0,3,6),(1,4,7),(2,5,8),(9,12,15),(10,13,16), ... ). The same Rel-10 RA algorithm may be applied with newly designed P' and its resulted RBGs (e.g., those described above).

For example, P' may =3 (e.g., P=2 based on $B_0$=25 RBs, segment BW=10 RBs). $N_{RB,B}^{DL}$=25+10=35, P=2, $N_{RBG_0}$=13, P'=⌈35/13⌉=3.

In RA Type 0, the number of bits for a bitmap may be derived by, for example, $N_{RBG}=\lceil N_{RB,B}^{DL}/P'\rceil$=12. FIG. 14 is a diagram illustrating an example bitmap.

For RA Type 1, for example, using $N_{RB}^{TYPE1}=\lceil N_{RB,B}^{DL}/P'\rceil-\lceil \log_2 P'\rceil-1$, the number of the bits for bitmap may be $N_{RB}^{TYPE1}$=9. FIG. 15 is a diagram illustrating an example of bit-mapping.

For example, P' may =4 (e.g., P=3 based on $B_0$=28 RBs, segment BW=6+6 RBs). $N_{RB,B}^{DL}$=28+6+6=40, P=3, $N_{RBG_0}$=10, P'=⌈40/10⌉=4.

Figure 16:
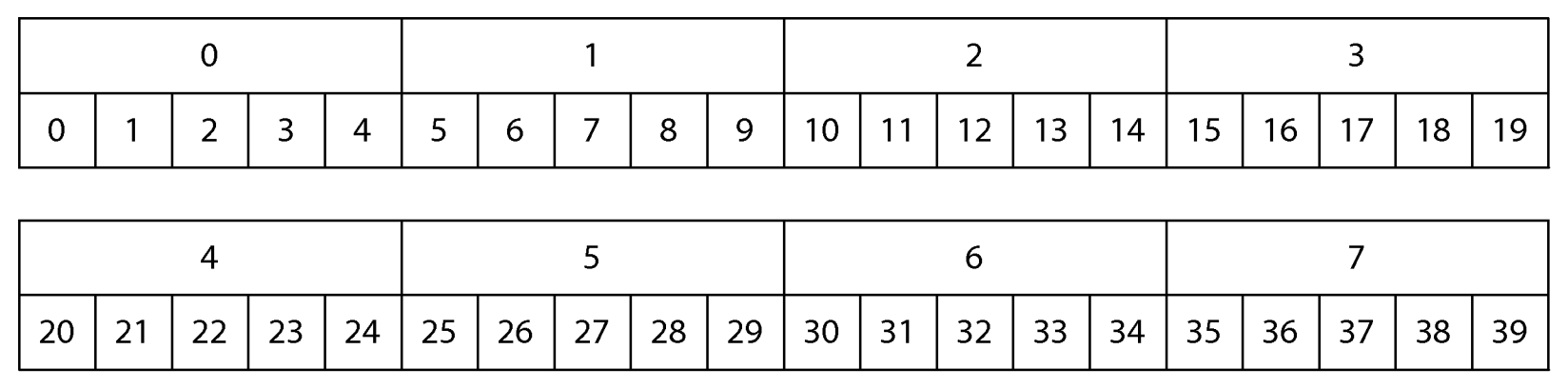

For RA Type 0, the number of bits for a bitmap may be derived by $N_{RBG}=\lceil N_{RB,B}^{DL}/P'\rceil$=10. FIG. 16 is a diagram illustrating an example bitmap.

For RA Type 1, for example, using $N_{RB}^{TYPE1}=\lceil N_{RB,B}^{DL}/P'\rceil-\lceil \log_2 P'\rceil-1$, the number of the bits for a bitmap may be $N_{RB}^{TYPE1}$=7. FIG. 17 is a diagram illustrating an example of bit-mapping.

Methods (e.g., composite methods) may use DL RA methods for a backwards compatible part and/or UL RA method (Type 0 or Type 1) for carrier segment parts. The backwards compatible/legacy part (e.g., $B_0$) may use R-10 RA methods (e.g., no changes) and the carrier segment parts (e.g., $B_D$ and $B_U$) may use enhanced R-10 uplink methods with RA type 0 or type 1 with M, where M may be the number of resource block sets/clusters. M may be predetermined for each segment part or for combined segment parts (e.g., M1 for $B_D$ and M2 for $B_U$, or M for $B_D+B_U$, etc.). M may be signaled dynamically by PDCCH or semi-statically via L2/L3 signaling.

The uplink resource allocation with carrier segments may use the same methods for the downlink RA with carrier segments described herein, for example, by disabling frequency hopping. The following frequency hopping methods may be used: disable (e.g., always disable) for carrier segments or enable/disable by L1 signaling; apply to $B_0$ (e.g., only apply) (e.g., the same as R-10); apply R-10 frequency hopping method to $B_0$ and separately hopping between $B_D$ and $B_U$; apply to $B_D$, $B_0$, $B_U$, $B_{UD}$ independently; and/or apply to B by redesigning Gap table for B. Separate DCI for carrier segments from the backward compatible PDCCH may be described herein.

Figure 18:
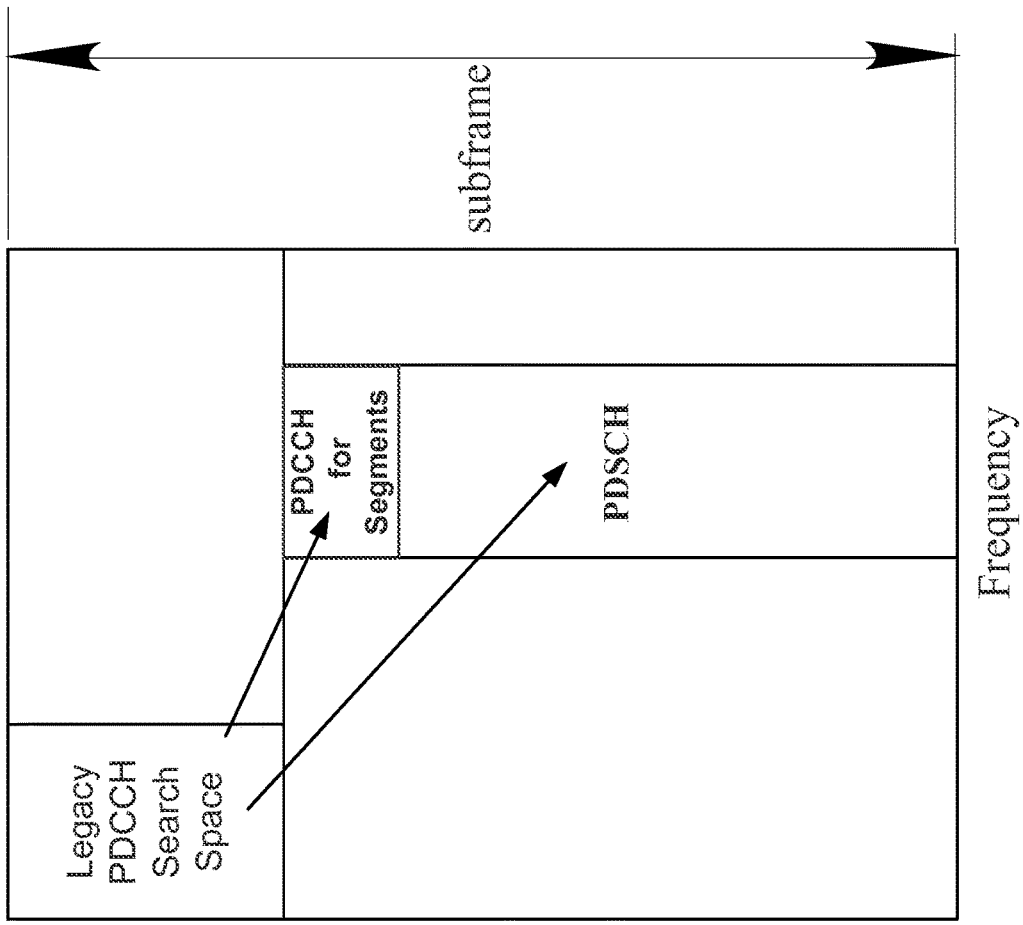
FIG. 18 is a diagram illustrating an example DCI transmission for CSs in PDSCH.

FIG. 18 is a diagram illustrating an example of a DCI transmission for CSs in PDSCH. Referring to FIG. 18, since the RA methods, e.g., as described herein, may be designed based on one jointly encoded PDCCH with carrier segments, the payload sizes of DCI formats may increase. The number of blind decodes may increase due to new DCI formats, which may accommodate larger payload sizes for RA for carrier segments. In order to avoid growing blind decodes, the following may be implemented.

Partitioning DCI into two parts such that one part for legacy DCI/PDCCH may reside on the legacy control region, e.g., as in R-10, and the other part for carrier segment DCI may be placed on an extended control region of PDSCH. The extended control region of PDCCH for carrier segments may be a part of resource blocks (or, e.g., resource elements (REs)) for PDSCH (or, e.g., the data field) corresponding to a WTRU such that eNB may assign RBs (or, e.g., REs) for PDSCH including CCEs for carrier segment DCI, for example as shown in FIG. 18.

Resource allocation methods for the extended control region of PDSCH for carrier segment DCI may follow predetermined frequency first then time/OFDM symbols. Resource allocation methods for the extended control region of PDSCH for carrier segment DCI may follow predetermined time/OFDM symbols first then frequency. Such implementations may include one or more of the following options: with the lower region in allocated RBs for PDSCH through OFDM symbols (e.g., all OFDM symbols); with the higher region in allocated RBs for PDSCH through OFDM symbols (e.g., all OFDM symbols); with the center region in allocated RBs for PDSCH through OFDM symbols (e.g., all OFDM symbols); and/or with a distribution of both low and high region to exploit frequency diversity. Resource allocation methods for the extended control region of PDSCH for carrier segment DCI may follow predetermined distributed through a data block using predetermined rules (e.g., close to RS: CRS, DMRS, and/or CSI-RS).

In certain example embodiments, it may be signaled via a higher layer. In certain example embodiments, the resource allocation may be implicit and may use WTRU specific parameters. In certain example embodiments, it may be signaled dynamically by PDCCH or semi-statically via L2/L3 signaling.

As an extension carrier may be configured as an R-10 serving cell (e.g., a SCell), the resource allocation methods used for a R-10 SCell may be applied for extension carriers. An extension carrier may be configured differently as compared to an R-10 SCell, for example, with no CRS, no PDCCH, no PBCH, and/or no PSS/SSS transmission on the extension carrier. An extension specific resource allocation/mapping scheme may be used. If PDCCH is not configured for an extension carrier, cross-carrier scheduling for the extension carrier may be performed by a linked serving cell. A new DCI format or formats may be defined to support extension carriers in, for example, R-11 and beyond for 3GPP.

Extension carriers may be configured within a small system bandwidth (e.g., less than 5 MHz) and DCI formats and/or resource allocations with full flexibility in resource block (RB) assignment may not be appropriate. For example, as RA type 2 (e.g., as defined in resource allocation for PDSCH in LTE-A) may be associated with a relatively small PDCCH payload size, RA type 2 may support extension carriers (e.g., only RA type 2). Other resource allocation type (e.g., RA type 0 or 1 defined in LTE-A DL) may be applied for extension carriers.

The RA scheme used for LTE-A PUSCH transmission may be used for extension carriers where a localized type RA method is defined for PUSCH. For example, resource allocation type 0 or type 1, which is defined in R-10 DCI format 0/4, may be applied for extension carriers.

Frequency hopping may be applied to extension carriers on a slot and/or resource block basis.

The PDSCH may be mapped to physical resources in the extended bandwidth (e.g., mapping to REs within carrier segments). When carrier segments are configured for a serving cell, the PRBs may be numbered in the carrier segments. The following rules may be considered for RB/RE mapping with carrier segments: Maintain PRB numbers within a main (R-10) carrier as in R-10 (e.g., numbering PRBs starting at the lowest frequency of the main carrier); Extend PRB numbers for carrier segments in a consecutive manner, if possible; and/or Avoid changing the R-10 RS RE mapping rule, if any, due to numbering PRBs in carrier segments.

Figure 19:
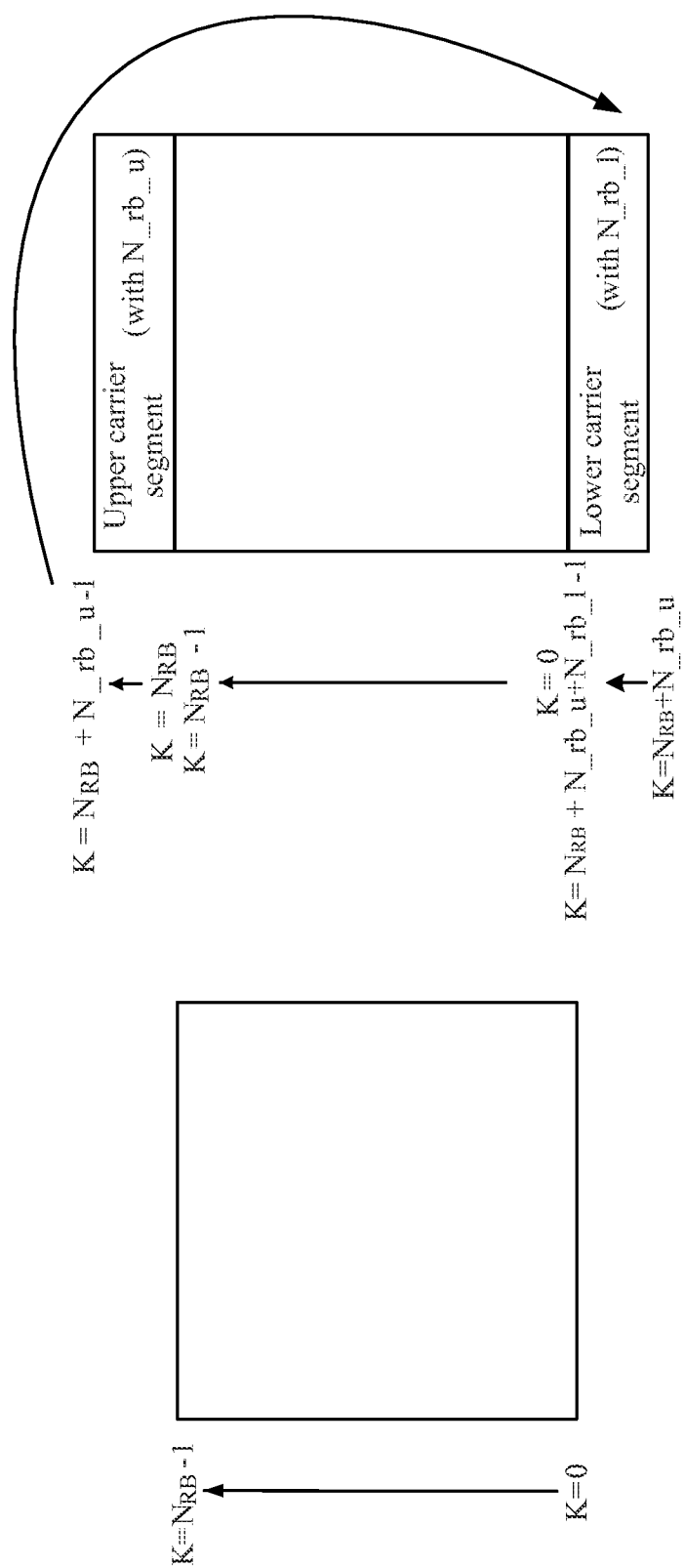
FIGS. 19 and 20 are diagrams illustrating examples of numbering procedures for Physical Resource Blocks (PRB) s.
Figure 20:
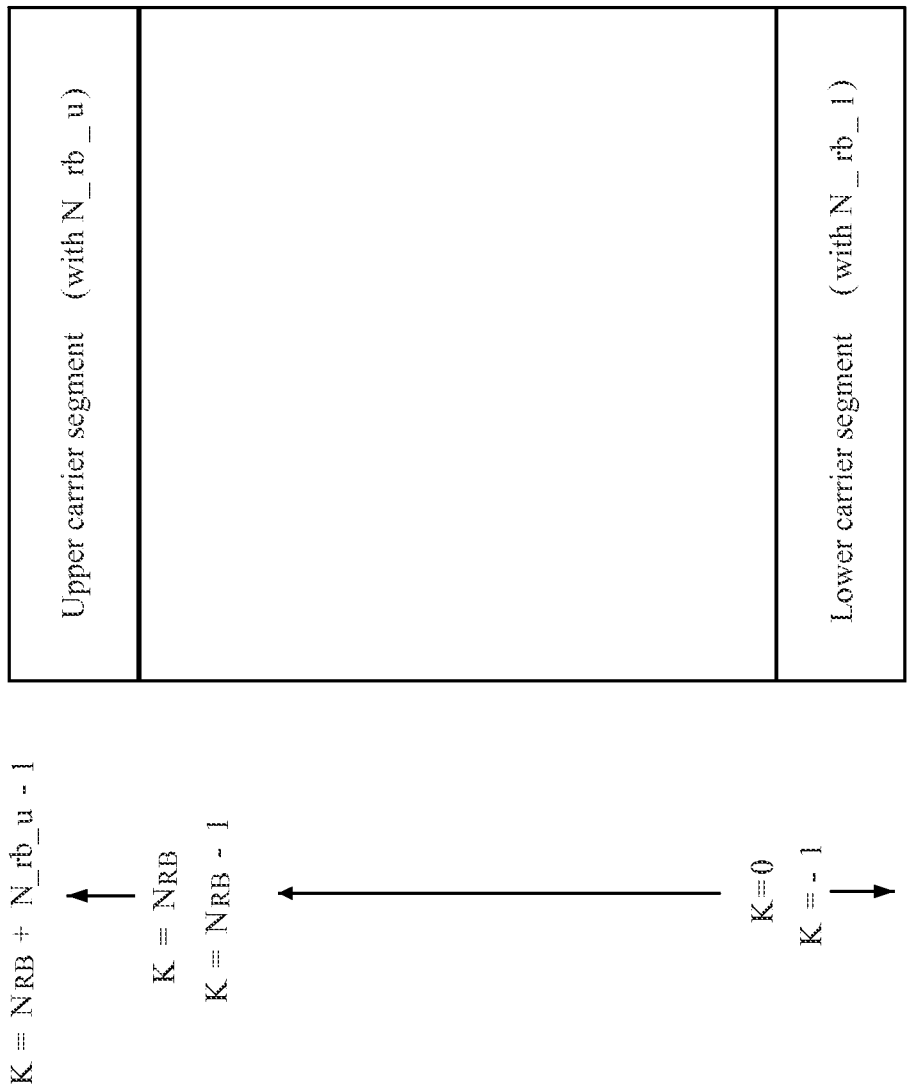

FIGS. 19 and 20 are diagrams illustrating examples of numbering PRBs with carrier segments. Several variations may exist for numbering PRBs in carrier segments. FIG. 19 shows one example of such a process. As shown in the FIG. 19, the PRBs in the main carrier may be numbered first, then the upper carrier segment may be numbered following the lower carrier segment (e.g., with wrapping around). FIG. 20 shows another example numbering process. As shown in the FIG. 20, consecutive numbering for the overall carrier occurs. In this case, the RBs in the lower carrier segment may be numbered with negative values.

The PDSCH may be mapped to physical resources in the extended bandwidth (e.g., mapping to REs with carrier segments). This may be related to resource allocation for carrier segments including mapping from VRB to PRB in carrier segments.

Modulated data symbols may be mapped to REs/RBs first in the main serving cell and then the rest of the modulated symbols may be mapped to REs/RBs in carrier segments. The mapping of modulated data symbols into RBs may occur in ascending order of RB index numbers, for example, starting with the lowest RB index number (e.g., with an RB index of zero). Because there may be no PBCH, no synchronization signals (PSS/SSS) and/or no CRS in the carrier segments, Res (e.g., all Res) (e.g., except for DM-RS and possible CSI-RS) in the physical RBs corresponding to the VRBs assigned for PDSCH may be used for PDSCH in the carrier segments.

Figure 21:
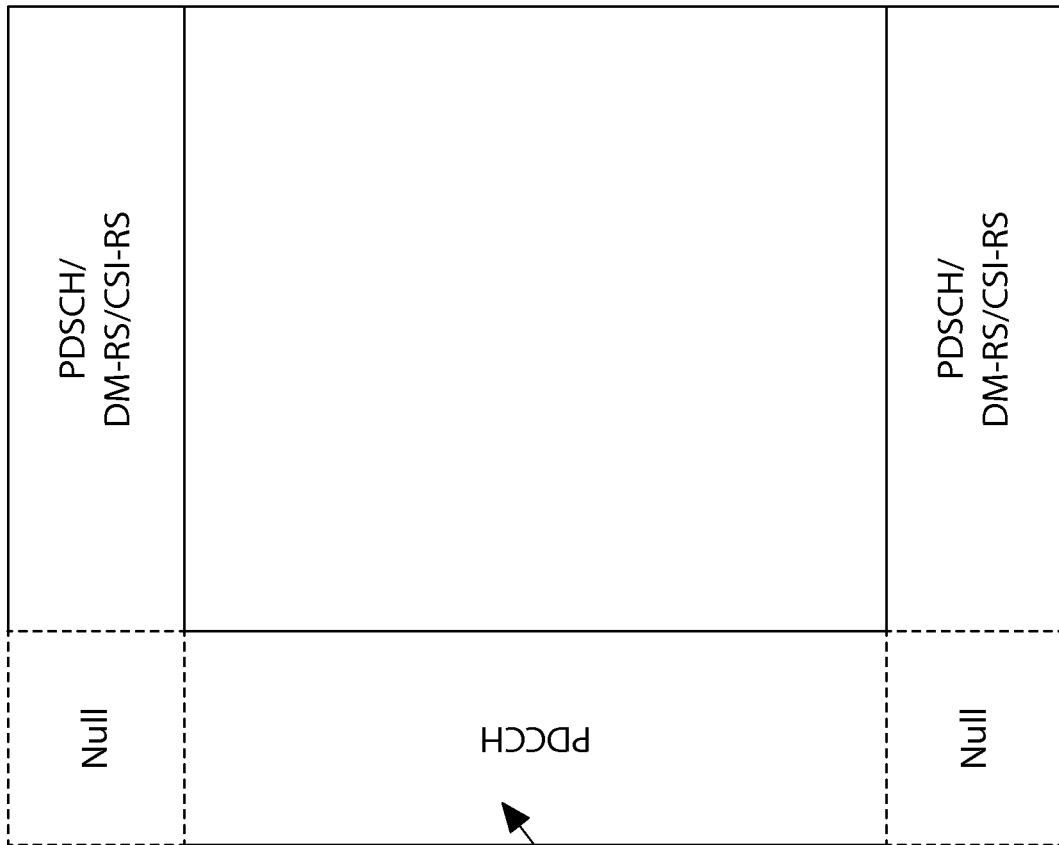
FIGS. 21 and 22 are diagrams illustrating example mapping of PDSCH in carrier segments.

Unused symbols of the control region in carrier segments may be reclaimed (e.g. reused). The starting OFDM symbol for the PDSCH transmission in carrier segments may be defined. For example, the starting OFDM symbol for the PDSCH in the carrier segment may be the same as of the linked serving cell. The starting symbol for the PDSCH may be offset with regard to the starting OFDM symbol for the linked serving cell. FIG. 21 is a diagram illustrating an example mapping of PDSCH in carrier segments.

Figure 22:
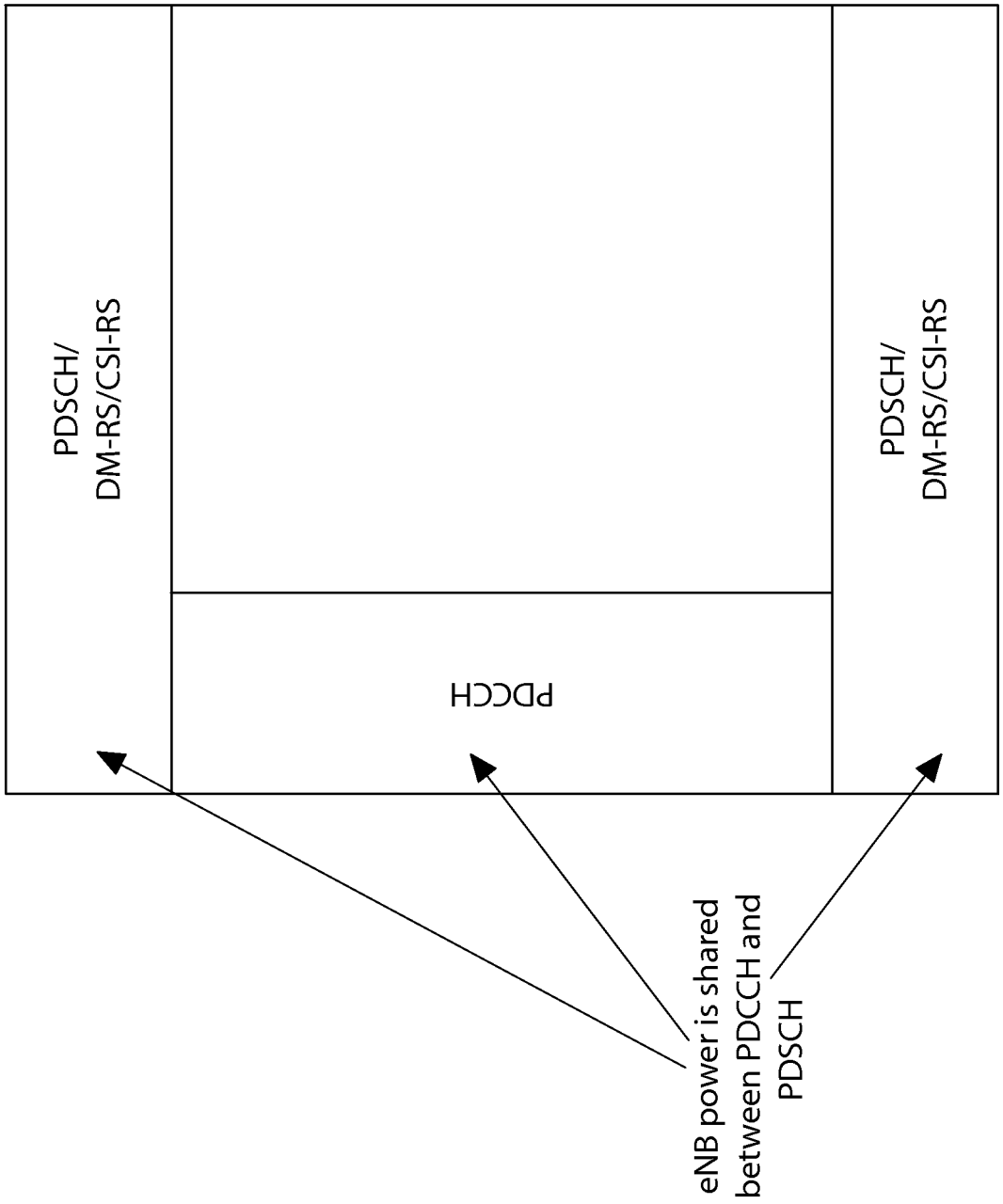

The carrier segments may have their own starting OFDM symbol within the carrier segments. The starting OFDM symbol for the PDSCH in carrier segments may be given to the WTRU via higher layer signaling or L1 signaling (e.g., using PCFICH). The particular symbol may be predefined (e.g., the first OFDM symbol), for example, during the configuration and/or activation of the carrier segments. The eNB may configure each R11 WTRU between the implementations described herein via L1 (e.g., dynamic) and/or L2/3 signaling (e.g., semi-static). FIG. 22 is a diagram illustrating an example mapping of PDSCH in carrier segments.

The PDSCH EPRE (Energy per RE) in carrier segments may be defined. The PDSCH EPRE (Energy per RE) in carrier segments may include the same EPRE as for the PDSCH on the linked BC CC. The WTRU may consider that the power based on $\rho_B$ may be applied for the PRBs in the carrier segments. The Tx power (EPRE) of PDSCH in carrier segment may be different from that on the linked BC CC (e.g., for DL interference coordination/management). With different power allocations for the carrier segments and the backwards compatible CC, the eNB may control interference (e.g., inter-cell interference) differently between the carrier segments and the backwards compatible CC. The transmit power levels for different carrier segments may be different. If the transmit power levels between the carrier segments and the linked CC are different, then the power ratio (e.g., or power difference) may be signaled to the WTRU via, for example, broadcast signaling or dedicated signaling.

WTRU procedures for receiving PDSCH on extension carriers may be described herein. An extension carrier may be configured as a SCell, but without some of the PHY channels/signals, for example, no PBCH, no PDCCH/PHICH/PCFICH, no PSS/SSS, and/or no CRS (e.g., in Rel11). A WTRU configured with an extension carrier may not be used to receive/process the PHY channel(s)/signal(s) which may not be transmitted on the extension carrier. For example, if the (legacy) CRS is not present in the extension carrier, the WTRU may not perform CRS based channel estimation for the extension carrier. In the absence of some of the control/system information, the extension carrier may not be accessible and/or backward compatible to UEs of a previous release.

Each extension carrier may be configured differently. Implementations associated with receiving PDSCH extension carriers may be described herein.

Knowing the physical characteristics of an extension carrier may be discussed herein (e.g., receiving a configuration for an extension carrier from the eNB). As an extension carrier may have different characteristics than a legacy serving cell, any distinction may be made for an extension by a WTRU configured for the extension carrier, so that the WTRU may receive PDSCH on the extension carrier. The WTRU may know the physical characteristics of an extension carrier configured for it.

For example, during RRC connection (re)configuration that adds a serving cell (e.g., using dedicated RRC signaling), the WTRU may be configured with an extension carrier (as a SCell) with (additional) extension carrier specific parameters. Such extension carrier specific parameters may include any combination of the following: bandwidth of the extension carrier (e.g., in terms of number of RBs); CRS configuration (e.g., presence or absence of CRS in the extension carrier), and CRS pattern, if CRS is present; and/or the number of antenna ports used for CRS transmission, if CRS is transmitted in the extension carrier. RRC connection (re)configuration for an extension carrier may be done by the PCell or the serving cell linked to the extension carrier.

During RRC connection (re)configuration that adds a serving cell, a parameter in RRC signaling may indicate to the WTRU whether the configured carrier is an R-10 SCell or an R-11 SCell. Some characteristics (e.g., physical characteristics) may be predefined and/or standardized for R-11 SCell (e.g., extension carriers), such as but not limited to, no PSS/SSS, no PBCH, no PDCCH/PHICH/PCFICH and/or no CRS.

During RRC connection (re)configuration that adds a serving cell, the WTRU may derive/determine the carrier type of the configured serving cell, for example, by the cell ID (e.g., SCellID), the type of IE used (e.g., translating in one bit flag in ASN.1 according to standard practice for ASN.1) and/or whether or not a given parameter is present, etc. For example, if a parameter x is present in the configuration of the SCell, then the WTRU may know that the configuration is for an R-11SCell (e.g., extension carrier).

A L1 indicator regarding the type of the carrier may be signaled to the WTRU, for example, in the PDCCH corresponding to the carrier. For example, a flag bit(s) indicating the type of the carrier may be included in the PDCCH for the concerned carrier.

Depending on the DCI format in PDCCH and/or transmission mode (TM) (or combination of the DCI format and TM) used for the concerned carrier, the WTRU may identify/derive the type of the carrier. For example, if the WTRU is configured with TM x in the carrier and/or DCI format y for the carrier, the WTRU may consider that the carrier is of a given carrier type (e.g., extension carrier). A new DCI format(s) and/or a new TM(s) may be defined/supported for extension carriers.

Once the (e.g., R-11) WTRU knows about the type of the configured carrier (e.g., using one or a combination of the above embodiments), it may perform some PHY functions (e.g., PHY procedures) with the carrier, accordingly, but may also avoid unnecessary operation(s). For example, if the WTRU is configured with an extension carrier not carrying PBCH, PSS/SSS, PDCCH, and/or CRS, then it may skip any operation(s) (e.g., some PHY procedures) associated with the PHY channel(s)/signal(s) not transmitted in the concerned carrier. If some control/system information and/or measurement/synchronization information used for the concerned carrier may not be available from the carrier due to the absence of some PHY channel(s)/signal(s), then the WTRU may obtain/acquire the information/parameter(s) from another carrier (e.g., PCell or the linked carrier).

Cross-carrier scheduling for extension carriers (e.g., in the case of no PDCCH in extension carrier) may be described herein. If PDCCH is not configured for an extension carrier, cross-carrier scheduling for the extension carrier may be performed by a linked serving cell. In addition, a new DCI format(s) may be supported for extension carriers in R-11 and beyond. In order to minimize any (negative) impact on the WTRU PDCCH decoding complexity, it may be advantageous to provide some constraints on blind decoding of PDCCH for extension carriers.

When a WTRU is configured with an extension carrier(s), each extension carrier may have an associated legacy (e.g., backward compatible) carrier which may be configured for the WTRU. The association may be provided for the WTRU (e.g., via RRC signaling) as part of the configuration information for the extension carrier. The legacy carrier may be associated with multiple extension carriers configured for the WTRU. The individual extension carrier may be cross-carrier scheduled with the associated legacy carrier. For example, as in R-10, for a given extension carrier, the CIF (carrier indicator field) in the corresponding PDCCH transmitted on the associated legacy carrier may be used for supporting cross-carrier scheduling for the extension carrier. Each extension carrier configured for a WTRU may have a unique cell ID which may be the same CIF value for the extension carrier. A group of extension carriers configured for a WTRU may have same cell ID.

An extension carrier specific RNTI may be assigned to each extension carrier and/or a group of extension carriers. A PDCCH for an extension carrier may have CRC bits scrambled with extension carrier specific RNTI. The WTRU configured with an extension carrier may perform blind decoding of PDCCH for the extension carrier using the assigned RNTI.

In order to reduce the complexity of blind decoding of PDCCH for an extension carrier, the any combination of the following restrictions on cross-carrier scheduling for extension carriers may be specified.

For a given extension carrier, PDSCH transmission on the extension carrier may be cross-carrier scheduled from PDCCH on the associated legacy carrier (e.g., only on the associated legacy carrier).

A set (e.g., limited set) of reception type combinations and/or monitored RNTI types may be used for extension carriers, for example, so that a WTRU configured with an extension carrier may monitor the set of PDCCH candidates on the associated legacy carrier. For example, an extension carrier configured for a WTRU may transmit (e.g., only transmit) dynamically scheduled unicast data, so that, for example, the extension carrier the WTRU may monitor PDCCH with CRC scrambled by C-RNTI (e.g., in the WTRU specific search space of the associated legacy WTRU). A WTRU configured with an extension carrier may not be used to monitor PDCCH configured for the extension carrier and with CRC scrambled by SPS C-RNTI in the WTRU-specific search space of the associated carrier.

For an extension carrier, PDCCH with CRC scrambled by C-RNTI or SPS C-RNTI may be supported (e.g., only supported) in the WTRU-specific search space of the associated legacy carrier, even if the associated carrier is the primary carrier.

DCI formats specific to extension carriers may be described herein. The DCI formats to decode in the WTRU specific search space may depend on the transmission mode configured for the WTRU (e.g., in R-10). Transmission modes may correspond to different MIMO configurations.

In order to reduce the number of blind decoding attempts, a set (e.g., limited set) of DCI formats may be supported for extension carriers. Extension carriers may be configured within a small system bandwidth. DCI formats having full flexibility in resource block (RB) assignment may not be used.

If CRS is not configured in an extension carrier, a WTRU configured with the extension carrier may be expected to be configured in transmission mode 9 using a certain set of DCI formats (e.g., DCI format 1A and 2C).

DCI format(s) and/or transmission mode(s) may be defined to support extension carriers (e.g., in R-11) where such DCI format(s) and/or transmission mode(s) may be used with/without CRS in a carrier.

PDSCH starting position in extension carrier may be described herein. The starting OFDM symbol for the PDSCH of a serving cell in the first slot in a subframe may be dynamically varied on a per subframe basis independently for each carrier, for example, depending on the number of OFDM symbols occupied by the PDCCH region located to the first part of each subframe (e.g., in R-10). The start of the PDSCH region may be semi-statically configured when using cross-carrier scheduling.

PDCCH may not be configured in an extension carrier, so that the PDSCH of the extension carrier may be transmitted in the carrier from the first OFDM symbol in the first slot in a subframe (e.g., in R-11). The PDSCH may be transmitted starting from the n-th OFDM symbol where N>1, for example, in order to reduce inter-cell interference to an adjacent cell where PDCCH is configured in the carrier.

The WTRU configured with an extension carrier may know that the starting position for the data region on the extension carrier upon which the intended PDSCH is transmitted.

The starting OFDM symbol for PDSCH of an extension carrier may be the same as that of the associated legacy carrier in which PDCCH of the extension carrier is transmitted (e.g., cross-carrier scheduled). The WTRU may use the same PDSCH starting position for the legacy carrier for the extension carrier.

The starting OFDM symbol for PDSCH of an extension carrier may be signaled in a (e.g., newly defined) PDSCH starting position field in the corresponding PDCCH of the extension carrier where the PDCCH may be transmitted in an associated legacy WTRU. After decoding the PDCCH of an extension carrier, the WTRU may know the PDSCH starting position for the extension carrier. A PDSCH starting position field may be defined in PDCCH of an extension carrier. For example, the TPC bit field (e.g., with 2 bits) in the R-10 PDCCH with DCI format 1/1A/2/2A/2B/2C may be replaced by the PDSCH starting position field.

The WTRU may use the value indicated in the PCFICH on the serving cell carrying the PDSCH.

A higher-layer configuration parameter may be provided (e.g., on a semi-static manner) for the WTRU for the serving cell upon which PDSCH is received. The higher layer configured parameter value may differ from the value signaled on the PCFICH on the cell carrying the PDSCH transmission.

Any combination of the above procedures may be used for the WTRU to know the starting position for the PDSCH transmission on the extension carrier.

Carrier segments in MBSFN subframes may be described herein. A subset of the DL subframes in a radio frame (e.g., 10 msec) on a serving cell may be configured as MBSFN subframes by higher layers (e.g., in R-10). Each MBSFN subframe may be divided into a non-MBSFN region and/or an MBSFN region. In the MBSFN subframes configured for PMCH transmission, a WTRU may not monitor a PDCCH of a serving cell (e.g., PCell or SCell) in order to receive PDSCH intended for the WTRU. In a MBSFN subframe which is configured for PMCH transmission, if a WTRU is configured to use carrier segments for a serving cell (e.g., PCell and/or SCell), the WTRU may transmit (or be configured to transmit) PDSCH in the carrier segments of the serving cell. For example, when PMCH is transmitted on the PCell in a MBSFN subframe, the WTRU (e.g., configured to use carrier segments for the PCell) may receive PMCH on the PCell and/or PDSCH in the carrier segments of the same PCell in the same MBSFN subframe. For example, as shown in FIG. 22. The PDCCH, corresponding to the PDSCH transmitted in the carrier segments, may be transmitted in the PDCCH region (e.g., non-MBSFN region) of the PCell or be cross-carrier scheduled from another serving cell configured for the WTRU.

If a SCell configured for the WTRU has carrier segments for the WTRU, then the WTRU may be configured to receive PDSCH (e.g., intended for it) within the carrier segments of the SCell in a MBSFN subframe. In MBSFN subframes, the CP length used in the non-MBSFN region (e.g., PDCCH region) may be the same CP length as used for subframe 0. The CP length used for the non-MBSFN region of a MBSFN subframe may be different from that used for the MBSFN region of the same subframe. When carrier segments are configured for a serving cell, if the CP lengths for the non-MBSFN region and MBSFN region, respectively, in a given MBSFN subframe on the serving cell are different, then the first one or two OFDM symbols (e.g., corresponding to the non-MBSFN region) in the MBSFN subframe may not be used for PDSCH transmission in the carrier segments. The OFDM symbols (e.g., all OFDM symbols) (e.g., including the non-MBSFN region and, for example, with a different CP length than the CP used in the MBSFN region) of the carrier segments in the MBSFN subframe may be used for the PDSCH transmission for a WTRU configured with the carrier segments.

A WTRU configured with carrier segments of a serving cell may be configured to receive both PDSCH and PMCH (e.g., simultaneously) in a given MBSFN subframe where PMCH is received on the serving cell (e.g., PCell), while the PDSCH, intended for the WTRU, may be transmitted in the carrier segments. The CP length used for the carrier segments may follow the CP length used for the linked main carrier OFDM symbol-by-OFDM symbol.

As in the MBSFN region of the main carrier, the extended CP may be used for the MBSFN region of the carrier segments and transmission, if any, in the non-MBSFN region of the carrier segments may use the same CP as used for subframe 0. In MBSFN subframes, if PDSCH is transmitted in carrier segments, the starting OFDM symbol for the PDSCH of the carrier segments may be configured and/or signaled to WTRU(s) (e.g., via L2/3 signaling).

In MBSFN subframes, the transmission mode (and/or antenna ports) used for carrier segments may be set for each WTRU configured for the carrier segments. TM 9 with extended CP may be used (e.g., always used) for PDSCH transmission in carrier segments.

In MBSFN subframes not used for PMCH transmission, when carrier segments are configured for a serving cell, the configuration of the carrier segments, such as frame structure, TM, antenna port configuration, and/or CP length, etc, may be identical to that of the linked serving cell. For example, PDSCH transmission in the non-MBSFN region of the carrier segments may use TM 9. The PDSCH in the carrier segments may use extended CP.

Figure 23:
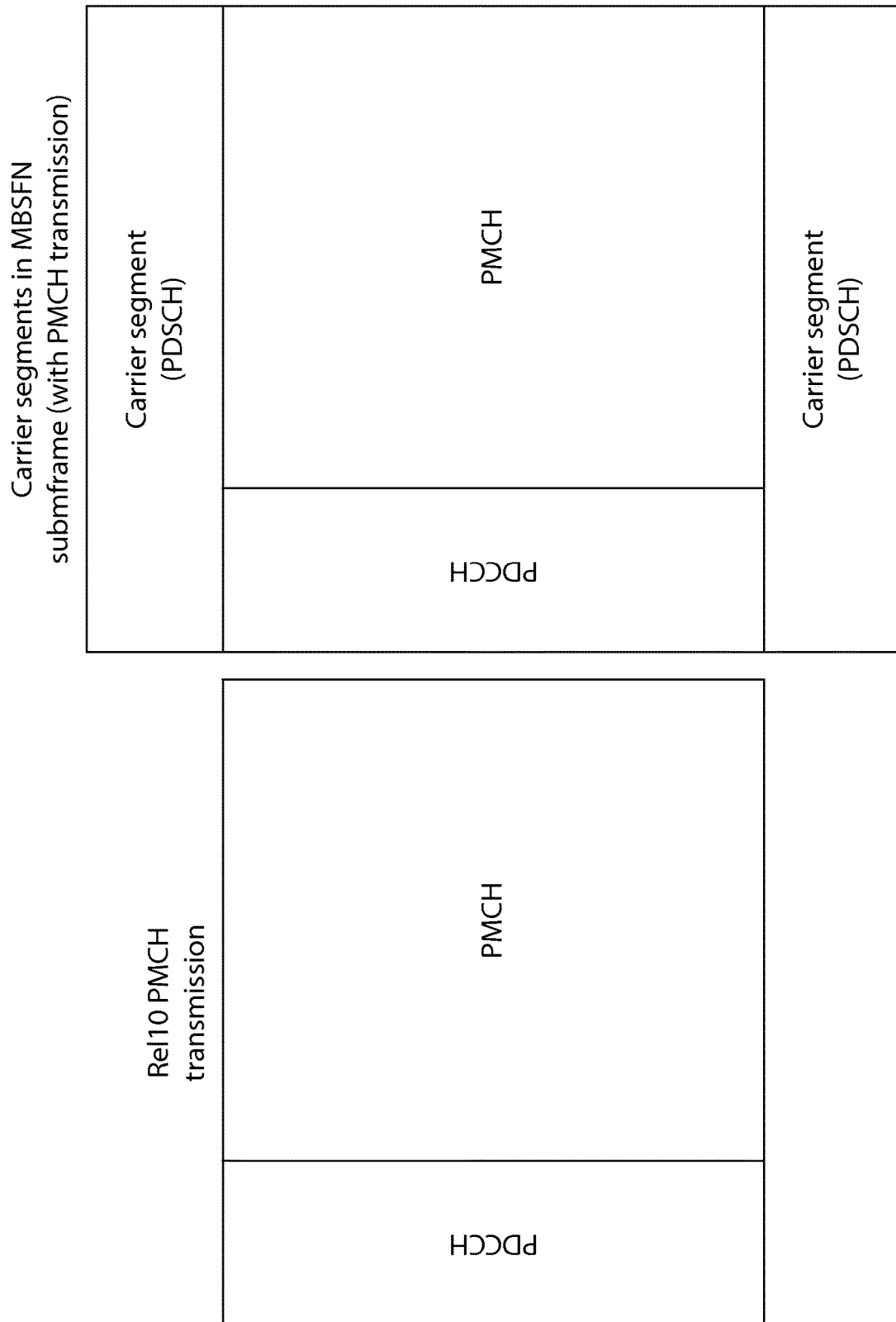
FIG. 23 is a diagram illustrating an example of PDSCH transmission in carrier segment in MB SFN subframes.

FIG. 23 is a diagram illustrating an example of PDSCH transmission in carrier segments in the MBSFN subframes.

PDSCH transmission on extension carrier in MBSFN subframes may be described herein. In the MBSFN subframes configured for PMCH transmission, a WTRU may not monitor a PDCCH of a serving cell (e.g., PCell or SCell) in order to receive PDSCH intended for the WTRU (e.g., in R-10). The PDSCH may be transmitted on the extension carrier in a MBSFN subframe.

In MBSFN subframes (e.g., except the subframes indicated by higher layers to decode PMCH), when a WTRU is configured with a given extension carrier, the WTRU may attempt to decode a PDCCH of the extension carrier (with CRC scrambled, for example, by the C-RNTI, the EC-RNTI, or equivalent RNTI, with a corresponding DCI format intended for the WTRU) where the PDCCH may be cross-carrier scheduled by a serving cell and/or be transmitted on the extension carrier. The WTRU, upon detection of a PDCCH of the extension carrier, may decode the corresponding PDSCH on the extension carrier in the same subframe.

The WTRU may be configured for transmission mode 9 (or a new R-11 TM) with a given extension carrier supporting TM 9 (or a new R-11 TM).

In MBSFN subframe including the subframes indicated by higher layers to decode PMCH, when a WTRU is configured with a given extension carrier, the WTRU may follow the same procedure a described above regarding TM 9.

In a MBSFN subframe, an extension carrier may support (e.g., only support) TM 9 (or a new R-11 TM).

In MBSFN subframes, including the subframes indicated by higher layers to decode PMCH, when a WTRU is configured with a SCell, the WTRU may attempt to decode a PDCCH of the SCell (with CRC scrambled, for example, by the C-RNTI or equivalent RNTI, with a corresponding DCI format intended for the WTRU) where the PDCCH may be cross-carrier scheduled by a serving cell and/or be transmitted on the SCell. The WTRU, upon detection of a PDCCH of the SCell, may decode the corresponding PDSCH on the SCell in the same subframe. The carrier segments may be configured for the concerned SCell.

Synchronization for extension carriers/carrier segments may be described herein. If PSS/SSS is not transmitted on an extension carrier (or a new R11 carrier), a WTRU configured with the extension carrier (or new R11 carrier) may be used to obtain/maintain time and/or frequency synchronization for the extension carrier without PSS/SSS. The WTRU may obtain other information (e.g., cell ID and CP length) for initial synchronization. Several considerations for synchronization procedures for the extension carrier may be described herein.

Without the PSS/SSS in the extension carrier, the WTRU may receive some synchronization information of the concerned extension carrier using, for example, dedicated configuration signaling (e.g., RRC signaling) from a legacy serving cell. The synchronization information may include the carrier frequency, the system bandwidth, the cell ID (e.g., parameter physCellId), the CP length of the extension carrier, and/or some timing information (e.g., timing offset between multiple serving cell transmissions in the DL) among others, as part of the system information element, system information block and/or configuration parameters. If the PBCH is transmitted on the extension carrier, some of the synchronization relevant information (e.g., such as the system bandwidth and/or some timing information, among others) may be carried in the PBCH. The PBCH may include in a higher layer message (e.g. RRC message) an indication regarding which reference/associated serving cell the WTRU may be based on to obtain/maintain the time and/or frequency synchronization for the extension carrier. A list of physical signal(s)/channel(s) configured/carried in the concerned extension carrier (e.g., including the configuration parameters of the respective physical signal/channel, if any) may be provided for the WTRU, for example, as part of the system information element, system information block, and/or RRC configuration parameters) for the extension carrier. Depending on which physical signal(s)/channel(s) relevant to synchronization is not transmitted in the extension carrier, the WTRU may determine how to acquire synchronization information (and/or to drive/maintain synchronization).

Regarding Cell ID detection, in the case of no PSS/SSS transmission on an extension carrier (or a new R11 carrier), the WTRU may be provided with the cell ID of the extension carrier through RRC signaling from the associated legacy serving cell.

Regarding CP length detection, the WTRU may be provided with the CP length of the extension carrier through RRC signaling from the associated legacy serving cell (e.g., similar to cell ID detection).

Regarding time synchronization (e.g., symbol and frame synchronization), when the WTRU is configured with an extension carrier and the associated serving cell (e.g., the PCell), both of which may be transmitted from the same site and may be accurately synchronized in time, the WTRU may use the extension carrier time synchronization obtained through the associated serving cell. For example, the WTRU may accomplish initial time synchronization of the extension carrier based on the time synchronization of the associated serving cell, which may be done based on the PSS/SSS and CRS signals on the associated serving cell. Some inter-band aggregated carriers (e.g., those transmitted from the same site) may apply the same principle. As a function of the propagation characteristics of the aggregation carriers, which may be dependent (e.g., mainly dependent) on the deployment layer/scenario, the resulting burden onto the WTRU receiver design to cope with Rx window uncertainties may become cumbersome.

If the extension carrier and the associated serving cell are transmitted from different transmission points (e.g., RRH), different delay propagation characteristics may result. The WTRU may not use the extension carrier timing synchronization obtained through the associated serving cell. The WTRU may acquire the timing synchronization for the extension carrier using one or more of the followings.

If the CRS is transmitted on the extension carrier, the WTRU may use the CRS as a potential reference for time synchronization on the extension carrier. The CRS, which is configured/transmitted on the extension carrier, may be a configuration different than the R10 CRS. For example, the CRS may not be configured to be transmitted every subframe on the extension carrier. It may be configured to be transmitted every N subframe, where N>1.

If other RS (e.g., unprecoded DM-RS or CSI-RS) is configured/transmitted on the extension carrier, the WTRU may use the RS (e.g., combined with another RS and/or physical channel/signal) as a potential reference for time synchronization on the extension carrier.

The WTRU may be provided through higher layer signaling with an aggregated legacy carrier (e.g., the associated PCell or another serving cell/carrier) which the WTRU may reuse the time synchronization of the legacy carrier for the extension carrier.

The eNB may transmit either the PSS or the SSS on the extension carrier so that the WTRU may use the PSS and/or SSS for time synchronization/tracking (e.g., combined with other physical channel(s)/signal(s), for example, CRS, DM-RS and/or CSI-RS, if configured on the extension carrier).

The WTRU may be provided through higher layer signaling or L1 signaling timing information (e.g., such as a time difference between the extension carrier and the associated or reference carrier).

Higher layer signaling (e.g., that is broadcasted or that uses dedicated configuration signaling from the network) may indicate to the WTRU a serving cell which may be used by the WTRU as a DL timing reference for the extension carrier. The WTRU may align the timing (e.g., system frame number and/or subframe starting time) of the extension carrier with that of the indicated serving cell.

Via higher layer signaling (e.g., RRC signaling), a timing offset parameter (e.g., in terms of a time unit, Ts) may be indicated to the WTRU with and/or a reference/associated serving cell (e.g., PCell or SCell) serving as a timing reference such that the WTRU may determine the timing of the reference serving cell. The WTRU may derive the timing of the extension carrier based on the timing of the reference serving cell and/or the configured/signaled timing offset parameter.

A reference signal or signals (e.g., CRS, un-precoded DM-RS, and/or CSI-RS) transmitted on the extension carrier may be used by the WTRU for tracking (or assisting) timing synchronization (e.g., aligning the subframe starting time) for the extension carrier. The CRS may be configured similarly to the legacy CSI-RS (e.g., in terms of subframe configuration and/or zero power bitmap). For the un-precoded DM-RS, the precode may be obtained through signaling.

Any one or a combination of the above procedures for time synchronization with the extension carrier may be implemented.

Regarding frequency synchronization, when the WTRU is configured with an extension carrier and the associated serving cell/carrier, both of which may be transmitted from the same site and accurately synchronized in frequency/time, the WTRU may use the extension carrier frequency synchronization obtained through the associated serving cell. For example, the WTRU may accomplish frequency synchronization (e.g., including initial frequency synchronization) of the extension carrier based on the frequency synchronization of the associated serving cell (e.g., which may be done based on the PSS/SSS and CRS signals on the associated serving cell). As the aggregated carriers may be co-located, the changes in frequency, for example, due to Doppler may be the same on both the carriers. Depending on the RF Rx implementation in the WTRU, for example, the intra-band aggregation scenarios may qualify for this operating principle.

If the extension carrier and the associated serving cell/carrier are transmitted from different transmission points (e.g., RRH), then different delay Doppler profiles on the extension carrier and associated serving cell/carrier may occur. The WTRU may not use the extension carrier frequency synchronization obtained through the associated serving cell. The WTRU may acquire/maintain the frequency synchronization for the extension carrier using one (or a combination) of the followings.

The WTRU may acquire the carrier/center frequency of the extension carrier from the associated (e.g., reference) serving cell (or an aggregated carrier) where the carrier frequency may be provided for the WTRU, for example, as part of the system information element, system information block, and/or RRC configuration parameters for the extension carrier.

The WTRU may track/maintain frequency synchronization using a reference signal (e.g., the WTRU-specific RS, the un-precoded DM-RS, CRS, and/or CSI-RS) configured/transmitted on the extension carrier. The CRS may be configured similarly to the legacy CSI-RS, e.g., in terms of subframe configuration and/or zero power bitmap.

If the CRS is configured/transmitted on the extension carrier, the WTRU may use the CRS as a potential reference for frequency synchronization on the extension carrier. In this case, the CRS, which may be configured/transmitted on the extension carrier, may be a configuration different from the R10 CRS. For example, the CRS may not be transmitted every subframe on the extension carrier. It may be configured for transmission every N subframe, where N>1.

If other RS (e.g., unprecoded DM-RS or CSI-RS) is configured/transmitted on the extension carrier, the WTRU may use the RS (e.g., alone or combined with another RS or physical channel/signal) as a reference for frequency synchronization on the extension carrier. For the un-precoded DM-RS, the precode may be obtained through signaling. For example, if the CRS (or the CSI-RS) is transmitted on the extension carrier, then the WTRU may utilize the CRS (or the CSI-RS) to conduct (or assist) frequency synchronization for the extension carrier.

The WTRU may be provided (e.g., through higher layer signaling) with an aggregated legacy carrier (e.g., the associated PCell or another serving cell/carrier), which the WTRU may reuse, the frequency synchronization of the legacy carrier for the extension carrier.

The eNB may transmit the PSS or the SSS on the extension carrier such that the WTRU may use it for frequency synchronization/tracking (e.g., alone or combined with other physical channel(s)/signal(s) (e.g., CRS, DM-RS and/or CSI-RS, if configured on the extension carrier).

The WTRU may be provided through (e.g., higher layer signaling or L1 signaling) with frequency information such as frequency difference between the extension carrier and the associated (or reference) carrier.

For example, to reduce or eliminate the effect of frequency errors arising from a mismatch of the local oscillators between the Tx and the Rx, as well as Doppler shifting caused by any WTRU motion, the WTRU may adjust/refine frequency (and/or time) synchronization using one (or a combination) of the followings:

Frequency offsets may arise from factors such as, but not limited to, temperature drift, ageing, and imperfect calibration. An equation for Doppler shift may be as follows:

$$fd = (fc\ v/c)$$

where fc may be the carrier frequency, v may be the WTRU speed in meters per second, and c may be the speed of light ($3\times10^8$ m/s). If fc is 2 GHz and v is 500 km/h, then the Doppler shift fd may be 950 Hz.

The WTRU may track/maintain frequency synchronization, for example, based on the frequency synchronization correction result of the associated (e.g., reference) serving cell and the carrier frequency difference between the extension carrier and the associated serving cell. For example, the carrier frequency offset estimate of the extension carrier may be given by:

$$fc_{,offset,extensionCarrier} = \alpha * fc_{,offset,servingCell} + \beta * g(fc_{,extensionCarrier} - fc_{,servingCell})$$

where $fc_{,offset,extensionCarrier}$ may be the frequency offset estimate of the extension carrier, $fc_{,offset,servingCell}$ may be the frequency offset estimate of the associated serving cell, $fc_{,extensionCarrier}$ may be the center frequency of the extension carrier, $fc_{,servingCell}$ may be the center frequency of the associated serving cell, a and p may represent weighting coefficients/factors, $0 <= \alpha$, $\beta <= 1$, and $g(\cdot)$ may represents a function of the carrier frequency difference between the extension carrier and the associated serving cell.

PSS and/or SSS may be configured/transmitted on an extension carrier. For time and/or frequency synchronization on the extension carrier, the WTRU may use one or a combination of the implementations described herein (e.g., described with regard to when PSS and SSS are not configured on the extension carrier).

The WTRU may use one or a combination of PSS and/or SSS and CRS (or CSI-RS) transmission on the extension carrier, which may be configured with less frequencies and/or configured differently (e.g., in terms of time and frequency grid/domain).

When PSS and/or SSS is transmitted on an extension carrier (for example, for the case that the aggregated carriers are not co-located), the WTRU may obtain initial time and frequency synchronization from the PSS and/or SSS transmitted on the extension carrier, while updates/maintenance of its time and frequency reference may be obtained from the scheduled CRS, CSI-RS, and/or un-precoded DMRS. The scheduled CRS may be configured similarly to the legacy CSI-RS in terms of subframe configurations and/or the zero power bitmap. For the un-precoded DM-RS, the precode may be obtained through signaling. The PSS and/or SSS signals may be configured with longer periods compared to the legacy period of 5 ms to mitigate interference and save energy.

Within some RBs, resource elements (e.g., additional resource elements) may be used (or reserved) for the transmission of RS (or synchronization signals).

Regarding Radio Link Failure (RLF)/Radio Link Monitor (RLM) for extension carriers, the WTRU may monitor the radio link quality of the extension carrier, for example, using a reference signal or signals (e.g., CRS, DM-RS, and/or CSI-RS, if available). During a certain period (e.g., configured by the network), the WTRU may assess radio link quality of the extension carrier (e.g., evaluated against one or more thresholds configured by higher layers). Higher layer signaling may indicate to the WTRU a set of subframes. The WTRU may not include these subframes in the set of subframe monitored for radio link for the extension carrier.

A WTRU (e.g., legacy) may be prevented from acquiring a carrier of a New Carrier Type (NCT). NCTs may be supported for CA where a carrier of the NCT may be linked (e.g., associated) with a legacy carrier (e.g., a PCell) (e.g., in R11). The carrier of the NCT may be non-backward compatible and may not be stand-alone. For example, the carrier may not be configured as a PCell for a WTRU (e.g., any WTRU including R8 to R10 UEs and, for example, even R11 UEs) and the carrier may be (e.g., may always be) configured/aggregated with the associated legacy carrier. For a NCT and, for example, a non-synchronized new carrier, PSS/SSS sequences (e.g. R8) may be transmitted. A legacy WTRU (e.g., R8 WTRU) may detect the PSS/SSS of the NCT, which may be undesirable as a WTRU (e.g., R8 WTRU) may camp on the non-backward compatible carrier.

If a WTRU (e.g., R8 WTRU) acquires synchronization to a NCT (e.g., by detecting the PSS/SS of the NCT), the WTRU (e.g., R8 WTRU) may attempt to decode the system information of the (non-backward compatible) carrier as part of the cell synchronization/access procedure. This behavior (of cell synchronization to the NCT carrier) may be unnecessary by the WTRU (e.g., R8 WTRU) and/or may cause the WTRU (e.g., R8 WTRU), for example, to increase its power consumption and/or delay the overall cell search process.

Implementations may prevent a WTRU (e.g., a R8 WTRU) from accessing a carrier of the NCT.

The existing PSS/SSS sequences may be kept unchanged and may modify a time-domain and/or a frequency-domain position of the PSS/SSS of a NCT (e.g., the new time/frequency domain configuration of PSS/SSS).

The time-domain position of PSS and/or SSS of a NCT may be modified. For example, the OFDM symbol locations of PSS/SSS may be swapped such that in the case of FDD, the PSS may be transmitted in the $2^{nd}$ to last OFDM symbol of the first slot of (for example, subframes 0 and 5) and the SSS may be transmitted in the last OFDM symbol of the same slot (e.g., after the PSS (for example, just after the PSS)). In the case of TDD, the PSS may be transmitted in the last OFDM symbol in, for example, slot 1 and 11 and the SSS may be transmitted in the $3^{rd}$ OFDM symbol in, for example, subframes 1 and 6.

The time location of either SSS or PSS may be modified (or configured), while keeping the time-domain position of the either PSS or the SSS unchanged. For example, the SSS may be transmitted in the N-th OFDM symbol after (or prior to) the PSS transmission, while excluding the legacy SSS position, e.g., the $2^{rd}$ to last OFDM symbol of the first slot of subframes 0 and 5 for FDD. N may be fixed or configured via high layer signaling of the linked/associated legacy carrier. If a legacy WTRU detects and/or identifies the PSS of a NCT (so that it may determine the cell ID within the cell ID group), the legacy WTRU may not determine the cell ID group itself (e.g., due to failure of the SSS detection, as the SSS position relative to the PSS may be changed).

The frequency location of the PSS and/or the SSS of a NCT may be modified.

R8 may allow a 100 kHz raster for placing the LTE channel within the operator owned bandwidth. A WTRU may scan carrier frequencies with a 100 KHz interval during an initial cell search. The minimum carrier spacing with contiguously aggregated component carriers may use 300 KHz to preserve the orthogonality for the subcarrier spacing of 15 KHz in the DL transmission (e.g., the least common multiple of [15, 100] KHz) (e.g., for LTE carrier aggregation). The center frequency position of the PSS/SSS may be offset from the center frequency of a NCT transmission bandwidth, for example, such that $f_{ss,NCT} = f_{c,NCT} + f_{offset}$ where $f_{c,NCT}$ may be the center frequency of the NCT transmission bandwidth (e.g., $f_{c,NCT} = f_c + k*300$ KHz where $f_c$ may be the lowest frequency in the operator owned band and k is an integer value) and/or the offset for the PSS/SSS may be $f_{offset} = 15$ KHz*c<300 KHz where c is an integer value. For example, the offset value may be a multiple of subcarrier spacing of 15 KHz and less than 300 KHz, e.g., $f_{offset} \in \{15, 30, 45, 60, \ldots, 285\}$. The center frequency position of the PSS/SSS (=$f_{ss,NCT}$) may not be in the multiple integer raster (100 KHz) such that the legacy WTRU may not be able to detect the PSS/SSS for the NCT. The offset value may be fixed and/or configured via high layer signaling of the linked/associated legacy carrier.

The existing PSS/SSS mapping to time and/or frequency domain may be kept unchanged and/or may define a new PSS and/or SSS sequences for a new carrier type. For example, a 1$^{st}$ part and a 2$^{nd}$ part of the PSS sequence may be swapped and/or reverse order of sequence n as set forth below:

Swap 1$^{st}$ part and 2$^{rd}$ part of the PSS, for example, as set forth in:

$$d_u(n) = \begin{cases} e^{-j\frac{\pi u n(n+1)}{63}} & n = 31, 32, \ldots, 61 \\ e^{-j\frac{\pi u(n+1)(n+2)}{63}} & n = 0, 1, \ldots, 30 \end{cases}$$

Reverse order of PSS sequence, for example, as set forth in:

$$d_u(61-n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases}$$

Swap 1$^{st}$ part and 2$^{nd}$ part of the PSS sequence and reverse order of PSS sequence, for example, as set forth in:

$$d_u(61-n) = \begin{cases} e^{-j\frac{\pi u n(n+1)}{63}} & n = 31, 32, \ldots, 61 \\ e^{-j\frac{\pi u(n+1)(n+2)}{63}} & n = 0, 1, \ldots, 31 \end{cases}$$

It may be determined or checked whether the above modification has the same correlation property (and/or a similar correlation property (e.g., above a threshold level), as the legacy PSS sequence].

ZC sequences may be used for the PSS that may be modified, for example, by using a different set of root index u for $N_{ID}^{(2)}$.

A different set of two length-31 binary maximal length sequences for SSS1 in subframe 0 and SSS2 in subframe 5 may be used. The design of two new m-sequences for NCT SSS may provide the same or similar performance to that of R8.

An overlay of code may be implemented on the PSS (e.g., applying a scrambling sequence on the PSS). For example, the PSS sequence may be overlaid with an overlay code o(n)=[1, −1, 1, −1, . . . , 1, −1] for n=0,1,2, . . . ,61 such that a polarity of odd numbered PSS sequence (e.g., all odd numbered PSS sequence) is reversed. The cross-correlation property of the ZC sequence may be checked with the overlay code.

The overlay code with a low correlation value may be obtained (for example, through computer search). The overlay code may be fixed or configured via high layer signaling of the linked/associated legacy carrier.

No change may be made in the existing PSS/SSS sequence and/or resource mapping. A legacy WTRU may be made to fail to acquire the MIB and/or the SIB.

A CRS design may be implemented, which is different from the following R8 design. In R8, the reference-signal sequence $r_{l,n_s}(m)$ may be defined by $$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 2N_{RB}^{max,DL} - 1$$

where $n_s$ may be the slot number within a radio frame and l may be the OFDM symbol number within the slot. The pseudo-random sequence generator may be initialized with $c_{init}=2^{10} \cdot (7 \cdot (n_s+1)+l+1) \cdot (2 \cdot N_{ID}^{cell}+1)+2 \cdot N_{ID}^{cell}+N_{CP}$ at the start of each OFDM symbol, where $$N_{CP} = \begin{cases} 1 & \text{for normal } CP \\ 0 & \text{for extended } CP \end{cases}.$$

For Example, a CRS design may be implemented for NCT that may modify the initialization of the pseudo-random sequence generator such that $$c_{init,NCT} = 2^{10} \cdot (7 \cdot (n_s + 1) + l + 1) \cdot (2 \cdot N_{ID}^{cell} + 1) + 2 \cdot N_{ID}^{cell} + N_{CP} + N_{NCT}$$

where $$N_{NCT} = \begin{cases} 1 & \text{for NCT} \\ 0 & \text{for legacy carrier} \end{cases}.$$

The $N_{NCT}$ may be configured, for example, via high layer signaling of the linked/associated legacy carrier.

The new CRS may be overlaid with a scrambling code, which may be unique for the NCT. The overlay code may be fixed or configured via high layer signaling of the linked/associated legacy carrier.

The PBCH may be removed (e.g., completely removed) and/or the MIB for NCT may be obtained (e.g., via high layer signaling of the linked/associated legacy carrier). If there is no PBCH for NCT, the legacy WTRU may not be able to detect the PBCH for NCT.

Different time/frequency location (e.g., duty cycles, location of subframes and/or OFDM symbols) of PBCH for the NCT may be configured from corresponding ones for the legacy carrier. Since the PBCH location for NCT may be changed relative to PSS/SSS location, the legacy WTRU may not be able to detect PBCH for the NCT.

A different SI-RNTI may be allocated for NCT accessible UEs from the SI-RNTI value 0xFFFF allocated for legacy UEs. The value may be taken from the RNTI values that are reserved (e.g., for future use). The legacy UEs may not be able to find the SIB1 and/or associated system information for the NCT that may be mapped to PDCCH/PDSCH.

A legacy WTRU may be prevented from reading the SIB1 from the NCT cell that may not have the PDCCH configured. The legacy WTRU may be unable to decode the PDCCH with the SI-RNTI and may be unable to retrieve the SIB1. R11+ UEs may be able to retrieve the SIB1 based on SI-RNTI transmitted via E-PDCCH and/or provided with SIB1 related information via dedicated signaling.

A legacy WTRU may be prevented from accessing the cell, for example, by causing the legacy WTRU to fail to properly decode and read an IE (e.g., a mandatory IE), and may discard the MIB. For example, the NCT cell may or may not broadcast its MIB with an invalid value for systemFrameNumber IE and may or may not include the proper SFN in the spare IE of the MIB. A R11+ WTRU may be configured to read and decode (e.g., properly read and decode) the SFN of the MIB from the NCT cell whereas a legacy WTRU may not be able to properly decode the SFN and may discard the MIB.

The MIB and/or SIB1 information may be used to prevent the legacy WTRU from camping on the NCT cell, as a suitable cell for normal operation (e.g., which may be an alternative to causing a failure to the MIB/SIB1 read procedure). For example, the legacy WTRU may continue its search for a suitable cell by having the NCT cell fail to meet the criteria of a suitable cell.

The network may allocate a special CSG ID (e.g., exclusively for R12 UEs) which may operate normally on the NCT. In SIB1 of NCT, the CSG indication may be set to TRUE and the CSG ID may be set, as the R12 specifically allocated CSG ID. Upon reading the SIB1 with the CSG information, a legacy WTRU, not having the CSG ID on its CSG whitelist, may not select this NCT as a suitable cell.

The network/operator of the NCT may allocate (e.g., possibly allocate) a separate PLMN ID for the network of the NCT cells. As part of deployment of the NCT cells, the operator may choose to allocate a different PLMN ID than the PLMN ID allocated to the legacy network. This NCT network PLMN ID may be allocated as an equivalent PLMN to the NCT supporting the UEs and not to the legacy UEs. The legacy WTRU, upon PLMN and cell selection, may remove NCT cells as a candidate for a suitable cell to camp on.

TAI and/or use of "forbidden tracking area for roaming" may be implemented. For example, the NCT may be allocated with and broadcast its Tracking Area Code (TAC) in the SIB1 that may be different and/or separate from backward compatible cells to which legacy UEs are allowed to attach. The legacy UEs may be provided, for example, as part of its subscription data, a list of tracking areas that may restrict access to the tracking area which includes the NCT cells. A group of NCTs in a PLMN (e.g., a particular PLMN) may belong to one or more of these R11+ specific tracking areas.

A legacy WTRU may be prevented to access a NCT cell by setting cellBarred IE in the SIB1 as "barred", which may make the cell unsuitable for normal service for the legacy WTRU. For R11+ UEs, separate information may indicate whether a cell is barred or not to R12 may be included in the NCT cell system information. This information may be an option, and in certain instances the information may not be present. A R11+ WTRU may use the legacy cellBarred information in the SIB1.

A legacy WTRU may be prevented from re-selecting to a NCT cell based, for example, on IDLE mode measurement "blacklist". The WTRU may be provided with a blacklist of intra-frequency and inter-frequency cells by a serving cell via the SIB 4 and the SIB 5, respectively. For a legacy WTRU, the blacklist may be a list of PCIs of the NCT cells, which may be excluded by the legacy WTRU, as candidate cells for measurement and for cell reselection. The legacy may be able to detect the NCT cell and may determine its PCI before applying it to the blacklist. NCT cells may not be included in the neighbor cell list as broadcasted in the SIB4/5 and read by the legacy WTRU in a serving cell. For NCT supporting WTRU (R11+ WTRU), the blacklist and IDLE mode measurement configuration may be sent separately (e.g., in separate system information or set of such information) broadcasted by the serving cell that may be readable by (e.g., only readable by) the NCT supporting UEs. The R11+ blacklist may not comprise NCT cell PCIs. In case the R11+ WTRU does not detect the new SIB information, the information in the legacy system information for IDLE mode measurements may be applied. For example, the blacklist for R11+ UEs may be updated along with dedicated re-selection priority information (e.g., via a RRC Connection Release message which may be received when the WTRU moves to IDLE mode.

DL power allocation for extension carriers may be described herein. For example, if CRS is not transmitted on an extension carrier, the ratio of PDSCH EPRE (effective power per RE) to CRS EPRE among PDSCH REs may not be defined for the extension carrier. It may adversely affect the PDSCH decoding operation by a WTRU on the extension carrier. There may be a signaling mechanism to indicate a DL power allocation on extension carriers.

Certain ratios (e.g., of PDSCH EPRE to CSI-RS EPRE and/or PDSCH EPRE to DM-RS) (WTRU-specific RS) EPRE may be signaled.

The eNB may set the power of extension carriers relative to the transmit power of CRS corresponding to an associated BC CC where the relative power (e.g., ratio) may be WTRU specific and/or signaled from the eNB.

PUSCH transmission in carrier segments may be described herein. To improve spectral efficiency in UL (e.g., in scenarios involving BW extension by narrow BWs), for example, carrier segments for UL may be applied where one or more of the following characteristics may be implemented.

For SRS transmissions, the WTRU may not transmit periodic SRS in carrier segments, but may be allowing aperiodic SRS transmissions. The sounding procedure for carrier segments may follow the same procedure as that of R-10 sounding procedure for the associated BC CC with the extended BW of carrier segments.

For guardband transmission, if the carrier segments are added into PCell where PUCCH is transmitted, one or more guard band(s) may be inserted between the carrier segment (s) and the PCell. The guard band(s) may be a multiple of 300 KHz.

For the maximum number of clusters for PUSCH, the maximum number of clusters for PUSCH may be 2 (e.g., in R-10). If carrier segments are used in the UL for PUSCH (e.g., using non-contiguous resource allocation), the maximum number of clusters for the PUSCH may be increased (e.g., in R-11 and beyond).

For PUCCH transmission, carrier segments may be used for a PUCCH resource region. The PUCCH may not be transmitted in the carrier segments.

For UCI multiplexing in carrier segments, when UCI is multiplexing on PUSCH, UCI may be transmitted (e.g., only transmitted) in the BC CC and not in any carrier segment (for example, when there is no CRS transmission in carrier segments).

For Power control for carrier segments, the same power may be established for the carrier segments and the linked BC CC, and Carrier segments in the UL may use L1 signaling and/or L2/3 signaling.

LTE systems support scalable transmission bandwidths, one of 1.4, 2.5, 5, 10, 15 or 20 MHz with 6, 15, 25, 50, 75, 100 resource blocks respectively. Network operators may have access to spectrum allocations that do not exactly match one of the set of bandwidth sizes supported, for example when re-farming spectrum previously allocated to a different wireless technology. It is contemplated that within the specifications, addition bandwidth sizes may be supported. Another possibility may be to specify means for a WTRU to use extensions, such as carrier segments, allowing transmissions in an extended range of the PRBs. Extension carriers may additionally be used to increase spectral efficiency of aggregated resources.

The methods described herein may be useful in enabling a WTRU to use carrier segments and/or extension carriers, for example in deployment scenarios such as that explained above.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, WTRU, terminal, base station, RNC, and/or any host computer.

What is claimed is:

1. A wireless transmit/receive unit (WTRU), comprising:
a processor configured to:
receive, from a network device, radio resource control (RRC) configuration information that indicates one or more starting symbols, relative to a beginning of a slot, for receiving downlink shared channel transmissions;
receive a downlink control information (DCI) message from the network device, wherein the DCI message includes an additional indication of a starting symbol of a downlink shared channel transmission scheduled by the DCI message;
determine, based on the RRC configuration information and the additional indication included in the DCI message, a time position for receiving the downlink shared channel transmission; and
receive the downlink shared channel transmission from the network device based on the determined time position.

2. The WTRU of claim 1, wherein the time position for receiving the downlink shared channel transmission is offset by one or more symbols from the beginning of the slot.

3. The WTRU of claim 1, wherein the processor is further configured to determine the slot that includes the starting symbol of the downlink shared channel transmission, and wherein the time position for receiving the downlink shared channel transmission is determined further based on the slot.

4. The WTRU of claim 1, wherein the DCI message is received via a physical downlink control channel (PDCCH) transmission, and wherein the additional indication is provided via a bit field in the DCI message that indicates the starting symbol of the downlink shared channel transmission.

5. The WTRU of claim 1, wherein the DCI message further indicates a first carrier segment to be used by the WTRU to receive the downlink shared channel transmission, the first carrier segment comprising a first subset of continuously numbered resource blocks of a carrier.

6. The WTRU of claim 5, wherein the processor is further configured to activate the first carrier segment based on the DCI message.

7. The WTRU of claim 6, wherein the processor is further configured to deactivate a second carrier segment based on the DCI message, the second carrier segment comprising a second subset of continuously numbered resource blocks of the carrier.

8. A method implemented by a wireless transmit/receive unit (WTRU), the method comprising:
receiving, from a network device, radio resource control (RRC) configuration information that indicates one or more starting symbols, relative to a beginning of a slot, for receiving downlink shared channel transmissions;
receiving a downlink control information (DCI) message from the network device, wherein the DCI message includes an additional indication of a starting symbol of a downlink shared channel transmission scheduled by the DCI message;
determining, based on the RRC configuration information and the additional indication included in the DCI message, a time position for receiving the downlink shared channel transmission; and
receiving the downlink shared channel transmission from the network device based on the determined time position.

9. The method of claim 8, wherein the time position for receiving the downlink shared channel transmission is offset by one or more symbols from the beginning of the slot.

10. The method of claim 8, further comprising determining the slot that includes the starting symbol of the downlink shared channel transmission, wherein the time position for receiving the downlink shared channel transmission is determined further based on the slot.

11. The method of claim 8, wherein the DCI message is received via a physical downlink control channel (PDCCH) transmission, and wherein the additional indication is provided via a bit field in the DCI message that indicates the starting symbol of the downlink shared channel transmission.

12. The method of claim 8, wherein the DCI message further indicates a first carrier segment to be used by the WTRU to receive the downlink shared channel transmission, the first carrier segment comprising a first subset of continuously numbered resource blocks of a carrier.

13. The method of claim 12, further comprising activating the first carrier segment based on the DCI message.

14. The method of claim 13, further comprising deactivating a second carrier segment based on the DCI message, the second carrier segment comprising a second subset of continuously numbered resource blocks of the carrier.

15. A network device, comprising:
a processor configured to:
transmit radio resource control (RRC) configuration information to a wireless transmit/receive unit (WTRU), wherein the RRC configuration information indicates one or more starting symbols for downlink shared channel transmissions;
transmit a scheduling downlink control information (DCI) message to the WTRU, wherein the DCI message includes an additional indication of a starting symbol of a downlink shared channel transmission scheduled by the DCI message; and
transmit the downlink shared channel transmission to the WTRU in accordance with the RRC configuration information and the DCI message.

* * * * *